United States Patent
Lin et al.

(10) Patent No.: US 12,207,265 B2
(45) Date of Patent: Jan. 21, 2025

(54) DETECTING METHOD AND TRANSMITTING METHOD OF PHYSICAL DOWNLINK CONTROL CHANNEL, AND CORRESPONDING EQUIPMENTS

(71) Applicant: Samsung Electronics Co., Ltd., Suwon-si (KR)

(72) Inventors: Peng Lin, Beijing (CN); Di Su, Beijing (CN); Bin Yu, Beijing (CN); Chen Qian, Beijing (CN); Chuang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 17/250,935

(22) PCT Filed: Sep. 30, 2019

(86) PCT No.: PCT/KR2019/012708
§ 371 (c)(1),
(2) Date: Mar. 30, 2021

(87) PCT Pub. No.: WO2020/067828
PCT Pub. Date: Apr. 2, 2020

(65) Prior Publication Data
US 2021/0392625 A1      Dec. 16, 2021

(30) Foreign Application Priority Data

Sep. 30, 2018  (CN) .......................... 201811159793.6
Nov. 28, 2018  (CN) .......................... 201811435516.3

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
None
See application file for complete search history.

(56) References Cited

U.S. PATENT DOCUMENTS 8,718,002 B2   5/2014   Kim et al.
9,300,393 B2 * 3/2016   Lin ........................ H04L 12/66
(Continued)

FOREIGN PATENT DOCUMENTS

CN   109587791     * 4/2019
JP   2013106104 A    5/2013
(Continued)

OTHER PUBLICATIONS

International Search Report and Written Opinion of the International Searching Authority in connection with International Application No. PCT/KR2019/012708 dated Jan. 8, 2020, 7 pages.
(Continued)

*Primary Examiner* — Andre Tacdiran

(57) ABSTRACT

A method includes performing blind detection on a PDCCH in at least one subframe or slot to acquire first downlink control information and second downlink control information; and performing uplink data transmission and downlink data transmission with a base station according to the acquired first downlink control information and second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, and wherein a location where a PDCCH carrying the second downlink
(Continued)

control information is detected is associated with related information of the first downlink control information, or the first downlink control information and the second downlink control information are carried on the same PDCCH.

18 Claims, 31 Drawing Sheets

(56) References Cited

U.S. PATENT DOCUMENTS

| | | | | |
|---|---|---|---|---|
| 2013/0003664 | A1* | 1/2013 | Frenne | H04L 5/0053 370/329 |
| 2013/0230030 | A1* | 9/2013 | Papasakellariou | H04L 1/1812 370/336 |
| 2014/0133440 | A1* | 5/2014 | Zhang | H04L 5/0053 370/329 |
| 2014/0254539 | A1 | 9/2014 | Nagata et al. | |
| 2014/0369293 | A1* | 12/2014 | Guo | H04L 5/0091 370/329 |
| 2016/0095089 | A1* | 3/2016 | Wong | H04W 72/23 370/328 |
| 2017/0126358 | A1 | 5/2017 | Rong et al. | |
| 2017/0135127 | A1* | 5/2017 | Nogami | H04W 72/23 |
| 2017/0230994 | A1* | 8/2017 | You | H04L 5/0053 |
| 2017/0367046 | A1* | 12/2017 | Papasakellariou | H04L 5/0053 |
| 2018/0077643 | A1* | 3/2018 | Dinan | H04W 72/21 |
| 2018/0242309 | A1 | 8/2018 | Au et al. | |
| 2018/0310333 | A1* | 10/2018 | Akkarakaran | H04W 72/20 |
| 2019/0029035 | A1 | 1/2019 | You et al. | |
| 2019/0141737 | A1* | 5/2019 | Kim | H04W 72/23 |
| 2019/0349780 | A1* | 11/2019 | Li | H04W 72/23 |
| 2020/0274637 | A1* | 8/2020 | Li | H04L 5/0053 |

FOREIGN PATENT DOCUMENTS

| | | |
|---|---|---|
| KR | 10-2013-0008781 A | 1/2013 |
| KR | 10-1819501 B1 | 1/2018 |
| WO | 2013009109 A2 | 1/2013 |
| WO | 2017161538 A1 | 9/2017 |

OTHER PUBLICATIONS

Samsung, "Remaining Issues on UL/DL Scheduling," R1-1808755, 3GPP TSG RAN WG1 Meeting #94, Gothenburg, Sweden, Aug. 20-24, 2018, 15 pages.

Office Action dated Oct. 16, 2023, in connection with Korean Patent Application No. 10-2021-7009500, 11 pages.

* cited by examiner

DETECTING METHOD AND TRANSMITTING METHOD OF PHYSICAL DOWNLINK CONTROL CHANNEL, AND CORRESPONDING EQUIPMENTS

CROSS-REFERENCE TO RELATED APPLICATIONS

This application is a 371 National Stage of International Application No. PCT/KR2019/012708, filed Sep. 30, 2019, which claims priority to Chinese Patent Application No. 201811159793.6, filed Sep. 30, 2018, and Chinese Patent Application No. 201811435516.3, filed Nov. 28, 2018, the disclosures of which are herein incorporated by reference in their entirety.

BACKGROUND

1. Field

The present invention generally relates to a wireless communication technique field, and more particularly, to a detecting method of physical downlink control channel and a user equipment, a transmitting method of physical downlink control channel and a base station, and a method for transmitting uplink control information, a terminal device, and a base station.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as 'sensing technology', 'wired/wireless communication and network infrastructure', 'service interface technology', and 'Security technology' have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

According to an estimation of International Telecommunication Union (ITU), by 2020, the global mobile data traffic per month will reach 62 Exa Bytes (EB, 1 EB=$2^{30}$ GB), and from 2020 to 2030, global mobile data services will grow at a rate of about 55% per year. In addition, ratios of video services and machine-to-machine communication services in mobile data services will gradually increase. According to the ITU-R M.2370 research report issued by the ITU Radio-communication Sector, 'IMT traffic estimates for the years 2020 to 2030' (a forecast of international mobile telecommunication system service data traffic for the years 2020 to 2030), by 2030, video services will be six times of non-video services, and machine-to-machine communication services will occupy about 12% of the mobile data services.

The rapid growth of the mobile data services, especially an exponential growth of high-definition video services and ultra-high-definition video services, puts higher requirements on transmission rate of wireless communications. In order to meet the growing demands for the mobile data services, new technologies need to be developed on the basis of the fourth generation mobile communication technology (4G) or the fifth generation mobile communication technology (5G) to further improve transmission rate and throughput of a wireless communication system. Full-duplex technology may further improve a utilization of spectrum, and unlike the traditional half-duplex wireless communication system which adopts time domain orthogonal division (time division duplex, TDD) or frequency domain orthogonal division (frequency division duplex, FDD) for uplink and downlink, the full-duplex wireless communication system allows a synchronous transmission for uplink and downlink on the same time-frequency resource. Therefore, the full-duplex wireless communication system may achieve twice the throughput of the half-duplex wireless communication system theoretically.

The full-duplex wireless communication system may support one full-duplex user equipment to perform a synchronous transmission for uplink and downlink on the same time-frequency resource. After the user equipment blindly detects the downlink control information for uplink scheduling grant, it needs a certain time to prepare data, and then performs uplink transmission of the data; and after the downlink control information for the downlink scheduling is detected, since the reception of downlink data does not require the user equipment to prepare data, the downlink transmission of the data may be directly performed. Therefore, for a Long Term Evolution (LTE) system, if the synchronization transmission for uplink and downlink on the same time-frequency resource is to be implemented in the full-duplex user equipment, an asynchronous scheduling for uplink and downlink must be performed based on a physical downlink control channel (PDCCH) for uplink scheduling grant and a PDCCH for downlink scheduling, and the user equipment begins to perform the synchronous transmission for uplink and downlink on the same time-frequency resource after two PDCCHs for asynchronous scheduling are detected in different subframes. In a 5G NR system, the base station may achieve 'synchronous scheduling, synchronous transmission' by configuring the same delay for the uplink and downlink transmissions, and after two PDCCHs for synchronization scheduling are detected on the same one subframe or slot, the user equipment begins to perform the synchronous transmission for uplink and downlink on the same time-frequency resource after the configured same delay has passed.

There are two manners for reporting uplink control information (UCI). When a user does not transmit uplink data transmission, the uplink control information is reported in an uplink control channel; when transmitting uplink data, the uplink control information is reported to a base station along with the uplink data in an uplink traffic channel, usually for the purpose of saving transmission power. For a full-duplex system, the transmission of uplink and downlink data occupy the same time-frequency resource, and the uplink control information includes a Hybrid Automatic Repeat Request Acknowledgment (HARQ-ACK), a Channel Quality Indicator (CQI), and other important information. Therefore, when the uplink control information is reported together with the uplink data, the uplink control information is particularly interfered by the downlink data, which may cause the uplink control information to be interpreted incorrectly, a waste of wireless resources or even a scheduling error, which further lead to a significant reduction in throughput.

SUMMARY

Therefore, it is important to ensure that the uplink control information is accurately reported in the full-duplex system to stabilize the performance of the entire system.

An exemplary embodiment of the present invention is to provide a detecting method of physical downlink control channel and a user equipment, a transmitting method of physical downlink control channel and a base station, which are capable of effectively reducing the maximum number of blind detections performed on a physical downlink control channel for acquiring downlink control information for uplink scheduling grant and downlink control information for downlink scheduling.

According to an exemplary embodiment of the present invention, a detecting method of a physical downlink control channel is provided. The detecting method comprises: performing blind detection on the physical downlink control channel (PDCCH) in at least one subframe or slot to acquire first downlink control information and second downlink control information; performing uplink data transmission and downlink data transmission with a base station according to the acquired first downlink control information and second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, wherein a location where a PDCCH carrying the second downlink control information is detected is associated with related information of the first downlink control information, or the first downlink control information and the second downlink control information are carried on the same one PDCCH.

Alternatively, the related information of the first downlink control information includes at least one of an aggregation level of a PDCCH carrying the first downlink control information, a location of the PDCCH carrying the first downlink control information in a search subspace, and content in a specific field in the first downlink control information, wherein the search subspace is a subspace in a user-equipment-specific search space, wherein the content in the specific field is used for indicating an aggregation level of the PDCCH carrying the second downlink control information and/or a location of the PDCCH carrying the second downlink control information in the search subspace.

Alternatively, when the first downlink control information and the second downlink control information are carried on different PDCCHs, the performing blind detection on the PDCCH to acquire first downlink control information and second downlink control information includes: detecting the PDCCH carrying the first downlink control information blindly in one subframe or slot to acquire the first downlink control information; performing blind detection on the PDCCH carrying the second downlink control information based on the related information of the first downlink control information in a subframe or slot used for transmitting the PDCCH carrying the second downlink control information, to acquire the second downlink control information, wherein the one subframe or slot and the subframe or slot used for transmitting the PDCCH carrying the second downlink control information are the same one subframe or slot, or are different subframes or slots.

Alternatively, the performing blind detection on the PDCCH carrying the second downlink control information based on the related information of the first downlink control information includes: determining an aggregation level of the PDCCH carrying the second downlink control information and/or a location of the PDCCH carrying the second downlink control information in the search subspace based on the related information of the first downlink control information; performing blind detection on the PDCCH carrying the second downlink control information in a location, which is defined by the determined aggregation level and/or the location in the search subspace, in the subframe or slot used for transmitting the PDCCH carrying the second downlink control information, to acquire the second downlink control information.

Alternatively, the determining an aggregation level of the PDCCH carrying the second downlink control information and/or a location of the PDCCH carrying the second downlink control information in the search subspace based on the related information of the first downlink control information includes: determining the aggregation level of the PDCCH carrying the second downlink control information and/or the location of the PDCCH carrying the second downlink control information in the search subspace based on the content in the specific field in the first downlink control information; or determining the aggregation level of the PDCCH carrying the second downlink control information and/or the location of the PDCCH carrying the second downlink control information in the search subspace based on the content in the specific field in the first downlink control information and the aggregation level of the PDCCH carrying the first downlink control information and/or the location of the PDCCH carrying the first downlink control information in the search subspace; or calculating the aggregation level of the PDCCH carrying the second downlink control information and/or the location of the PDCCH carrying the second downlink control information in the search subspace based on the aggregation level of the PDCCH carrying the first downlink control information and/or the location of the PDCCH carrying the first downlink control information in the search subspace, by using a location correlation function.

Alternatively, the content in the specific field include at least one of content for indicating the aggregation level of the PDCCH carrying the second downlink control information; content for indicating a location index number of the PDCCH carrying the second downlink control information in the search subspace; content for indicating that the aggregation level of the PDCCH carrying the second downlink control information is the same as the aggregation level of the PDCCH carrying the first downlink control information; content for indicating that the location index number of the PDCCH carrying the second downlink control information in the search subspace is the same as a location index number of the PDCCH carrying the first downlink control information in the search subspace; content for indicating an offset amount and an offset direction between the aggregation level of the PDCCH carrying the second downlink control information and the aggregation level of the PDCCH carrying the first downlink control information; content for indicating an offset amount and an offset direction between the location index number of the PDCCH carrying the second downlink control information in the search subspace and the location index number of the PDCCH carrying the first downlink control information in the search subspace; content for indicating an index number of a combination formed of the aggregation level of the PDCCH carrying the second downlink control information and the aggregation level of the PDCCH carrying the first downlink control information; content for indicating an index number of a combination formed of the location index number of the PDCCH carrying the second downlink control information in the search subspace and the location index number of the PDCCH carrying the first downlink control information in the search subspace; content for indicating an index number of a candidate PDCCH location where the PDCCH carrying the second downlink control information is located, wherein the candidate PDCCH location is a location in all search subspaces that can be used for setting the PDCCH; and content for indicating an offset amount and an offset direction between the index number of the candidate PDCCH location where the PDCCH carrying the second downlink control information is located and an index number of a candidate PDCCH location where the PDCCH carrying the first downlink control information is located.

Alternatively, when the one subframe or slot and the subframe or slot used for transmitting the PDCCH carrying the second downlink control information are different subframes or slots, and the detecting method further includes: transmitting blind detection feedback information to a corresponding base station after performing blind detection on the PDCCH carrying the second downlink control information, wherein when the PDCCH carrying the second downlink control information is detected, blind detection feedback information for indicating that the PDCCH carrying the second downlink control information is detected is transmitted to the corresponding base station; when no PDCCH carrying the second downlink control information is detected in the subframe or slot used for transmitting the PDCCH carrying the second downlink control information, blind detection feedback information for indicating that no PDCCH carrying the second downlink control information is detected is transmitted to the corresponding base station.

Alternatively, the transmitting blind detection feedback information to a corresponding base station includes: transmitting the blind detection feedback information to the corresponding base station, along with the transmitted uplink data or fedback downlink data acknowledge information.

Alternatively, when the first downlink control information and the second downlink control information are carried on the same one PDCCH, the first downlink control information and the second downlink control information are contained in one third downlink control information, wherein the performing blind detection on the PDCCH to acquire first downlink control information and second downlink control information includes: performing blind detection on the PDCCH based on a length of the third downlink control information in one subframe or slot, to acquire the third downlink control information; obtaining the first downlink control information and the second downlink control information based on the acquired third downlink control information.

Alternatively, the third downlink control information only includes only one of resource allocation fields for indicating the same resources used in uplink and downlink data transmissions.

Alternatively, the length of the third downlink control information includes a first length and a second length, and a length of unidirectional downlink control information includes the second length and a third length, wherein the first length is longer than the second length, and the second length is longer than the third length; or the length of the third downlink control information only includes a fourth length, and the length of the unidirectional downlink control information only includes a fifth length, wherein the fourth length is longer than the fifth length.

Alternatively, the performing blind detection on the PDCCH to acquire the third downlink control information includes: performing blind detection on the PDCCH in a search subspace of the aggregation level corresponding to the length of the third downlink control information in one subframe or slot, to acquire the third downlink control information.

According to another exemplary embodiment of the present invention, a transmitting method of a physical downlink control channel is provided. The transmitting method includes: transmitting downlink control information to a user equipment on the physical downlink control channel (PDCCH) in at least one subframe or slot, so that the user equipment acquires first downlink control information and second downlink control information, performing uplink data transmission and downlink data transmission with the user equipment according to the first downlink control information and the second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, wherein a location of a PDCCH carrying the second downlink control information in a subframe or slot is associated with related information of the first downlink control information, or the first downlink control information and the second downlink control information are carried on the same one PDCCH.

Alternatively, the related information of the first downlink control information includes at least one of an aggregation level of the PDCCH carrying the first downlink control information, a location of the PDCCH carrying the first downlink control information in a search subspace, and content in a specific field in the first downlink control information, wherein the search subspace is a subspace in a user-equipment-specific search space, wherein the content in the specific field is used for indicating an aggregation level of the PDCCH carrying the second downlink control information and/or a location of the PDCCH carrying the second downlink control information in the search subspace.

Alternatively, when the first downlink control information and the second downlink control information are carried on different PDCCHs, the transmitting downlink control information to a user equipment on the PDCCH in at least one subframe or slot includes: determining a PDCCH for carrying the first downlink control information; determining a PDCCH for carrying the second downlink control information, based on an aggregation level of the determined PDCCH for carrying the first downlink control information and/or a location of the determined PDCCH for carrying the first downlink control information in the search subspace, by using a location correlation function; transmitting the first downlink control information to the user equipment on the determined PDCCH for carrying the first downlink control information, and transmitting the second downlink control information to the user equipment on the determined PDCCH for carrying the second downlink control information, in at least one subframe or slot.

Alternatively, when the first downlink control information and the second downlink control information are carried on different PDCCHs, the transmitting downlink control information to a user equipment on the PDCCH in at least one subframe or slot includes: determining a PDCCH for carrying the first downlink control information; determining a PDCCH for carrying the second downlink control information; generating content for indicating an aggregation level of the determined PDCCH for carrying the second downlink control information and/or a location of the determined PDCCH for carrying the second downlink control information in the search subspace; adding the generated content to a specific field in the first downlink control information; transmitting the first downlink control information, to which the generated content is added, to the user equipment on the determined PDCCH for carrying the first downlink control information, and transmitting the second downlink control information to the user equipment on the determined PDCCH for carrying the second downlink control information, in at least one subframe or slot.

Alternatively, the transmitting downlink control information to a user equipment on the PDCCH in at least one subframe or slot further includes: generating content for indicating the aggregation level of the determined PDCCH for carrying the first downlink control information and/or the location of the determined PDCCH for carrying the first downlink control information in the search subspace; adding the generated content to a specific field in the second downlink control information; wherein the second downlink control information, to which the generated content is added, is transmitted to the user equipment on the determined PDCCH for carrying the second downlink control information.

Alternatively, the transmitting the first downlink control information and the second downlink control information in at least one subframe or slot includes: transmitting the first downlink control information, to which the generated content is added, to the user equipment on the determined PDCCH for carrying the first downlink control information, and transmitting the second downlink control information to the user equipment on the determined PDCCH for carrying the second downlink control information, in the same one subframe or slot; or, transmitting the first downlink control information, to which the generated content is added, to the user equipment on the determined PDCCH for carrying the first downlink control information in one subframe or slot, and transmitting the second downlink control information to the user equipment on the determined PDCCH for carrying the second downlink control information in a subframe or slot subsequent to the one subframe or slot.

Alternatively, the PDCCH for carrying the first downlink control information and the PDCCH for carrying the second downlink control information are transmitted in different subframes or slots, and the transmitting method further includes: receiving blind detection feedback information for the PDCCH for carrying the second downlink control information from the user equipment; upon receiving the blind detection feedback information for indicating that no PDCCH carrying the second downlink control information is detected, transmitting the second downlink control information to the user equipment on a PDCCH in one subframe or slot again.

Alternatively, when the first downlink control information and the second downlink control information are carried on the same one PDCCH, the transmitting downlink control information to a user equipment on the PDCCH in at least one subframe or slot includes: generating one third downlink control information according to a length of a third downlink control information, wherein the third downlink control information is used for indicating the first downlink control information and the second downlink control information; transmitting the generated third downlink control information to the user equipment on one PDCCH in one subframe or slot.

According to another exemplary embodiment of the present invention, a user equipment is provided. The user equipment includes: a detecting unit for performing blind detection on a physical downlink control channel (PDCCH) in at least one subframe or slot to acquire first downlink control information and second downlink control information; and a transmission unit for performing uplink data transmission and downlink data transmission with a base station according to the acquired first downlink control information and second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, wherein a location where a PDCCH carrying the second downlink control information is detected is associated with related information of the first downlink control information, or the first downlink control information and the second downlink control information are carried on the same one PDCCH.

Alternatively, the related information of the first downlink control information includes at least one of an aggregation level of a PDCCH carrying the first downlink control information, a location of the PDCCH carrying the first downlink control information in a search subspace, and content in a specific field in the first downlink control information, wherein the search subspace is a subspace in a user-equipment-specific search space, wherein the content in the specific field is used for indicating an aggregation level of the PDCCH carrying the second downlink control information and/or a location of the PDCCH carrying the second downlink control information in the search subspace.

Alternatively, the first downlink control information and the second downlink control information are carried on different PDCCHs, and the detecting unit includes: a first detecting unit for detecting the PDCCH carrying the first downlink control information blindly in one subframe or slot to acquire the first downlink control information; and a second detecting unit for performing blind detection on the PDCCH carrying the second downlink control information based on the related information of the first downlink control information in a subframe or slot used for transmitting the PDCCH carrying the second downlink control information, to acquire the second downlink control information, wherein the one subframe or slot and the subframe or slot used for transmitting the PDCCH carrying the second downlink control information are the same one subframe or slot, or are different subframes or slots.

Alternatively, the second detecting unit determines an aggregation level of the PDCCH carrying the second downlink control information and/or a location of the PDCCH carrying the second downlink control information in the search subspace based on the related information of the first downlink control information; and performs blind detection on the PDCCH carrying the second downlink control information in a location, which is defined by the determined aggregation level and/or the location in the search subspace, in the subframe or slot used for transmitting the PDCCH carrying the second downlink control information, to acquire the second downlink control information.

Alternatively, the second detecting unit determines the aggregation level of the PDCCH carrying the second downlink control information and/or the location of the PDCCH carrying the second downlink control information in the search subspace based on the content in the specific field in the first downlink control information; or, the second detecting unit determines the aggregation level of the PDCCH carrying the second downlink control information and/or the location of the PDCCH carrying the second downlink control information in the search subspace based on the content in the specific field in the first downlink control information, and the aggregation level of the PDCCH carrying the first downlink control information and/or the location of the PDCCH carrying the first downlink control information in the search subspace; or the second detecting unit calculates the aggregation level of the PDCCH carrying the second downlink control information and/or the location of the PDCCH carrying the second downlink control information in the search subspace based on the aggregation level of the PDCCH carrying the first downlink control information and/or the location of the PDCCH carrying the first downlink control information in the search subspace, by using a location correlation function.

Alternatively, the content in the specific field include at least one of content for indicating the aggregation level of the PDCCH carrying the second downlink control information; content for indicating a location index number of the PDCCH carrying the second downlink control information in the search subspace; content for indicating that the aggregation level of the PDCCH carrying the second downlink control information is the same as the aggregation level of the PDCCH carrying the first downlink control information; content for indicating that the location index number of the PDCCH carrying the second downlink control information in the search subspace is the same as a location index number of the PDCCH carrying the first downlink control information in the search subspace; content for indicating an offset amount and an offset direction between the aggregation level of the PDCCH carrying the second downlink control information and the aggregation level of the PDCCH carrying the first downlink control information; content for indicating an offset amount and an offset direction between the location index number of the PDCCH carrying the second downlink control information in the search subspace and the location index number of the PDCCH carrying the first downlink control information in the search subspace; content for indicating an index number of a combination formed of the aggregation level of the PDCCH carrying the second downlink control information and the aggregation level of the PDCCH carrying the first downlink control information; content for indicating an index number of a combination formed of the location index number of the PDCCH carrying the second downlink control information in the search subspace and the location index number of the PDCCH carrying the first downlink control information in the search subspace; content for indicating an index number of a candidate PDCCH location where the PDCCH carrying the second downlink control information is located, wherein the candidate PDCCH location is a location in all search subspaces that can be used for setting the PDCCH; content for indicating an offset amount and an offset direction between an index number of the candidate PDCCH location where the PDCCH carrying the second downlink control information is located and an index number of a candidate PDCCH location where the PDCCH carrying the first downlink control information is located.

Alternatively, the one subframe or slot and the subframe or slot used for transmitting the PDCCH carrying the second downlink control information are different subframes or slots, and the user equipment further includes: a feedback unit for transmitting blind detection feedback information to a corresponding base station after the second detecting unit performs the blind detection on the PDCCH carrying the second downlink control information, wherein when the PDCCH carrying the second downlink control information is detected, the feedback unit transmits blind detection feedback information for indicating that the PDCCH carrying the second downlink control information is detected to the corresponding base station; and when no PDCCH carrying the second downlink control information is detected in the subframe or slot used for transmitting the PDCCH carrying the second downlink control information, the feedback unit transmits blind detection feedback information for indicating that no PDCCH carrying the second downlink control information is detected, to the corresponding base station.

Alternatively, the feedback unit transmits the blind detection feedback information to the corresponding base station, along with the transmitted uplink data or feedback downlink data acknowledge information.

Alternatively, when the first downlink control information and the second downlink control information are carried on the same one PDCCH, the first downlink control information and the second downlink control information are contained in one third downlink control information, and the detecting unit performs blind detection on the PDCCH based on a length of the third downlink control information in one subframe or slot, to acquire the third downlink control information; and obtains the first downlink control information and the second downlink control information based on the acquired third downlink control information.

Alternatively, the third downlink control information only includes only one of resource allocation fields for indicating the same resources used in uplink and downlink data transmissions.

Alternatively, the length of the third downlink control information includes a first length and a second length, and a length of unidirectional downlink control information includes the second length and a third length, wherein the first length is longer than the second length, and the second length is longer than the third length; or the length of the third downlink control information only includes a fourth length, and a length of unidirectional downlink control information only includes a fifth length, wherein the fourth length is longer than the fifth length.

Alternatively, the detecting unit performs blind detection on the PDCCH, in a search subspace of the aggregation level corresponding to the length of the third downlink control information in one subframe or slot, to acquire the third downlink control information.

According to another exemplary embodiment of the present invention, a base station is provided. The base station includes: a downlink control information transmitting unit for transmitting downlink control information to a user equipment on the physical downlink control channel (PDCCH) in at least one subframe or slot, so that the user equipment acquires first downlink control information and second downlink control information; a transmission unit for performing uplink data transmission and downlink data transmission with the user equipment according to the first downlink control information and the second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, wherein a location of a PDCCH carrying the second downlink control information in a subframe or slot is associated with related information of the first downlink control information, or the first downlink control information and the second downlink control information are carried on the same one PDCCH.

Alternatively, the related information of the first downlink control information includes at least one of an aggregation level of a PDCCH carrying the first downlink control information, a location of the PDCCH carrying the first downlink control information in a search subspace, and content in a specific field in the first downlink control information, wherein the search subspace is a subspace in a user-equipment-specific search space, wherein the content in the specific field is used for indicating an aggregation level of the PDCCH carrying the second downlink control information and/or a location of the PDCCH carrying the second downlink control information in the search subspace.

Alternatively, the first downlink control information and the second downlink control information are carried on different PDCCHs, and the downlink control information transmitting unit includes: a first determining unit for determining a PDCCH for carrying the first downlink control information; a second determining unit for determining the PDCCH for carrying the second downlink control information based on the aggregation level of the determined PDCCH for carrying the first downlink control information and/or the location of the determined PDCCH for carrying the first downlink control information in the search subspace, by using a location correlation function; and a transmitting unit for transmitting the first downlink control information to the user equipment on the determined PDCCH for carrying the first downlink control information, and transmitting the second downlink control information to the user equipment on the determined PDCCH for carrying the second downlink control information, in at least one subframe or slot.

Alternatively, the first downlink control information and the second downlink control information are carried on different PDCCHs, and the downlink control information transmitting unit includes: a first determining unit for determining the PDCCH for carrying the first downlink control information; a second determining unit for determining the PDCCH for carrying the second downlink control information; an indication content generating unit for generating content for indicating the aggregation level of the determined PDCCH for carrying the second downlink control information and/or the location of the determined PDCCH for carrying the second downlink control information in the search subspaces; an indication content adding unit for adding the generated content to a specific field in the first downlink control information; and a transmitting unit for transmitting the first downlink control information, to which the generated content is added, to the user equipment on the determined PDCCH for carrying the first downlink control information, and transmitting the second downlink control information to the user equipment on the determined PDCCH for carrying the second downlink control information, in at least one subframe or slot.

Alternatively, the indication content generating unit further generates content for indicating the aggregation level of the determined PDCCH for carrying the first downlink control information and/or the location of the determined PDCCH for carrying the first downlink control information in the search subspace; the indication content adding unit further adds the generated content to a specific field in the second downlink control information; wherein the transmitting unit transmits the second downlink control information, to which the generated content is added, to the user equipment on the determined PDCCH for carrying the second downlink control information.

Alternatively, the transmitting unit transmits the first downlink control information, to which the generated content is added, to the user equipment on the determined PDCCH for carrying the first downlink control information, and transmits the second downlink control information to the user equipment on the determined PDCCH for carrying the second downlink control information, in the same one subframe or slot; or the transmitting unit transmits the first downlink control information, to which the generated content is added, to the user equipment on the determined PDCCH for carrying the first downlink control information in one subframe or slot, and transmits the second downlink control information to the user equipment on the determined PDCCH for carrying the second downlink control information in a subframe or slot subsequent to the one subframe or slot.

Alternatively, the PDCCH for carrying the first downlink control information and the PDCCH for carrying the second downlink control information are transmitted in different subframes or slots, and the base station further includes: a feedback receiving unit for receiving blind detection feedback information for the PDCCH for carrying the second downlink control information from the user equipment; wherein upon receiving the blind detection feedback information for indicating that no PDCCH carrying the second downlink control information is detected, the transmitting unit transmits the second downlink control information to the user equipment on a PDCCH in one subframe or slot again.

Alternatively, the first downlink control information and the second downlink control information are carried on the same one PDCCH, and the downlink control information transmitting unit generates one third downlink control information according to the length of a third downlink control information, and transmits the generated third downlink control information to the user equipment on one PDCCH in one subframe or slot, wherein the third downlink control information is used for indicating the first downlink control information and the second downlink control information.

According to another exemplary embodiment of the present invention, a computer readable storage medium having stored thereon a computer program which implements, when being executed by a processor, the detecting method of physical downlink control channel as described above is provided.

According to another exemplary embodiment of the present invention, a user equipment is provided, wherein the user equipment includes: a processor; and a memory for storing a computer program which implements, when being executed by the processor, the detecting method of physical downlink control channel as described above.

According to another exemplary embodiment of the present invention, a computer readable storage medium having stored thereon a computer program which implements, when being executed by a processor, the transmitting method of physical downlink control channel as described above is provided.

According to another exemplary embodiment of the present invention, a base station is provided, wherein the base station includes: a processor; and a memory for storing a computer program which implements, when being executed by the processor, the transmitting method of physical downlink control channel as described above.

The detecting method of physical downlink control channel and the user equipment, the transmitting method of physical downlink control channel and the base station according to the exemplary embodiments of the present invention, are capable of effectively reducing the maximum number of blind detections performed on a physical downlink control channel for uplink scheduling grant and a physical downlink control channel for downlink scheduling, therefore, a complexity of processing the physical downlink control channel by the user equipment is reduced, and a processing speed of the user equipment is improved.

In addition, according to a first aspect of present invention, a method for transmitting uplink control information is provided, wherein the method includes:
receiving transmission configuration information for reporting the uplink control information;
wherein, the transmission configuration information includes transmission indication information and position indication information, wherein the transmission indication information is used to indicate to transmit the uplink control information on an orthogonal frequency division multiplexing (OFDM) symbol used for transmitting an uplink pilot signal or to transmit the uplink control information on an OFDM symbol used for transmitting uplink data, and the position indication information is used to indicate the position of resource elements (REs) used for transmitting the uplink control information on an OFDM symbol used for transmitting an uplink pilot signal or an OFDM symbol used for transmitting uplink data; and
transmitting, according to the transmission configuration information, the uplink control information.

According to a second aspect of present invention, a method for transmitting uplink control information is provided, wherein the method is performed by a second terminal device, and the method includes:
receiving transmission configuration information for reporting the uplink control information of a first terminal device, wherein the second terminal device is a device that performs full-duplex transmission with the first terminal device;
the transmission configuration information includes transmission indication information, wherein the transmission indication information is used to indicate the first terminal device to transmit the uplink control information on an OFDM symbol used for transmitting an uplink pilot signal or to transmit the uplink control information on an OFDM symbol used for transmitting uplink data, and if the second terminal device does not receive downlink data on the REs used for transmitting the uplink control information by the first terminal device, the transmission configuration information further includes position indication information, wherein the position indication information is used to indicate the position of REs used for transmitting the uplink control information on an OFDM symbol used for transmitting an uplink pilot signal or on an OFDM symbol used for transmitting uplink data;
receiving downlink data according to the transmission configuration information.

According to a third aspect of present invention, a method for receiving uplink control information is provided, wherein the method includes:
transmitting first transmission configuration information for the uplink control information to the first terminal device, so that the first terminal device transmits the uplink control information according to the first transmission configuration information;
wherein, the first transmission configuration information includes transmission indication information and position indication information, wherein the transmission indication information is used to indicate the first terminal device to transmit the uplink control information on an OFDM symbol used for transmitting an uplink pilot signal or to transmit the uplink control information on an OFDM symbol used for transmitting uplink data, and the position indication information is used to indicate the position of REs used for transmitting the uplink control information on an OFDM symbol used for transmitting an uplink pilot signal or on an OFDM symbol used for transmitting uplink data; and
receiving the uplink control information transmitted by the first terminal device, according to the first transmission configuration information.

According to a fourth aspect of present invention, a terminal device is provided, wherein the terminal device includes:
a configuration information receiving module, configured to receive transmission configuration information for uplink control information;
wherein, the transmission configuration information includes transmission indication information and position indication information, wherein the transmission indication information is used to indicate to transmit the uplink control information on an OFDM symbol used for transmitting an uplink pilot signal or to transmit the uplink control information on an OFDM symbol used for transmitting uplink data, and the position indication information is used to indicate the position of REs used for transmitting the uplink control information on an OFDM symbol used for transmitting an uplink pilot signal or on an OFDM symbol used for transmitting uplink data; and an uplink control information transmitting module, configured to transmit the uplink control information according to the transmission configuration information.

According to a fifth aspect of present invention, a terminal device is provided, wherein the terminal device includes:

a configuration information receiving module, configured to receive transmission configuration information for uplink control information of a first device that performs full-duplex transmission with the terminal device;

the transmission configuration information includes transmission indication information, wherein the transmission indication information is used to indicate the first device to transmit the uplink control information on an orthogonal frequency division multiplexing (OFDM) symbol used for transmitting an uplink pilot signal or to transmit the uplink control information on an OFDM symbol used for transmitting uplink data, and if the terminal device does not receive downlink data on the resource elements (REs) used for transmitting the uplink control information by the first device and the first device transmits the uplink control information on the OFDM symbol used for transmitting uplink data, the transmission configuration information further includes position indication information, wherein the position indication information is used to indicate the position of REs used for transmitting the uplink control information on an OFDM symbol used for transmitting uplink data; and a data receiving module, configured to receive downlink data according to transmission configuration information.

According to a sixth aspect of present invention, a base station is provided, wherein the base station includes:

a configuration information transmitting module, configured to transmit first transmission configuration information for uplink control information to a first terminal device, so that the first terminal device transmits the uplink control information according to the first transmission configuration information;

wherein, the first transmission configuration information includes transmission indication information and position indication information, wherein the transmission indication information is used to indicate to transmit the uplink control information on an orthogonal frequency division multiplexing (OFDM) symbol used for transmitting an uplink pilot signal or to transmit the uplink control information on an OFDM symbol used for transmitting uplink data, and the position indication information is used to indicate the position of REs used for transmitting the uplink control information on an OFDM symbol used for transmitting an uplink pilot signal or on an OFDM symbol used for transmitting uplink data;

an uplink control information receiving module, configured to receive the uplink control information transmitted by the first terminal device, according to the first transmission configuration information.

According to a seventh aspect of present invention, an electronic device including a memory and a processor is provided; the memory stores computer instructions; the processor is configured to invoke the computer instructions to perform the method shown in the first, second or third aspect of the present application.

In an eighth aspect, the present application provides a computer readable storage medium, having stored therein a computer program that, when executed by a processor, implements the method shown in the first, second or third aspect of the present application.

The technical solutions provided by the embodiments of the present application has the beneficial effects that: the method for transmitting uplink control information, the terminal device and the base station provided by the embodiments of the present application may implement of transmitting uplink control information with uplink data to a base station on an OFDM symbol used for transmitting a pilot signal or on an OFDM symbol used for transmitting uplink data; since both the transmission mode of the uplink control information and the position of the REs occupied by the uplink control information when reporting may be determined by transmission configuration information downloaded by the base station, by the solution of the embodiments of the present application, the base station may specifically indicate a terminal device to report a mode of the uplink control information and the position of occupied uplink resources according to actual application requirement, thereby implementing that the base station is capable of avoiding resources used for transmitting uplink control information when transmitting downlink data to a terminal device occupying same time-frequency domain resources, and ensuring accurate reporting of the uplink control information.

Additional aspects and/or advantages of the present general inventive concept will be set forth in part in the following description, and parts will be apparent from the description or may be known through the practice of the present general inventive concept.

BRIEF DESCRIPTION OF THE DRAWINGS

The above and other objects and features of the exemplary embodiments of the present invention will become more apparent from the following description, taking in conjunction with the accompanying drawings which exemplarily illustrates embodiments, in which.

DETAILED DESCRIPTION

Figure 1:
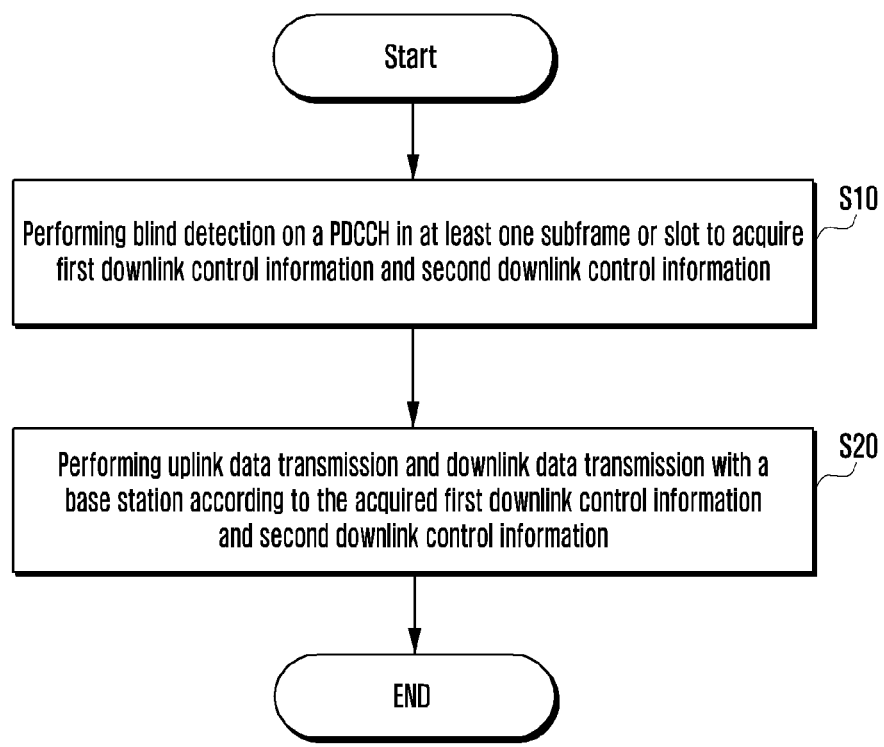
FIG. 1 illustrates a flowchart of a detecting method of a physical downlink control channel according to an exemplary embodiment of the present invention.

Reference will now be made in detail to embodiments of the present invention, examples of which are illustrated in the accompanying drawings, wherein the same reference numerals refer to same parts throughout. The embodiments will be described below by referring to the accompanying drawings, so as to explain the present invention.

It should be understood by one person of ordinary skill in the art that singular forms 'a', 'an', 'the', and 'said' may be intended to include plural forms as well, unless otherwise stated. It should be further understood that terms 'include/including' used in this specification specify the presence of the stated features, integers, steps, operations, elements and/or components, but not exclusive of the presence or addition of one or more other features, integers, steps, operations, elements, components and/or combinations thereof. It should be understood that, when an element is referred to as being 'connected to' or 'coupled to' another element, it may be directly connected or coupled to other elements or provided with intervening elements therebetween. In addition, 'connected to' or 'coupled to' as used herein may include wireless connection or coupling. As used herein, the term 'and/or' includes all or any of one or more associated listed items or combinations thereof.

Those skilled in the art will appreciate that all terms (including technical terms and scientific terms) used herein have the same meaning as commonly understood by one of ordinary skill in the art belonging to the field of the present invention, unless otherwise defined. It should also be understood that those terms, such as those defined in a general dictionary, should be understood as having a meaning consistent with the meaning in the context of the prior art, and it is not intended to be construed in an idealized or overly formal sense unless specifically defined herein.

Those skilled in the art may understand that the 'terminal' and 'terminal equipment' as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or other communication device having a single line display or a multi-line display, or a cellular or other communication device without a multi-line display; a PCS (Personal Communications Service), which may combine voice, data processing, fax and/or data communication capabilities; a PDA (Personal Digital Assistant), which may include a radio frequency receiver, a pager, Internet/Intranet access, a web browser, a notepad, a calendar, and/or a Global Positioning System (GPS) receiver; a conventional laptop and/or a palmtop computer or other devices having and/or including a radio frequency receiver. As used herein, 'terminal' and 'terminal equipment' may be portable, transportable, installed in a vehicle (in aviation, sea and/or land), or adapted and/or configured to operate locally, and/or operated in any other position on the earth and/or space in a distributed form. As used herein, 'terminal' and 'terminal equipment' may also be a communication terminal, an internet terminal, and a music/video playing terminal, for example, a PDA, a MID (Mobile Internet Device), and/or a mobile phone having a music/video playback function, and may also be a smart TV, a set-top box and other devices.

FIG. 1 illustrates a flowchart of a detecting method of a physical downlink control channel according to an exemplary embodiment of the present invention. The detecting method may be performed by the user equipment, and as an example, the user equipment may be a full-duplex user equipment.

Referring to FIG. 1, in step S10, blind detection is performed on a physical downlink control channel (PDCCH) in at least one subframe or slot to acquire first downlink control information and second downlink control information, wherein the first downlink control information is one of Downlink Control Information (DCI) for uplink scheduling grant and downlink control information for downlink scheduling, and the second downlink control information is the other one of the downlink control information for uplink scheduling grant and the downlink control information for downlink scheduling, wherein a location where a PDCCH carrying the second downlink control information is detected is associated with related information of the first downlink control information, or the first downlink control information and the second downlink control information are carried on the same one PDCCH.

The user equipment may perform synchronous transmission for uplink and downlink on the same time-frequency resource after acquiring the downlink control information for the uplink scheduling grant and the downlink control information for the downlink scheduling, therefore, the present invention reduces the maximum number of blind detections performed on the PDCCH carrying the second downlink control information by establishing an correlation between a location where the PDCCH carrying the second downlink control information is detected and related information of the first downlink control information, thereby DCIs used for the uplink scheduling and the downlink scheduling may be acquired with lower blind detection complexity.

As an example, the related information of the first downlink control information includes at least one of an aggregation level of the PDCCH carrying the first downlink control information, a location of the PDCCH carrying the first downlink control information in a search subspace, and content in a specific field in the first downlink control information.

In particular, the aggregation level (AL) of the PDCCH corresponds to a number of resource units occupied by the PDCCH. Here, the resource unit is a Control Channel Element (CCE), for example, if one PDCCH occupies n CCEs for transmission, its aggregation level is n. The search subspace is a subspace in a user-equipment-specific search space (UE-Specific Search Space), different search subspaces correspond to different aggregation levels, and for each search subspace, assuming that the corresponding aggregation level of it is n, and there are m candidate PDCCH locations in it (i.e., m locations therein are available for setting PDCCH), the aggregation levels corresponding to the m candidate PDCCH locations are all n, and correspondingly, only the PDCCH with aggregation level n may be detected at each candidate PDCCH location in the search subspace. Take a search subspace with a corresponding aggregation level of 4 as an example, if the search subspace has a size of 8 control channel elements, the number of candidate PDCCH locations in the search subspace is 2, in other words, there are two locations in the search subspace on which PDCCH may be detected, these two locations may correspond to different location index numbers, for example, the location index numbers of the two locations may be 0 and 1, respectively.

The content in the specific field in the first downlink control information is used for indicating an aggregation level of the PDCCH carrying second downlink control information and/or a location of the PDCCH carrying second downlink control information in the search subspace. As an example, the content in the specific field in the first downlink control information may include at least one of content for indicating the aggregation level of the PDCCH carrying the second downlink control information; content for indicating a location index number of the PDCCH carrying the second downlink control information in the search subspace; content for indicating that the aggregation level of the PDCCH carrying the second downlink control information is the same as the aggregation level of the PDCCH carrying the first downlink control information; content for indicating that the location index number of the PDCCH carrying the second downlink control information in the search subspace is the same as a location index number of the PDCCH carrying the first downlink control information in the search subspace; content for indicating an offset amount and an offset direction between the aggregation level of the PDCCH carrying the second downlink control information and the aggregation level of the PDCCH carrying the first downlink control information; content for indicating an offset amount and an offset direction between the location index number of the PDCCH carrying the second downlink control information in the search subspace and the location index number of the PDCCH carrying the first downlink control information in the search subspace; content for indicating an index number of a combination formed of the aggregation level of the PDCCH carrying the second downlink control information and the aggregation level of the PDCCH carrying the first downlink control information; content for indicating an index number of a combination formed of the location index number of the PDCCH carrying the second downlink control information in the search subspace and the location index number of the PDCCH carrying the first downlink control information in the search subspace; content for indicating an index number of a candidate PDCCH location where the PDCCH carrying the second downlink control information is located, wherein the candidate PDCCH location is a location in all search subspaces that can be used for setting the PDCCH; and content for indicating an offset amount and an offset direction between an index number of the candidate PDCCH location where the PDCCH carrying the second downlink control information is located and an index number of a candidate PDCCH location where the PDCCH carrying the first downlink control information is located.

As an example, the first downlink control information and the second downlink control information may be carried on different PDCCHs, i.e., the PDCCH carrying the first downlink control information and the PDCCH carrying the second downlink control information may be different PDCCHs. Furthermore, as an example, the PDCCH carrying the first downlink control information and the PDCCH carrying the second downlink control information may be transmitted in the same one subframe or slot, which will be described in detail below in the first embodiment. As another example, the PDCCH carrying the first downlink control information and the PDCCH carrying the second downlink control information may be transmitted in different subframes or slots, which will be described in detail below in the second embodiment.

As an example, when the PDCCH carrying the first downlink control information and the PDCCH carrying the second downlink control information are different PDCCHs, the step S10 may include: detecting the PDCCH carrying the first downlink control information blindly in one subframe or slot to acquire the first downlink control information; then performing blind detection on the PDCCH carrying the second downlink control information based on related information of the first downlink control information in a subframe or slot used for transmitting the PDCCH carrying the second downlink control information, to acquire the second downlink control information. It should be understood that the one subframe or slot and the subframe or slot used for transmitting the PDCCH carrying the second downlink control information are the same one subframe or slot, or are different subframes or slots.

As an example, when the one subframe or slot and the subframe or slot used for transmitting the PDCCH carrying the second downlink control information are different subframes or slots, the detecting method of the physical downlink control channel according to an exemplary embodiment of the present invention may further include: determining a subframe or slot used for transmitting the PDCCH carrying the second downlink control information from among subframes or slots subsequent to the one subframe or slot.

As an example, the performing blind detection on the PDCCH carrying the second downlink control information based on the related information of the first downlink control information may include: determining the aggregation level of the PDCCH carrying the second downlink control information and/or the location of the PDCCH carrying the second downlink control information in the search subspace, based on the related information of the first downlink control information; then performing blind detection on the PDCCH carrying the second downlink control information in a location, which is defined by the determined aggregation level and/or the location in the search subspace, in the subframe or slot used for transmitting the PDCCH carrying the second downlink control information, to acquire the second downlink control information. According to an exemplary embodiment of the present invention, the range of blind detection on the PDCCH carrying the second downlink control information is narrowed down based on the related information of the first downlink control information, thereby the maximum number of blind detections performed on the PDCCH carrying the second downlink control information may be reduced.

As an example, the determining the aggregation level of the PDCCH carrying the second downlink control information and/or the location of the PDCCH carrying the second downlink control information in the search subspace based on the related information of the first downlink control information may include: determining the aggregation level of the PDCCH carrying the second downlink control information and/or the location of the PDCCH carrying the second downlink control information in the search subspace, based on the content in the specific field in the first downlink control information.

As another example, the determining the aggregation level of the PDCCH carrying the second downlink control information and/or the location of the PDCCH carrying the second downlink control information in the search subspace based on the related information of the first downlink control information may include: determining the aggregation level of the PDCCH carrying the second downlink control information and/or the location of the PDCCH carrying the second downlink control information in the search subspace based on the content in the specific field in the first downlink control information and the aggregation level of the PDCCH carrying the first downlink control information and/or the location of the PDCCH carrying the first downlink control information in the search subspace.

As another example, the determining the aggregation level of the PDCCH carrying the second downlink control information and/or the location of the PDCCH carrying the second downlink control information in the search subspace based on the related information of the first downlink control information may include: calculating the determining the aggregation level of the PDCCH carrying the second downlink control information and/or the location of the PDCCH carrying the second downlink control information in the search subspace based on the aggregation level of the PDCCH carrying the first downlink control information and/or the location of the PDCCH carrying the first downlink control information in the search subspace, by using a location correlation function. Furthermore, it should be understood that the determining the aggregation level of the PDCCH carrying the second downlink control information and/or the location of the PDCCH carrying the second downlink control information in the search subspace based on the related information of the first downlink control information may be implemented by other appropriated ways, there is no limitation thereon in present invention.

As an example, when the one subframe or slot and the subframe or slot used for transmitting the PDCCH carrying the second downlink control information are different subframes or slots, the detecting method of the physical downlink control channel according to an exemplary embodiment of the present invention may further include: transmitting blind detection feedback information to a corresponding base station after performing blind detection on the PDCCH carrying the second downlink control information, wherein when the PDCCH carrying the second downlink control information is detected, blind detection feedback information for indicating that the PDCCH carrying the second downlink control information is detected is transmitted to the corresponding base station; and when no PDCCH carrying the second downlink control information is detected in the subframe or slot used for transmitting the PDCCH carrying the second downlink control information, blind detection feedback information for indicating that no PDCCH carrying the second downlink control information is detected is transmitted to the corresponding base station.

As an example, the transmitting blind detection feedback information to a corresponding base station may include: transmitting the blind detection feedback information to the corresponding base station, along with the transmitted uplink data or feedback downlink data Acknowledge information (i.e., ACK/NACK information, Acknowledge/Non-Acknowledge information).

In addition, as an example, the first downlink control information and the second downlink control information may be carried on the same one PDCCH, i.e., the PDCCH carrying the first downlink control information and the PDCCH carrying the second downlink control information may be the same one PDCCH. In other words, as long as the same one PDCCH is detected, the first downlink control information and the second downlink control information may be acquired simultaneously, the location where the PDCCH for carrying the second downlink control information is detected is also the location where the PDCCH for carrying the first downlink control information is detected, thus the downlink control information for uplink scheduling grant and the downlink control information for downlink scheduling may be simultaneously acquired with a lower blind detection complexity.

As an example, in the same one PDCCH, the first downlink control information and the second downlink control information may be contained in one third downlink control information. Herein, the third downlink control information is capable of indicating the first downlink control information and the second downlink control information. As an example, the step S10 may include: performing blind detection on the PDCCH based on a length of the third downlink control information in one subframe or slot, to acquire the third downlink control information; and then obtaining the first downlink control information and the second downlink control information based on the acquired third downlink control information. The example will be described in detail below in the third embodiment.

As an example, the length of the third downlink control information may include a first length and a second length, and a length of unidirectional downlink control information may include the second length and a third length, wherein the first length is longer than the second length, and the second length is longer than the third length. It should be understood that the unidirectional downlink control information may include the downlink control information for uplink scheduling grant and the downlink control information for downlink scheduling.

As another example, the length of the third downlink control information may only include a fourth length, and the length of the unidirectional downlink control information may only include a fifth length, wherein the fourth length is longer than the fifth length.

As an example, the performing blind detection on the PDCCH to acquire the third downlink control information may include: performing blind detection on the PDCCH, in a search subspace of the aggregation level corresponding to the length of the third downlink control information in one subframe or slot, to acquire the third downlink control information.

As an example, the third downlink control information may only include only one set of resource allocation fields for indicating same resources used in uplink and downlink data transmissions. In other words, the first downlink control information and the second downlink control information contained in the third downlink control information share one set of resource allocation fields.

In step S20, uplink data transmission and downlink data transmission are performed with the base station according to the acquired first downlink control information and second downlink control information. As an example, the uplink data transmission and the downlink data transmission may be performed with the base station on the same time-frequency resource according to the acquired first downlink control information and second downlink control information.

Hereinafter, the detecting method of the physical downlink control channel according to an exemplary embodiment of the present invention will be described in detail with reference to a first embodiment to a third embodiment.

First Embodiment

Figure 2:
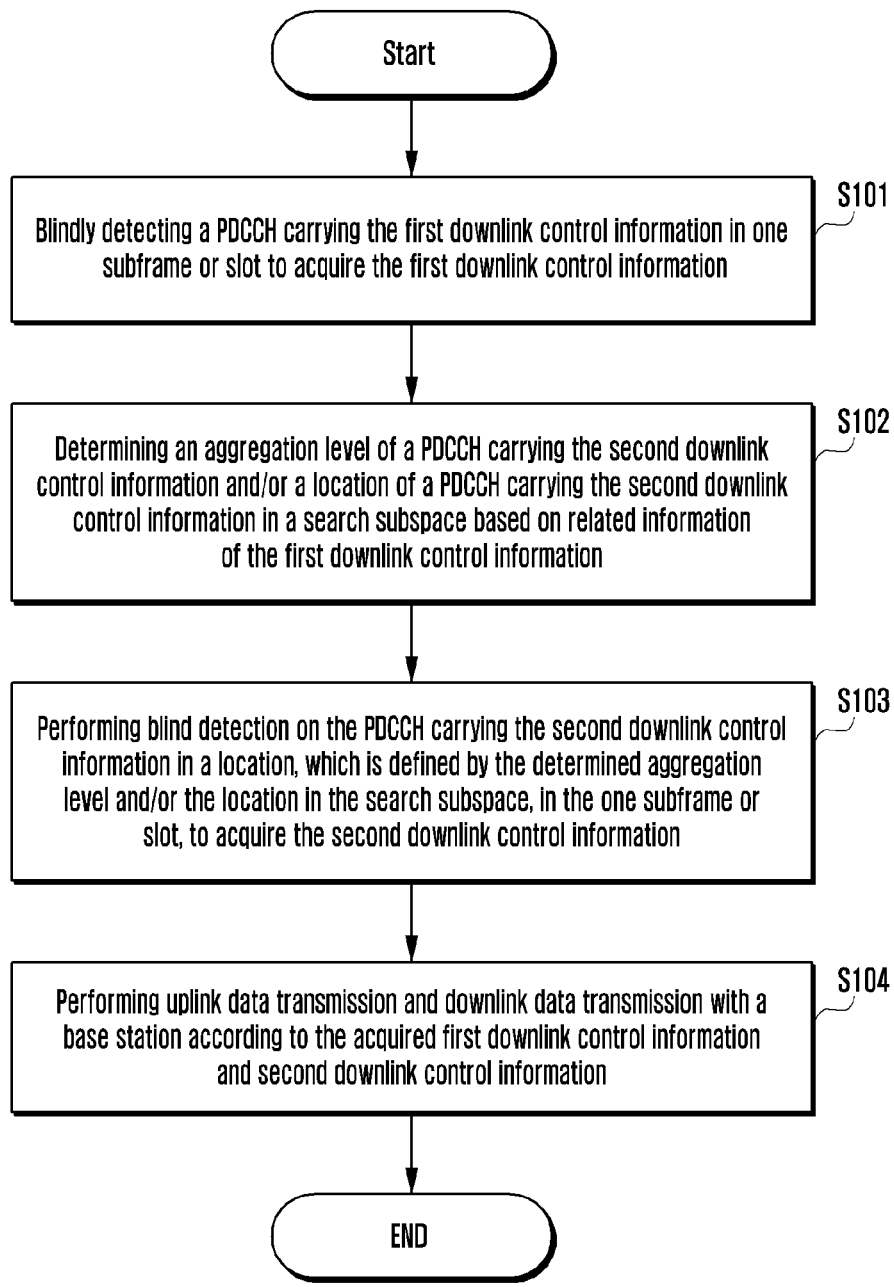
FIG. 2 illustrates a flowchart of a detecting method of a physical downlink control channel according to the first embodiment of the present invention.

A detecting method of a physical downlink control channel according to present embodiment is shown in FIG. 2. Here, the PDCCH carrying the first downlink control information (hereinafter, also referred to as a first PDCCH) and the PDCCH carrying the second downlink control information (hereinafter, also referred to as a second PDCCH) are different PDCCHs, and the first PDCCH and the second PDCCH are transmitted in the same one subframe or slot, i.e., the base station performs synchronous correlation transmission in the same one subframe or slot for two PDCCHs (i.e., two PDCCHs respectively carrying downlink control information for uplink scheduling grant and downlink control information for downlink scheduling) of the same user equipment.

In particular, in step S101, the PDCCH carrying the first downlink control information is detected in one subframe or slot to acquire the first downlink control information.

In step S102, an aggregation level of a PDCCH carrying the second downlink control information and/or a location of a PDCCH carrying the second downlink control information in a search subspace are determined based on the related information of the first downlink control information.

In step S103, blind detection is performed on the PDCCH carrying the second downlink control information in a location, which is defined by the determined aggregation level and/or the location in the search subspace, in the one subframe or slot, to acquire the second downlink control information. According to the embodiment, synchronous correlation detection may be implemented on the PDCCH for uplink scheduling grant and the PDCCH for downlink scheduling, thus the maximum number of blind detections performed on the two PDCCHs are effectively reduced and the number of invalid blind detections are reduced.

As an example, there may be three kinds of correlation manners between the location of the second PDCCH (i.e., the location where the second PDCCH is detected) and the related information of the first downlink control information: the first correlation manner is to use a location correlation function for performing implicit correlation. In particular, a part of or all the location information of the first PDCCH has a certain functional relationship with a part of or all the location information of the second PDCCH, and after the location information of one PDCCH is known, the location information of another PDCCH may be calculated according to the location correlation function. As an example, the location correlation function may be either defaulted by the two parties (i.e., the user equipment and the base station), or may be notified by the base station. For example, the location correlation function notified by the base station may be acquired when the user equipment accesses to the cell.

Corresponding to the first correlation manner, in step S102, the aggregation level of the second PDCCH and/or the location of the second PDCCH in the search subspace may be calculated based on the aggregation level of the first PDCCH and/or the location of the first PDCCH in the search subspace, by using the location correlation function. In particular, the location information of the second PDCCH may be calculated according to the known location correlation function from the aggregation level $L_1$ of the first PDCCH and/or the location index number $k_1$ of the first PDCCH in the search subspace corresponding to the aggregation level $L_1$, so as to perform blind detection on the second PDCCH according to these location information. Here, the location information of the second PDCCH that can be deduced may be the aggregation level $L_2$ of the second PDCCH, or may be the location index number $k_2$ in the search subspace corresponding to the aggregation level of the second PDCCH, or may also be both the above.

The second correlation manner is to indicate the location information of the second PDCCH in the first downlink control information explicitly, the indicated location information may be only the aggregation level of the second PDCCH, or may be only the location of the second PDCCH in the search subspace corresponding to the aggregation level thereof, or may include the both simultaneously. That is, after the first PDCCH is detected, the location information of the second PDCCH may be directly acquired based on the first downlink control information, and then the second PDCCH may be detected only on the candidate PDCCH locations meeting these location information conditions, thus the number of invalid blind detections may be effectively controlled.

Corresponding to the second correlation manner, in step S102, the aggregation level of the PDCCH carrying the second downlink control information and/or the location of the PDCCH carrying the second downlink control information in the search subspace may be determined based on the content in the specific field in the first downlink control information. In particular, after the first PDCCH is detected, the location information of the second PDCCH may be read from a corresponding DCI content, so as to detect the second PDCCH blindly according to these location information. The read location information about the second PDCCH may be the aggregation level $L_2$ of the second PDCCH, or may be the location index number $k_2$ in the search subspaces corresponding to the aggregation level of the second PDCCH, or may also be both the above.

As an example, an index number of a combination formed of the aggregation level of the second PDCCH and the aggregation level of the first PDCCH may be read from the corresponding DCI content; and/or, an index number of a combination formed of the location index number of the second PDCCH in the search subspace and the location index number of the first PDCCH in the search subspace may be read from the corresponding DCI content. For example, in a LTE system, all combinations that the aggregation levels of the two PDCCHs can form may include: (1,1), (1,2), (1,4), (1,8), (2,1), (2,2), (2,4), (2,8), (4, 1), (4, 2), (4, 4), (4, 8), (8, 1), (8, 2), (8, 4), (8, 8), and an index number of each combination is a positive integer starting from 0 in sequence (i.e., 0, 1, 2, 3 . . . , 16), therefore, the aggregation level of the second PDCCH may be determined according to the index number of the combination formed of the aggregation levels of the two PDCCHs acquired from the first downlink control information. For example, when the acquired index number indicating the combination formed of the aggregation levels of the two PDCCHs is 2, the aggregation level of the second PDCCH may be determined as 4.

Figure 3:
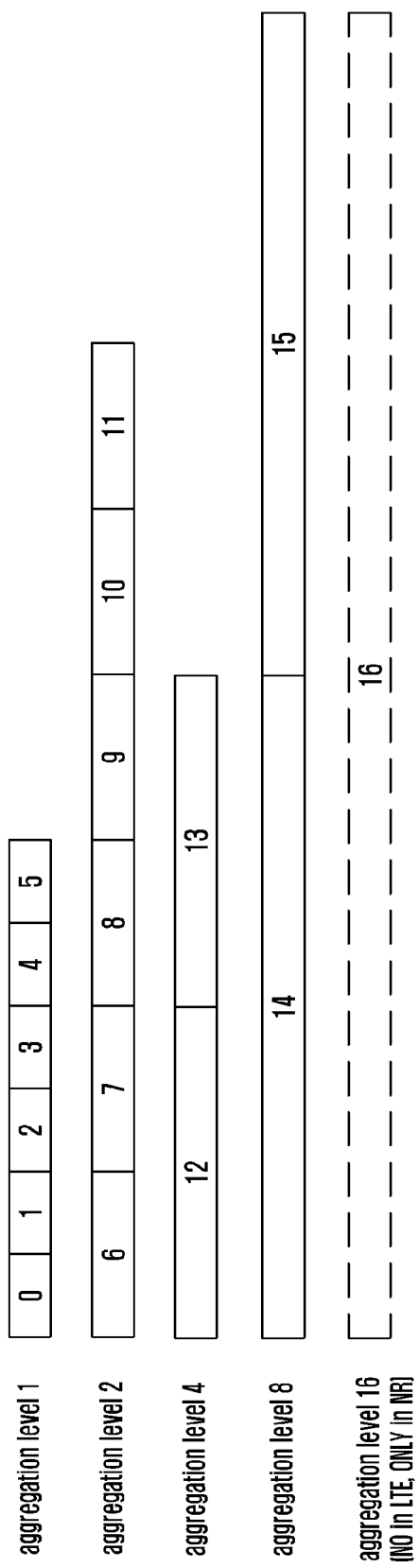
FIG. 3 illustrates an example of joint encoding an aggregation level of the PDCCH and a location of the PDCCH in a search subspace according to an exemplary embodiment of the present invention.

As an example, the index number of a candidate PDCCH location where the second PDCCH is located may be read from the corresponding DCI content. In particular, the aggregation level and the location in the search subspace may be joint encoded. One joint encoding manner is shown as FIG. 3, it is assumed that there are $N_{PDCCH}$ possible candidate PDCCH locations in all search subspaces in the user-equipment-specific search space (for example, $N_{PDCCH}$=16 for the LTE systems, and $N_{PDCCH}$=17 for NR systems), the $N_{PDCCH}$ candidate PDCCH locations may be non-repeatedly numbered using any suitable manner (for example, as shown in FIG. 3, the index number of each candidate PDCCH location is positive integer starting from 0 in sequence), and then the index number of the candidate PDCCH location where the second PDCCH is located may be indicated either using a $N_{PDCCH}$-bit Bitmap in DCI or using ceil$\{$log $2(N_{PDCCH})\}$ bits, or other encoding manners in which encoding result corresponds to the candidate PDCCH location one-by-one may be used to implement the joint encoding of the aggregation level of the PDCCH and the location of the PDCCH in the search subspace, to indicate the location information of the PDCCH in the DCI.

The third correlation manner is to indicate the location information of the second PDCCH in the first downlink control information implicitly. For example, at least one of the aggregation level $L_2$ of the second PDCCH being the same as the aggregation level $L_1$ of the first PDCCH, the location index number $k_2$ of the second PDCCH in the search subspace being the same as the location index number $k_1$ of the first PDCCH in the search subspace, an offset amount and an offset direction between the aggregation level $L_2$ of the second PDCCH and aggregation level $L_1$ of the first PDCCH, an offset amount and an offset direction between the location index number $k_2$ of the second PDCCH in the search subspace and the location index number $k_1$ of the first PDCCH in the search subspace, an offset amount and an offset direction between the index number of the candidate PDCCH location where the second PDCCH is located and the index number of the candidate PDCCH location where the first PDCCH is located, may be indicated.

Corresponding to the third correlation manner, in step S102, the aggregation level of the second PDCCH and/or the location of the second PDCCH in the search subspace may be determined based on the content in the specific field in the first downlink control information and the aggregation level of the first PDCCH and/or the location of the first PDCCH in the search sub space.

As an example, in the second correlation manner or the third correlation manner, the location information of the second PDCCH may be explicitly or implicitly indicated by the content in a specific field in the first downlink control information by using various suitable manners. For example, an N-bit bitmap may be used to indicate the aggregation level $L_2$ of the second PDCCH (N is the number of all aggregation level types, for example, in the LTE system, N may be 4, and in the NR system, N may be 5) in a specific field in the first downlink control information; or ceil$\{$log $2(N)\}$ bits may be used to indicate the aggregation level $L_2$ of the second PDCCH; or, an M-bit bitmap may be used to indicate an absolute location of the second PDCCH in the search subspace (M indicates the maximum value of the number of the candidate PDCCH locations in each search subspace); or, ceil$\{$log $2(M)\}$ bits may be used to indicate the absolute location of the second PDCCH in the search subspace where it is located; or, it is also possible to simply use 1 bit to indicate that the two PDCCHs use the same aggregation level; or, it is also possible to use several bits to indicate an offset amount and an offset direction between the aggregation levels of the two PDCCHs. For example, the aggregation level of the second PDCCH is offset to the right with respect to the aggregation level of the first PDCCH by 1 aggregation level, thus if the aggregation level of the first PDCCH is 1, the aggregation level of the second PDCCH may be calculated as 2 accordingly.

Regardless of which correlation manner is used, according to the amount of acquired location information of the second PDCCH, the location information of the second PDCCH that may be obtained has four possibilities, which respectively are that: the location information of the second PDCCH cannot be obtained, only the aggregation level $L_2$ of the second PDCCH is obtained, only the location index number $k_2$ of the second PDCCH in the search subspace where it is located is obtained, and the L2 and the $k_2$ are obtained simultaneously. It should be understood that, as the obtained location information of the second PDCCH are different, the blind detection manner and the maximum number of blind detections performed on the second PDCCH are also different.

As an example, if only the aggregation level $L_2$ of the second PDCCH can be obtained, in step S103, the blind detection on the second PDCCH may be performed only in the search subspace corresponding to the aggregation level $L_2$, the degree of freedom of blind detection includes the location index number in the search subspace (i.e., the candidate PDCCH location in the search subspace) and a DCI length (i.e., the DCI format).

As an example, if only the location index number $k_2$ of the second PDCCH in the search subspace can be obtained, in step S103, based on the number of the candidate PDCCH locations in each search subspace, when search subspaces having sufficient candidate PDCCH locations are selected from all search subspaces (for example, if the location index numbers in each search subspace are positive integers starting from 0 in sequence, the search subspaces in which the number of candidate PDCCH locations is greater than or equal to a $(k_2+1)$ are selected from the all search subspaces), and the blind detection on the second PDCCH may be performed in the selected search subspaces. Since the location index number $k_2$ in the search subspace is known, the degree of freedom of blind detection includes the aggregation level and the DCI length.

As an example, if the $L_2$ and the $k_2$ can be determined simultaneously, in step S103, the blind detection may be performed only on the $(k_2+1)$th candidate PDCCH location in the search subspace corresponding to the aggregation level $L_2$, and the degree of freedom of blind detection only includes the DCI length. I.e., the location of the PDCCH in the subframe or slot may be uniquely determined according to the aggregation level of the PDCCH and the location of the PDCCH in the search subspace corresponding to the aggregation level.

As an example, if it is impossible to deduce any location information of the second PDCCH from the first PDCCH, the blind detection of the second PDCCH will be performed on all remaining candidate PDCCH locations after the first PDCCH is detected successfully. The degree of freedom of blind detection includes the aggregation level, the candidate PDCCH locations and the DCI length.

In particular, when the second correlation manner or the third correlation manner is adopted, if the sequence for blindly detecting the PDCCH is not specified in advance (for example, it is specified in advance that the PDCCH for the downlink scheduling is to be detected first, or it is specified in advance that the PDCCH for the uplink scheduling grant is to be detected first), since which PDCCH is detected first is unknown, content carried by the PDCCH for uplink grant scheduling and content carried by the PDCCH for downlink scheduling should be able to indicate the location information of another PDCCH. In this way, regardless of which PDCCH is detected first, the location information of the other PDCCH may be acquired based on the DCI carried by the PDCCH that has been detected. If the sequence for blindly detecting the PDCCH is specified in advance, i.e., it is specified in advance that the PDCCH for the downlink scheduling is to be detected first or the PDCCH for the uplink scheduling grant is to be detected first, it is only needed that a condition that the DCI carried by the PDCCH that is detected first may indicate the location information of the PDCCH that is detected later is satisfied, without needing that both the DCIs carried by the two PDCCHs may indicate the location information of each other. Taking the case that blind detection of the PDCCH for downlink scheduling is performed first as an example (it should be understood that, the case that blind detection of the PDCCH for uplink grant scheduling is performed first is the same), after the PDCCH for downlink scheduling is detected, in conjunction with the specific correlation manner and/or the location information thereof, the location information of the PDCCH for uplink scheduling grant may be acquired. Therefore, when the blind detection is performed on the PDCCH for uplink scheduling grant, the blind detection of the PDCCH for uplink scheduling grant may be performed only on the candidate PDCCH locations meeting the known location information conditions, thus the number of invalid blind detections of the PDCCH carrying the downlink control information for the uplink scheduling grant may be effectively reduced.

In step S104, uplink data transmission and downlink data transmission are performed with the base station according to the acquired first downlink control information and second downlink control information.

Second Embodiment

Figure 4:
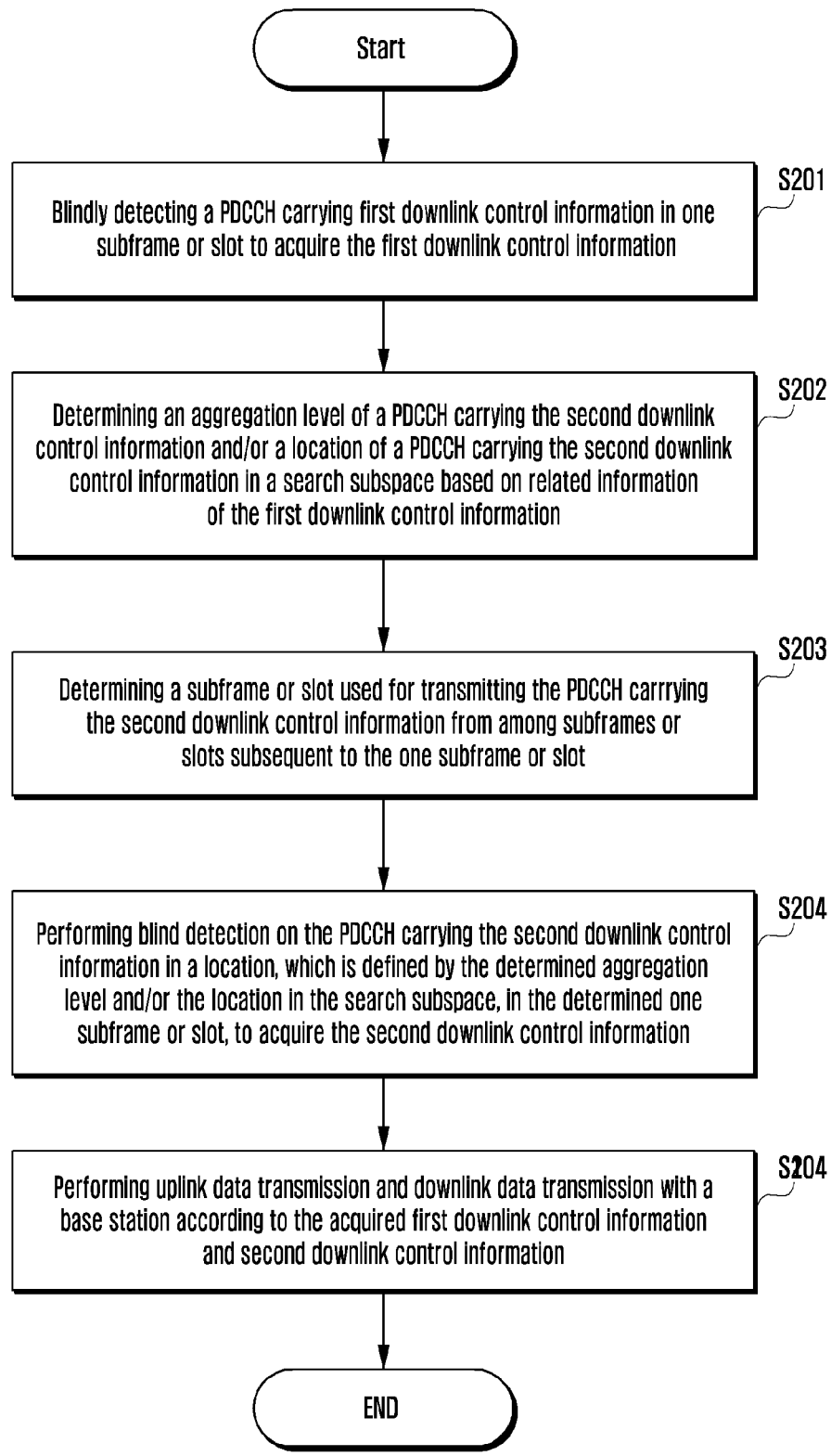
FIG. 4 illustrates a flowchart of a detecting method of a physical downlink control channel according to the second embodiment of the present invention.

A detecting method of a physical downlink control channel according to present embodiment is as shown in FIG. 4. Here, the PDCCH carrying the first downlink control information (hereinafter, also referred to as a first PDCCH) and the PDCCH carrying the second downlink control information (hereinafter, also referred to as a second PDCCH) are different PDCCHs, and the first PDCCH and the second PDCCH are transmitted in different subframes or slots, i.e., the base station performs asynchronous correlation transmission in different subframes or slots for two PDCCHs (i.e., two PDCCHs respectively carrying downlink control information for uplink scheduling grant and downlink control information for downlink scheduling) of the same user equipment.

In particular, in step S201, the PDCCH carrying the first downlink control information is detected in one subframe or slot to acquire the first downlink control information.

In step S202, an aggregation level of the PDCCH carrying the second downlink control information and/or a location of the PDCCH carrying the second downlink control information in the search subspace are determined based on the related information of the first downlink control information.

In step S203, a subframe or slot used for transmitting the PDCCH carrying the second downlink control information is determined from among subframe or slots subsequent to the one subframe or slot.

In particular, the base station transmits a PDCCH in one direction (i.e., the first PDCCH) to the user equipment in one subframe or slot first, and transmits a PDCCH in another direction (i.e., the second PDCCH) to the user equipment after several subframes or slots, the location of the second PDCCH (i.e. the location where the second PDCCH is detected) has a certain correlation with the related information of the first downlink control information carried by the first PDCCH. If the two PDCCHs do not have a fixed timing relationship, a time interval (i.e., delay amount) between the two PDCCHs may be indicated in the downlink control information carried by the PDCCH which is transmitted first, so that the user equipment determines the subframe or slot used for transmitting the second PDCCH based on the time interval. If the two PDCCHs have a fixed timing relationship (i.e., default timing relationship between the user equipment and the base station), the time interval between the two PDCCHs may not be indicated in the downlink control information carried by the PDCCH which is transmitted first, and the user equipment determines the subframe or slot used for transmitting the second PDCCH based on the default time interval between the first PDCCH and the second PDCCH.

In step S204, blind detection is performed on the PDCCH carrying the second downlink control information in a location, which defined by the determined aggregation level and/or the location in the search subspace, in the determined one subframe or slot, to acquire the second downlink control information. According to present embodiment, asynchronous correlation detection on the PDCCH for uplink scheduling grant and the PDCCH for downlink scheduling may be implemented, thus the maximum number of blind detections performed on the two PDCCHs are effectively reduced and the number of invalid blind detections are reduced.

As an example, there may be three kinds of correlation manners between the location of the second PDCCH (i.e., the location where the second PDCCH is detected) and the related information of the first downlink control information: the first correlation manner is to use a location correlation function for performing implicit correlation. In particular, a part of or all the location information of the first PDCCH has a certain functional relationship with a part of or all the location information of the second PDCCH. After the location information of one PDCCH is known, the location information of another PDCCH may be calculated according to the location correlation function. As an example, the location correlation function may be either defaulted by the two parties (i.e., the user equipment and the base station), or may be notified by the base station. For example, the location correlation function notified by the base station may be acquired when the user equipment accesses to the cell.

Corresponding to the first correlation manner, in step S202, the aggregation level of the second PDCCH and/or the location of the second PDCCH in the search subspace may be calculated based on aggregation level of the first PDCCH and/or the location of the first PDCCH in the search subspace, by using a location correlation function. In particular, the location information of the second PDCCH may be calculated according to the known location correlation function from the aggregation level $L_1$ of the first PDCCH and/or the location index number $k_1$ of the first PDCCH in the search subspace corresponding to the aggregation level $L_1$, so as to perform blind detection on the second PDCCH according to these location information. Here, the second PDCCH location information that can be deduced may be the aggregation level $L_2$ of the second PDCCH, or may be the location index number $k_2$ of the second PDCCH in the search subspace corresponding to the aggregation level, or may also be both the above.

The second correlation manner is to indicate the location information of the second PDCCH in the first downlink control information explicitly, the indicated location information may be only the aggregation level of the second PDCCH, or may be only the location of the second PDCCH in the search subspace corresponding to the aggregation level the second PDCCH, or may include the both simultaneously. That is, after the first PDCCH is detected, the location information of the second PDCCH may be directly acquired based on the first downlink control information, and then the second PDCCH may be detected only on the candidate PDCCH locations that meet the these the location information conditions, thus the number of invalid blind detections may be effectively controlled.

Corresponding to the second correlation manner, in step S202, the aggregation level of the PDCCH carrying the second downlink control information and/or the location of the PDCCH carrying the second downlink control information in the search subspace may be determined based on the content in the specific field in the first downlink control information. In particular, after the first PDCCH is detected, the location information of the second PDCCH may be read from a corresponding DCI content, so as to perform blind detection on the second PDCCH according to these location information. The read location information about the second PDCCH may be the aggregation level $L_2$ of the second PDCCH, or may be the location index number $k_2$ in the search subspaces corresponding to the aggregation level of the second PDCCH, or may also be both the above.

As an example, an index number of a combination formed of the aggregation level of the second PDCCH and the aggregation level of the first PDCCH may be read from the corresponding DCI content; and/or, an index number of a combination formed of the location index number of the second PDCCH in the search subspace and the location index number of the first PDCCH in the search subspace may be read from the corresponding DCI content.

As an example, the index number of the candidate PDCCH location where the second PDCCH is located may be read from the corresponding DCI content. In particular, the aggregation level and the location in the search subspace may be joint encoded, and one joint encoding manner is shown as FIG. 3. Then the index number of the candidate PDCCH location where the second PDCCH is located may be indicated either using a $N_{PDCCH}$-bit Bitmap in DCI or using $\text{ceil}\{\log 2(N_{PDCCH})\}$ bits, or other encoding manners in which encoding result corresponds to the candidate PDCCH location one-by-one may be used to implement the joint encoding of the aggregation level of the PDCCH and the location of the PDCCH in the search subspace, to indicate the location information of the PDCCH in the DCI.

The third correlation manner is to indicate the location information of the second PDCCH in the first downlink control information implicitly. For example, at least one of an a aggregation level $L_2$ of the second PDCCH being the same as an aggregation level $L_1$ of the first PDCCH, the location index number $k_2$ of the second PDCCH in the search subspace being the same as the location index number $k_1$ of the first PDCCH in the search subspace, an offset amount and an offset direction between the aggregation level $L_2$ of the second PDCCH and aggregation level $L_1$ of the first PDCCH, an offset amount and an offset direction between the location index number $k_2$ of the second PDCCH in the search subspace and the location index number $k_1$ of the first PDCCH in the search subspace, an offset amount and an offset direction between the index number of the candidate PDCCH location where the second PDCCH is located and the index number of the candidate PDCCH location where the first PDCCH is located, may be indicated.

Corresponding to the third correlation manner, in step S202, the aggregation level of the second PDCCH and/or the location of the second PDCCH in the search subspace may be determined based on the content in the specific field in the first downlink control information and the aggregation level of the first PDCCH and/or the location of the first PDCCH in the search sub space.

As an example, in the second correlation manner or the third correlation manner, the location information of the second PDCCH may be explicitly or implicitly indicated by the content in a specific field in the first downlink control information by using various suitable manners. For example, an N-bit bitmap may be used to indicate the aggregation level $L_2$ of the second PDCCH (N is the number of all aggregation level types, for example, in the LTE system, N may be 4, and in the NR system, N may be 5) in a specific field in the first downlink control information; or ceil{log 2(N)} bits may be used to indicate the aggregation level $L_2$ of the second PDCCH; or, an M-bit bitmap may be used to indicate an absolute location of the second PDCCH in the search subspace (M indicates the maximum value of the number of the candidate PDCCH locations in each search subspace); or, ceil{log 2(M)} bits may be used to indicate the absolute location of the second PDCCH in the search subspace where it is located; or, it is also possible to simply use 1 bit to indicate that the two PDCCHs use the same aggregation level; or, it is also possible to use several bits to indicate an offset amount and an offset direction between the aggregation levels of the two PDCCHs. For example, the aggregation level of the second PDCCH is offset to the right with respect to the aggregation level of the first PDCCH by one aggregation level, thus if the aggregation level of the first PDCCH is 1, the aggregation level of the second PDCCH may be calculated as 2 accordingly.

Regardless of which correlation manner is used, according to the amount of the obtained location information of the second PDCCH, the location information of the second PDCCH that may be obtained has four possibilities, which respectively are that: the location information of the second PDCCH cannot be obtained, only the aggregation level $L_2$ of the second PDCCHs is obtained, only the location index number $k_2$ of the second PDCCH in the search subspace where it is located is obtained, and the $L_2$ and the $k_2$ are obtained simultaneously. It should be understood that, as the obtained location information of the second PDCCH are different, the blind detection manner and the maximum number of blind detections performed on the second PDCCH are also different.

As an example, if only the aggregation level $L_2$ of the second PDCCHs can be obtained, in step S204, the blind detection on the second PDCCH may be performed only in the search subspace corresponding to the aggregation level $L_2$, the degree of freedom of blind detection includes the location index number in the search subspace (i.e., the candidate PDCCH location in the search subspace) and a DCI length (i.e., the DCI format).

As an example, if only the location index number $k_2$ of the second PDCCH in the search subspace can be obtained, in step S204, based on the number of the candidate PDCCH locations in each search subspace, when search subspaces having sufficient candidate PDCCH locations are selected from all search subspaces (for example, if the location index numbers in each search subspace are positive integers starting from 0 in sequence, the search subspaces in which the number of candidate PDCCH locations is greater than or equal to a ($k_2$+1) are selected from the all search subspaces), and the blind detection on the second PDCCH may be performed in the selected search subspaces. Since the location index number $k_2$ in the search subspace is known, the degree of freedom of blind detection includes the aggregation level and the DCI length.

As an example, if the $L_2$ and the $k_2$ can be determined simultaneously, in step S204, the blind detection may be performed only on the ($k_2$+1)th candidate PDCCH location in the search subspace corresponding to the aggregation level $L_2$, and the degree of freedom of blind detection only includes the DCI length. I.e., the location of the PDCCH in the subframe or slot may be uniquely determined according to the aggregation level of the PDCCH and the location of the PDCCH in the search subspace corresponding to the aggregation level.

As an example, if it is impossible to deduce any location information of the second PDCCH from the first PDCCH, the blind detection of the second PDCCH will be performed on all candidate PDCCH locations in the determined subframe or slot used for transmitting the second PDCCH after the first PDCCH is detected successfully. The degree of freedom of blind detection includes the aggregation level, the candidate PDCCH locations and the DCI length.

In a PDCCH asynchronous correlation, since the location information of the second PDCCH transmitted at a later time is included in the first PDCCH transmitted in advance, i.e., the location of the second PDCCH has been determined in advance, in order to prevent the second PDCCH from being unable to be detected due to reduce of the detection performance of the second PDCCH, which is transmitted at a later time, caused by the rapid change of the channel state, the detecting method of the physical downlink control channel according to the present embodiment may further include: transmitting the blind detection feedback information to a corresponding base station after step S204, wherein when the PDCCH carrying the second downlink control information is detected, blind detection feedback information for indicating that the PDCCH carrying the second downlink control information is detected is transmitted to the corresponding base station; and when no PDCCH carrying the second downlink control information is detected in the subframe or slot used for transmitting the PDCCH carrying the second downlink control information, blind detection feedback information for indicating that no PDCCH carrying the second downlink control information is detected is transmitted to the corresponding base station. If the user equipment should have detected the second PDCCH which is transmitted at a later time but have not detected, the user equipment will feed back the blind detection feedback information about the second PDCCH which is transmitted at a later time, so as to ensure that the base station can quickly perform the re-transmission of the PDCCH for the second downlink control information; if the second PDCCH which is transmitted at a later time is successfully detected, the user equipment will also feedback the blind detection feedback information about the second PDCCH.

As an example, the blind detection feedback information for the PDCCH may be fed back in various appropriate ways, for example, if it does not need to report the downlink data acknowledge information at a certain previous time in the subframe or the slot used for uplink data transmission, the blind detection feedback information and uplink data may be multiplexed during the uplink data transmission; if it needs to report the downlink data acknowledge information at a certain previous time in the subframe or the slot used for uplink data transmission, 1 bit may be added after the downlink data acknowledge information to be reported to feed back the blind detection feedback information for the second PDCCH which is transmitted at a later time, or the blind detection feedback information may be added at an appropriate location in the downlink data acknowledge information to be reported.

Figure 5:
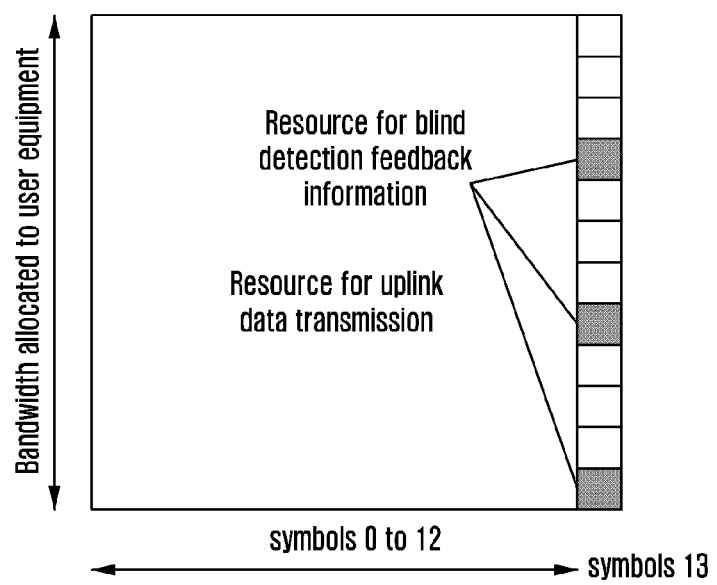
FIG. 5 illustrates an example of transmitting blind detection feedback information according to an exemplary embodiment of the present invention.

As a preferred example, the multiplexed transmission of the uplink data and the blind detection feedback information may be performed as the manner shown in FIG. 5, the blind detection feedback information may be mapped to an entire bandwidth allocated to the user equipment at a certain density on the last OFDM (Orthogonal Frequency Division Multiplexing) symbol of the subframe or slot used for uplink data transmission after being repeated, user-level scrambled and modulated, so as to make full use of the frequency diversity gain. After receiving the blind detection feedback information for the second PDCCH which is transmitted at a later time, if it is determined that the received blind detection feedback information indicates the failure of the detection of the second PDCCH detection which is transmitted at a later time, the base station may re-transmit the PDCCH for carrying the second downlink control information in a next subframe or slot, and re-transmit the downlink data.

In step S205, uplink data transmission and downlink data transmission are performed with the base station according to the acquired first downlink control information and second downlink control information.

Third Embodiment

Figure 6:
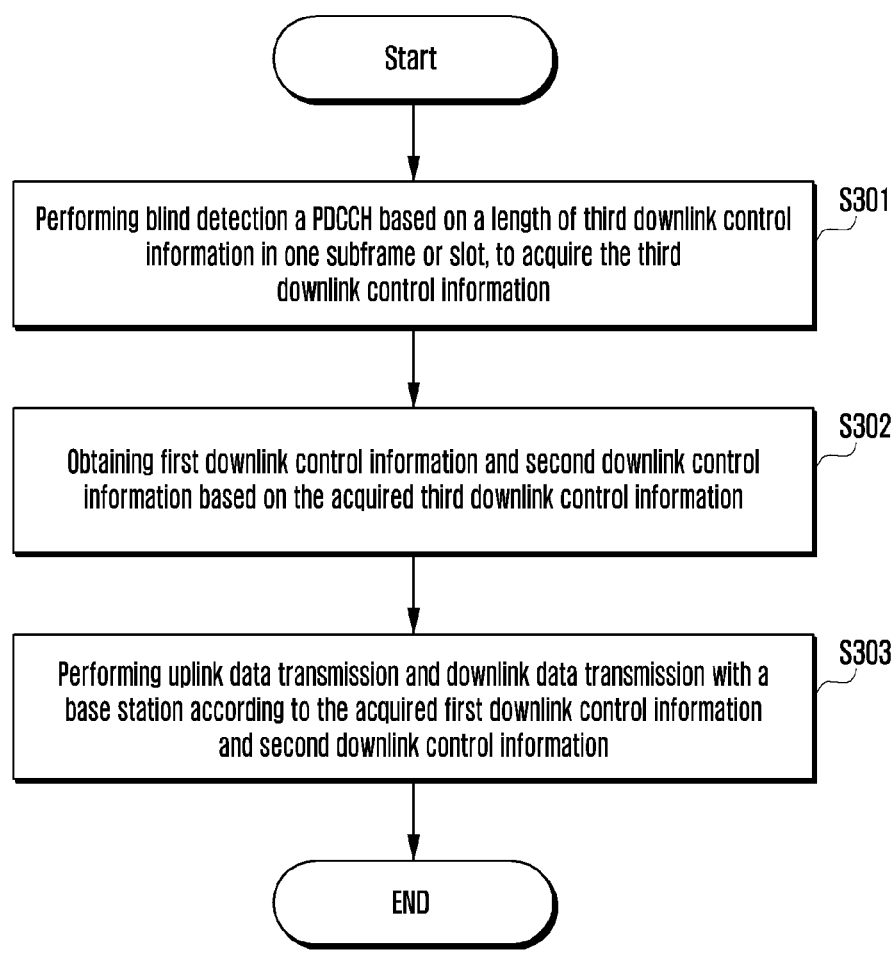
FIG. 6 illustrates a flowchart of a detecting method of a physical downlink control channel according to the third embodiment of the present invention.

A detecting method of a physical downlink control channel according to present embodiment is as shown in FIG. 6. Herein, the PDCCH carrying the first downlink control information and the PDCCH carrying the second downlink control information are the same one PDCCH, and in the same one PDCCH, the first downlink control information and the second downlink control information are contained in one third downlink control information.

In particular, in step S301, the blind detection is performed on the PDCCH based on a length of the third downlink control information in one subframe or slot, to acquire the third downlink control information.

In step S302, the first downlink control information and the second downlink control information are obtained based on the acquired third downlink control information.

The base station and the user equipment may default the PDCCH detection manner as the joint detection manner, or the base station may notify the user equipment that the PDCCH detection manner is the joint detection manner. Under the joint detection manner, one PDCCH may be used to simultaneously transmit the downlink control information for uplink scheduling grant and the downlink control information for downlink scheduling of the base station to the user equipment. The user equipment performs only one PDCCH blind detection on a search space specific to himself, and may obtain all downlink control information at the same time when the blind detection succeeds.

In order to reduce the number of blind detections, and be compatible with a DCI for unidirectional scheduling only, the DCI length may be defined as no more than 3 kinds.

Figure 7:
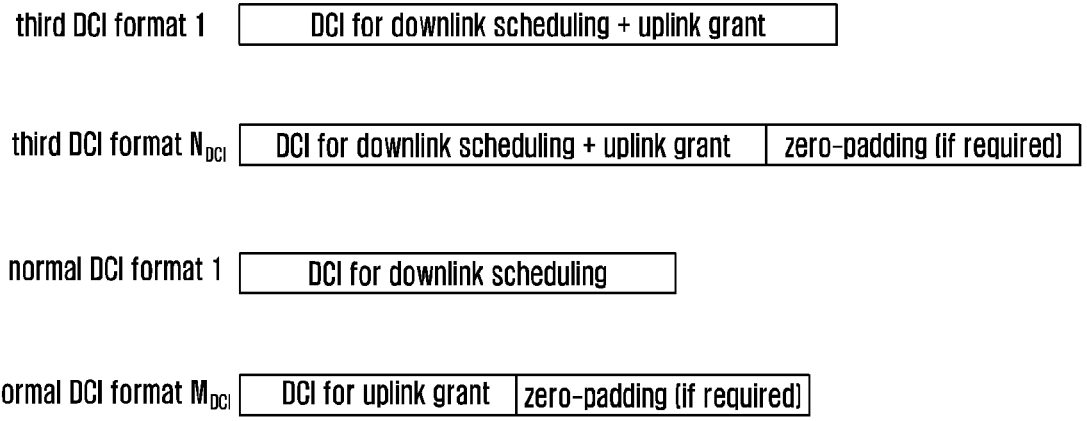
FIG. 7 illustrates one example of defining a DCI format according to an exemplary embodiment of the present invention.

As one example, if the DCI has two kinds of length, the format and the length of the DCI may be defined in a manner as shown in FIG. 7. $N_{DCI}$ third DCI formats may be defined, all the third DCI formats have the same length, and zero-padding is required if the length is insufficient. At the same time, in order to be compatible with the case of only unidirectional scheduling, $M_{DCI}$ normal unidirectional DCI formats may be defined at the same time. All the unidirectional DCI formats have the same length and the length of the unidirectional DCI format is different from the length of the third DCI format, and zero-padding is required if the length is insufficient. The user equipment may perform PDCCH blind detection by using the two DCI lengths. After the blind detection succeeds, if the blind-detected DCI is a third DCI, a ceil$\{\log 2(N_{DCI})\}$-bit field is read from the DCI to distinguish the third DCI is which kind of the third DCIs specifically; if a normal DCI is detected, a ceil$\{\log 2(M_{DCI})\}$-bit field is read from the DCI to distinguish the normal DCI is which kind of the unidirectional DCIs specifically.

Since the length of the third DCI is usually long, the base station must perform transmission at a higher aggregation level, and the blind detection of the PDCCH for carrying the third DCI may be performed only in several search subspaces with higher aggregation levels, and blind detection of the PDCCH for carrying the normal DCI is performed in the remaining search spaces with lower aggregation levels. The lowest aggregation level of the PDCCH carrying the third DCI may be notified by the base station, or may be a default value. Specifically, for a full-duplex user equipment, in the third DCI, there may be only one set of resource allocation fields for indicating the same resources used in uplink and downlink data transmissions.

Figure 8:
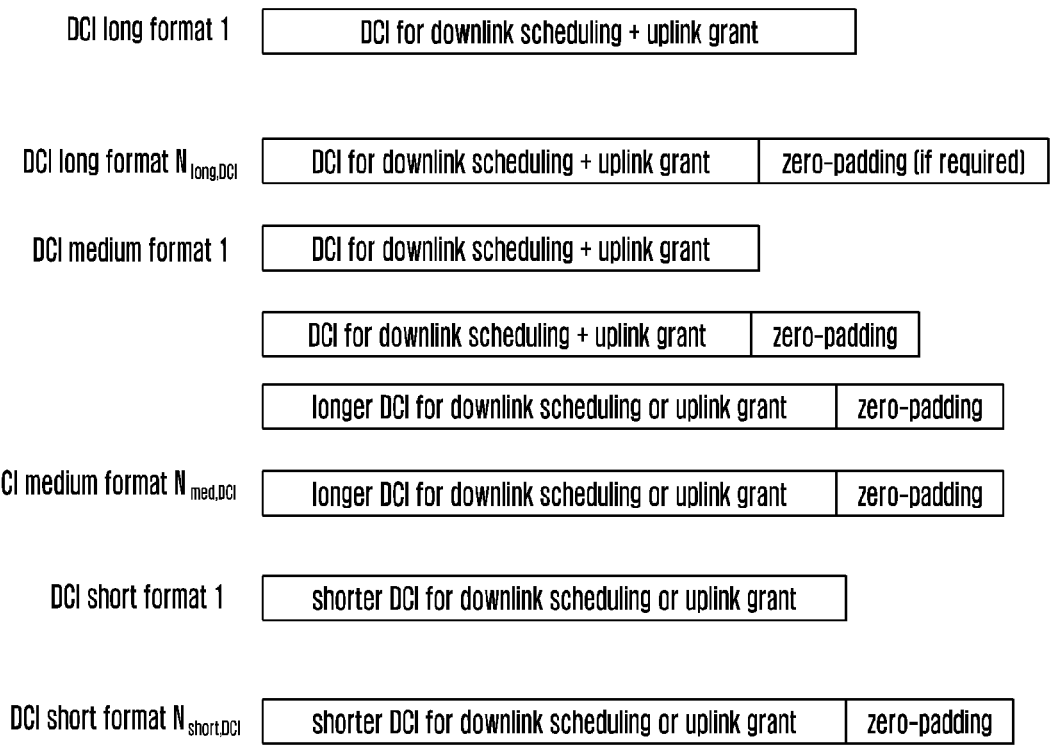
FIG. 8 illustrates another example of defining the DCI format according to an exemplary embodiment of the present invention.

No matter the third DCIs or the normal DCIs, the lengths of the zero-padding may vary greatly. For the DCI format needing more zero-padding, there is more redundant information, which is not conducive to the efficient use of resources. Therefore, as another example, the format and the length of the DCI may be defined in a manner shown in FIG. 8 to reduce the redundant information in the DCI and improve the utilization of resources. In this example, $N_{long, DCI}$ DCI long formats may be defined for the third DCIs with a longer length, and all the DCI long formats have the same length, and zero-padding is required if the length is insufficient; $N_{med, DCI}$ DCI medium formats may be defined for third DCIs with a shorter length and unidirectional DCIs with a longer length, and all the DCI medium formats have the same length, and zero-padding is required if the length is insufficient; $N_{short, DCI}$ DCI short formats may be defined for unidirectional DCIs with a shorter length, and all the DCI short formats have the same length, and zero-padding is required if the length is insufficient. The user equipment may perform blind detection of the PDCCH by using the three types of DCI length. If a long format DCI is detected, a ceil $\{\log 2(N_{long, DCI})\}$-bit field may be read from the content of the DCI, so as to distinguish the long format DCI is which kind of the long format DCIs specifically; if a medium format DCI is detected, a ceil $\{\log 2(N_{med, DCI})\}$-bit field may be read from the content of the DCI, so as to distinguish the medium format DCI is which kind of the medium format DCIs specifically; If a short format DCI is detected, a ceil $\{\log 2(N_{short, DCI})\}$-bit field may be read from the content of the DCI, so as to distinguish the short format DCI is which kind of the short format DCIs specifically.

Since the length of the long format DCI is longer, it is only suitable for the transmission with a higher aggregation level, and since the length of the short format DCI is shorter, it may be transmitted with a lower aggregation level. Therefore, in the joint detection schemes proposed in this embodiment, the aggregation levels of different formats of DCI may be defined, so that the utilization rate may be improved and the number of blind detections of user equipment may also be reduced. The base station may transmit a PDCCH carrying the long format DCI using one of several higher aggregation levels, transmit a PDCCH carrying the short format DCI using one of several lower aggregation levels, and transmit a PDCCH carrying the medium format DCI using one of several medium aggregation levels. Correspondingly, the user equipment may perform blind detection of the PDCCH carrying long format DCI in several search subspaces of higher aggregation levels, perform blind detection of the PDCCH carrying the short format DCI in several search subspaces of lower aggregation levels, and perform blind detection of the PDCCH carrying the medium format DCI in search subspaces of medium aggregation levels. The specific division manner of the aggregation levels (i.e., which aggregation levels are used for the transmission of the long format DCI, which aggregation levels are used for the transmission of the medium format DCI, and which aggregation levels are used for the transmission of the short format DCI) may be notified by the base station, or may be the default value. Specifically, for the full-duplex user equipment, the third DCI in the long format DCIs and the medium format DCIs may have only one set of resource allocation fields for indicating the same resources used in uplink and downlink data transmissions.

By defining the DCI formats and the lengths of the DCI formats, the DCI for uplink scheduling grant and downlink scheduling may be simultaneously acquired with low blind detection complexity while being compatible with unidirectional scheduling.

In step S303, uplink data transmission and downlink data transmission are performed with the base station according to the acquired first downlink control information and second downlink control information.

Figure 9:
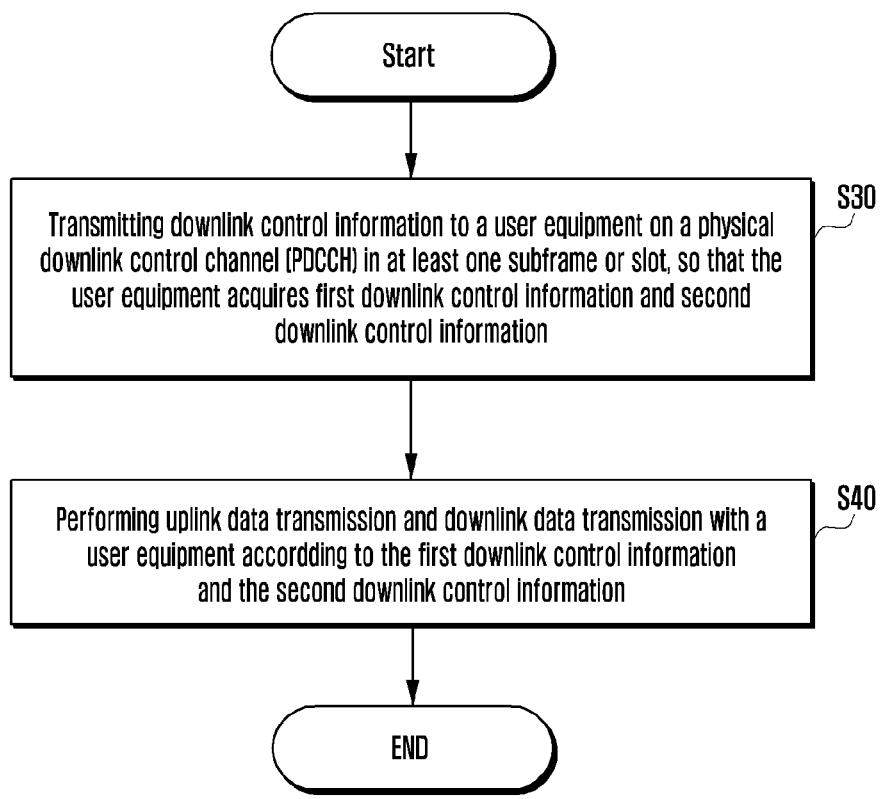
FIG. 9 illustrates a flowchart of a transmitting method of a physical downlink control channel according to an exemplary embodiment of the present invention.

FIG. 9 illustrates a flowchart of a transmitting method of a physical downlink control channel according to an exemplary embodiment of the present invention, and the transmitting method may be performed by a base station.

Referring to FIG. 9, in step S30, downlink control information is transmitted to a user equipment on a physical downlink control channel (PDCCH) in at least one subframe or slot, so that the user equipment acquires the first downlink control information and the second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, wherein a location of a PDCCH carrying the second downlink control information in a subframe or slot is associated with related information of the first downlink control information, or the first downlink control information and the second downlink control information are carried on the same one PDCCH.

As an example, the related information of the first downlink control information may include at least one of an aggregation level of the PDCCH carrying the first downlink control information, a location of the PDCCH carrying the first downlink control information in a search subspace, and content in a specific field in the first downlink control information, wherein the search subspace is a subspace in a user-equipment-specific search space.

The content in the specific field in the first downlink control information is used for indicating an aggregation level of the PDCCH carrying second downlink control information and/or a location of the PDCCH carrying second downlink control information in the search subspace. As an example, the content in the specific field in the first downlink control information may include at least one of content for indicating the aggregation level of the PDCCH carrying the second downlink control information; content for indicating a location index number of the PDCCH carrying the second downlink control information in the search subspace; content for indicating that the aggregation level of the PDCCH carrying the second downlink control information is the same as the aggregation level of the PDCCH carrying the first downlink control information; content for indicating that the location index number of the PDCCH carrying the second downlink control information in the search subspace is the same as a location index number of the PDCCH carrying the first downlink control information in the search subspace; content for indicating an offset amount and an offset direction between the aggregation level of the PDCCH carrying the second downlink control information and the aggregation level of the PDCCH carrying the first downlink control information; content for indicating an offset amount and an offset direction between the location index number of the PDCCH carrying the second downlink control information in the search subspace and the location index number of the PDCCH carrying the first downlink control information in the search subspace; content for indicating an index number of a combination formed of the aggregation level of the PDCCH carrying the second downlink control information and the aggregation level of the PDCCH carrying the first downlink control information; content for indicating an index number of a combination formed of the location index number of the PDCCH carrying the second downlink control information in the search subspace and the location index number of the PDCCH carrying the first downlink control information in the search subspace; content for indicating an index number of a candidate PDCCH location where the PDCCH carrying the second downlink control information is located, wherein the candidate PDCCH location is a location in all search subspaces that can be used for setting the PDCCH; and content for indicating an offset amount and an offset direction between the index number of the candidate PDCCH location where the PDCCH carrying the second downlink control information is located and an index number of a candidate PDCCH location where the PDCCH carrying the first downlink control information is located.

As an example, the first downlink control information and the second downlink control information may be carried on different PDCCHs, i.e., the PDCCH carrying the first downlink control information and the PDCCH carrying the second downlink control information may be different PDCCHs. Furthermore, as one example, the PDCCH carrying the first downlink control information and the PDCCH carrying the second downlink control information may be transmitted in the same one subframe or slot. As another example, the PDCCH carrying the first downlink control information and the PDCCH carrying the second downlink control information may be transmitted in different subframes or slots.

It should be understood that the step S30 may be implemented in various suitable manners, so that the location of the PDCCH carrying the second downlink control information in the subframe or slot is associated with the related information of the first downlink control information, or the first downlink control information and the second downlink control information are carried on the same one PDCCH.

In step S40, uplink data transmission and downlink data transmission are performed with the user equipment according to the first downlink control information and the second downlink control information. As an example, the uplink data transmission and the downlink data transmission may be performed with the user equipment on the same time-frequency resource according to the acquired first downlink control information and second downlink control information.

Next, exemplary embodiments of the step S30 will be described in conjunction with FIGS. 10 to 12.

Figure 10:
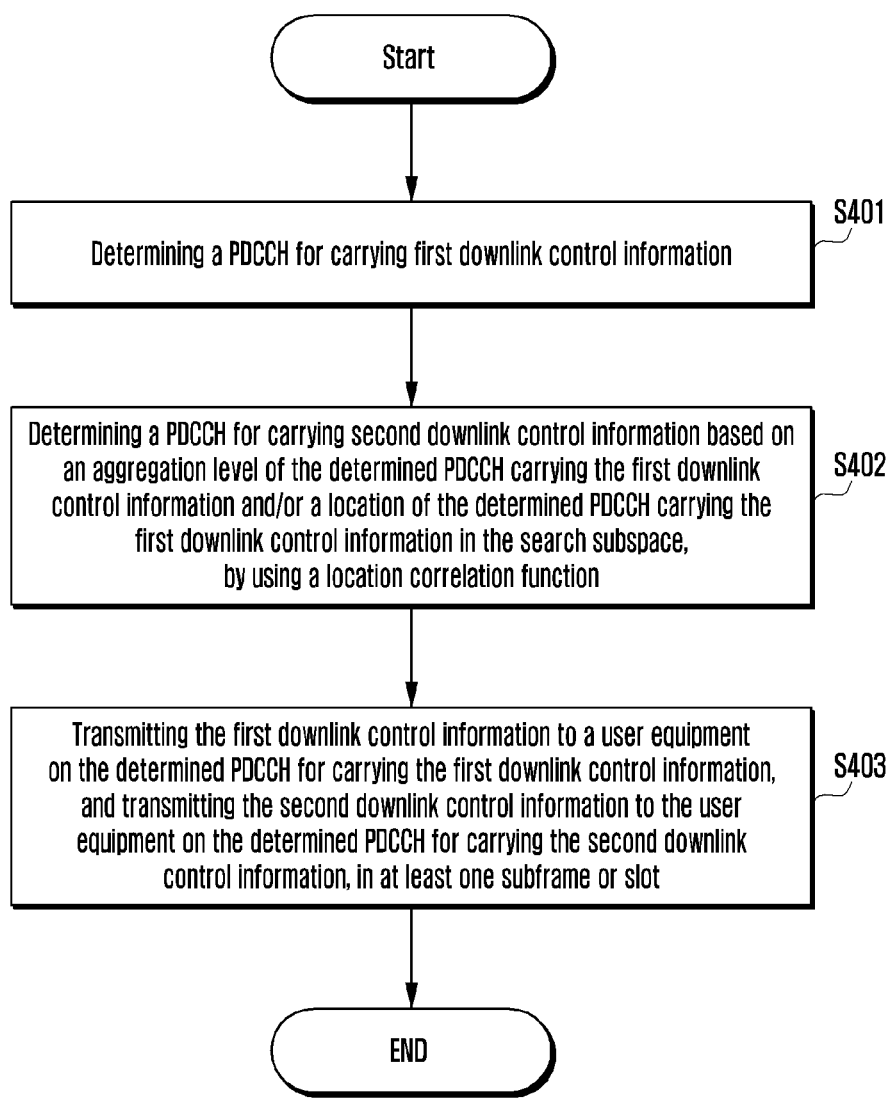
FIGS. 10 to 12 illustrate flowcharts of steps of transmitting the downlink control information according to an exemplary embodiment of the present invention.

FIG. 10 illustrates a flowchart of the step S30 according to an exemplary embodiment of the present invention. Herein, the first downlink control information and the second downlink control information are carried on different PDCCHs.

Referring to FIG. 10, in step S401, a PDCCH for carrying the first downlink control information is determined, i.e., the aggregation level of the PDCCH for carrying the first downlink control information and the location of the PDCCH for carrying the first downlink control information in the search subspace are determined. As an example, the PDCCH for carrying the first downlink control information may be determined according to a channel state of each candidate PDCCH location. In addition, the PDCCH for carrying the first downlink control information may also be determined according to other suitable information.

In step S402, a PDCCH for carrying the second downlink control information is determined based on the aggregation level of the determined PDCCH for carrying the first downlink control information and/or the location of the determined PDCCH for carrying the first downlink control information in the search subspace, by using a location correlation function. In particular, the aggregation level of the PDCCH for carrying the second downlink control information and/or the location of the PDCCH for carrying the second downlink control information in the search subspace are calculated based on the aggregation level of the determined PDCCH for carrying the first downlink control information and/or the location of the determined PDCCH for carrying the first downlink control information in the search subspace, by using the location correlation function, so that the PDCCH for carrying the second downlink control information is determined, i.e., the aggregation level of the PDCCH for carrying the second downlink control information and/or the location of the PDCCH for carrying the second downlink control information in the search subspace are determined. As an example, if only the aggregation level of the PDCCH for carrying the second downlink control information may be calculated according to the location correlation function, a candidate PDCCH location with the best channel state may be selected from among the candidate PDCCH locations for the transmission of the second downlink control information, according to the channel state of each candidate PDCCH location in the search subspace corresponding to the calculated aggregation level; if only the location of the PDCCH for carrying the second downlink control information in the search subspace may be calculated according to the location correlation function, the PDCCH for carrying the second downlink control information may be determined, according to the channel state on that location in each search subspace; if both the aggregation level of the PDCCH for carrying the second downlink control information and the location of the PDCCH for carrying the second downlink control information in the search subspace may be calculated according to the location correlation function, a unique candidate PDCCH location may be determined for transmission of the second downlink control information.

In step S403, the first downlink control information is transmitted to the user equipment on the determined PDCCH for carrying the first downlink control information, and the second downlink control information is transmitted to the user equipment on the determined PDCCH for carrying the second downlink control information, in at least one subframe or slot.

Figure 11:
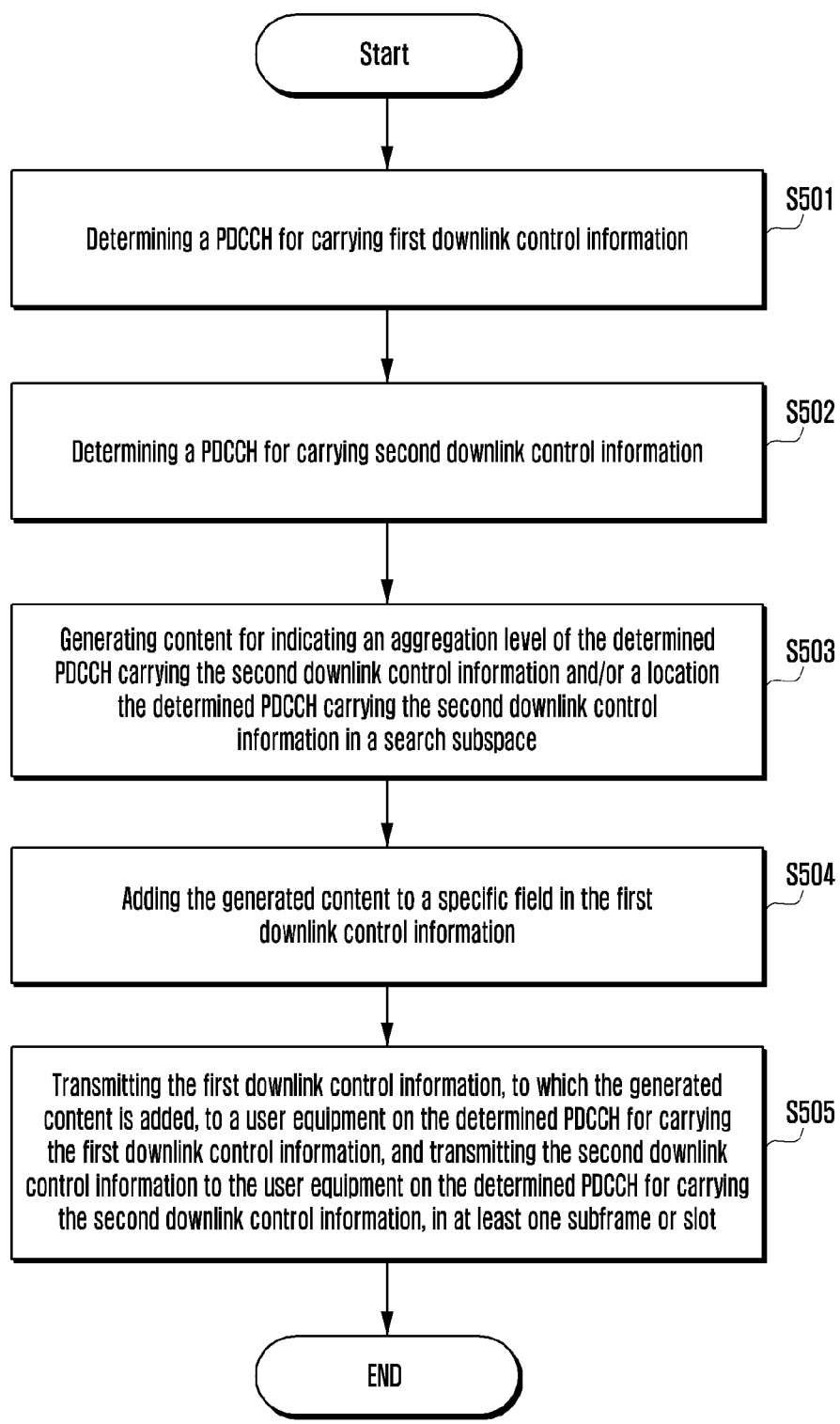

FIG. 11 illustrates a flowchart of the step S30 according to another exemplary embodiment of the present invention. Herein, the first downlink control information and the second downlink control information are carried on different PDCCHs.

Referring to FIG. 11, in step S501, a PDCCH for carrying the first downlink control information is determined, i.e., the aggregation level of the PDCCH for carrying the first downlink control information and the location of the PDCCH for carrying the first downlink control information in the search subspace are determined. As an example, the PDCCH for carrying the first downlink control information may be determined according to a channel state of each candidate PDCCH location. In addition, the PDCCH for carrying the first downlink control information may also be determined according to other suitable information.

In step S502, a PDCCH for carrying the second downlink control information is determined, i.e., the aggregation level of the PDCCH for carrying the second downlink control information and the location of the PDCCH for carrying the second downlink control information in the search subspace are determined. As an example, the PDCCH for carrying the second downlink control information may be determined according to a channel state of each candidate PDCCH location. In addition, the PDCCH for carrying the second downlink control information may also be determined according to other suitable information.

In step S503, content for indicating the aggregation level of the determined PDCCH for carrying the second downlink control information and/or the location of the determined PDCCH for carrying the second downlink control information in the search subspace is generated. As an example, the content may be generated only based on the aggregation level of the PDCCH for carrying the second downlink control information and/or the location of the PDCCH for carrying the second downlink control information in the search subspace. As another example, the content may be generated based on a relationship between the aggregation level of the PDCCH for carrying the second downlink control information and the aggregation level of the PDCCH for carrying the first downlink control information (for example, the two levels are the same, etc.) and/or a relationship between the location of the PDCCH for carrying the second downlink control information in the search subspace and the location of the PDCCH for carrying the first downlink control information in the search subspace.

In step S504, the generated content is added to a specific field in the first downlink control information.

In step S505, in at least one subframe or slot, the first downlink control information, to which the generated content is added, is transmitted to the user equipment on the determined PDCCH for carrying the first downlink control information, and the second downlink control information is transmitted to the user equipment on the determined PDCCH for carrying the second downlink control information.

In addition, the step S30 according to another exemplary embodiment of the present invention may further include: generating content for indicating the aggregation level of the determined PDCCH for carrying the first downlink control information and/or the location of the determined PDCCH for carrying the first downlink control information in the search subspace; and adding the generated content to a specific field in the second downlink control information; wherein in step S505, the second downlink control information, to which the generated content is added, is transmitted to the user equipment on the determined PDCCH for carrying the second downlink control information.

In the exemplary embodiments shown in FIGS. 10 and 11, the first downlink control information, to which the generated content is added, may be transmitted to the user equipment on the determined PDCCH for carrying the first downlink control information, and the second downlink control information may be transmitted to the user equipment on the determined PDCCH for carrying the second downlink control information, in the same one subframe or slot. Or, the first downlink control information, to which the generated content is dded, may be transmitted to the user equipment on the determined PDCCH for carrying the first downlink control information in one subframe or slot, and then the second downlink control information may be transmitted to the user equipment on the determined PDCCH for carrying the second downlink control information in a subframe or slot subsequent to the one subframe or slot.

Figure 12:
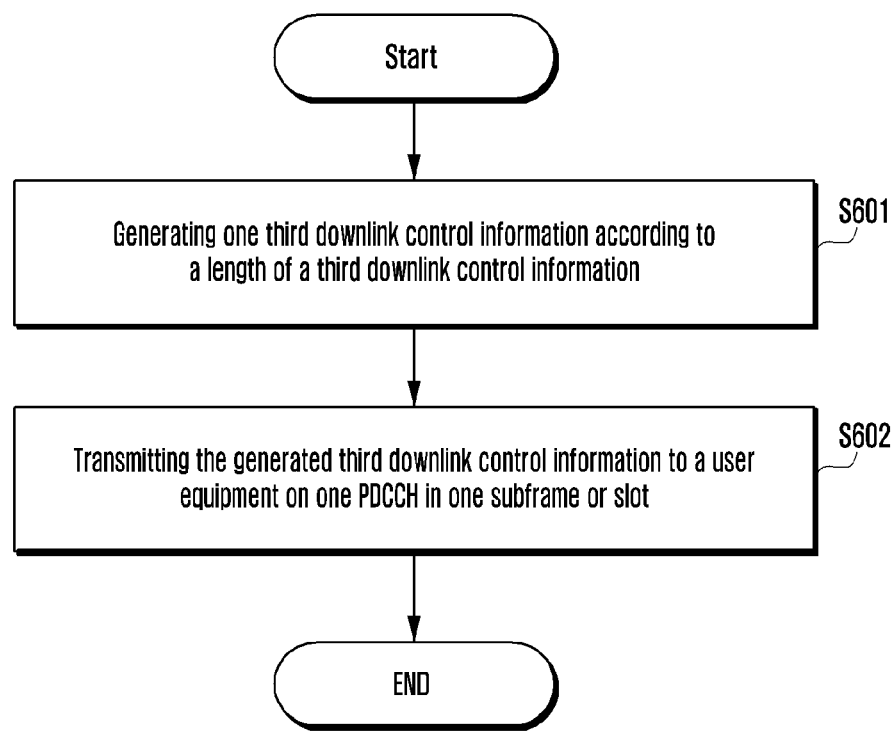

FIG. 12 illustrates a flowchart of the step S30 according to another exemplary embodiment of the present invention. Herein, the first downlink control information and the second downlink control information are carried on the same one PDCCH.

Referring to FIG. 12, in step S601, one third downlink control information is generated according to the length of a third downlink control information, wherein the third downlink control information is used for indicating the first downlink control information and the second downlink control information.

In step S602, the generated third downlink control information is transmitted to the user equipment on one PDCCH in one subframe or slot.

As an example, the length of the third downlink control information may include a first length and a second length, and a length of unidirectional downlink control information may include the second length and a third length, wherein the first length is longer than the second length, and the second length is longer than the third length. It should be understood that the unidirectional downlink control information may include the downlink control information for uplink scheduling grant and the downlink control information for downlink scheduling.

As another example, the length of the third downlink control information may only include a fourth length, and the length of the unidirectional downlink control information may only include a fifth length, wherein the fourth length is longer than the fifth length.

As an example, the third downlink control information may only include only one set of resource allocation fields for indicating the same resources used in uplink and downlink data transmissions.

In the exemplary embodiments shown in FIGS. 10 to 12, if the PDCCH for carrying the first downlink control information and the PDCCH for carrying the second downlink control information are transmitted in different subframes or slots, the transmitting method of the physical downlink control channel according to an exemplary embodiment of the present invention may further include: receiving blind detection feedback information for the PDCCH for carrying the second downlink control information from the user equipment; upon receiving the blind detection feedback information for indicating that no PDCCH carrying the second downlink control information is detected, transmitting the second downlink control information to the user equipment on a PDCCH in one subframe or slot again.

It should be understood that the specific implementation manners of the transmitting method of the physical downlink control channel in the above described exemplary embodiments may also be implemented by referring to the related implementation manners described in FIG. 1 to FIG. 8. To avoid redundancy, the repeated description is not described herein again.

Figure 13:
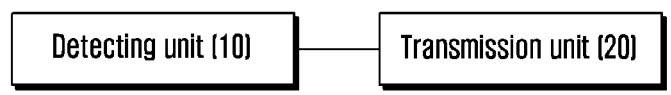
FIG. 13 illustrates a block diagram of a user equipment according to an exemplary embodiment of the present invention.

FIG. 13 illustrates a block diagram of a user equipment according to an exemplary embodiment of the present invention. As shown in FIG. 13, the user equipment according to an exemplary embodiment of the present invention includes a detecting unit 10 and a transmission unit 20.

In particular, the detecting unit 10 is used for performing blind detection on the physical downlink control channel (PDCCH) in at least one subframe or slot, so as to acquire first downlink control information and second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, wherein a location where a PDCCH carrying the second downlink control information is detected is associated with related information of the first downlink control information, or the first downlink control information and the second downlink control information are carried on the same one PDCCH.

As an example, the related information of the first downlink control information may include at least one of an aggregation level of the PDCCH carrying the first downlink control information, a location of the PDCCH carrying the first downlink control information in a search subspace, and content in a specific field in the first downlink control information, wherein the search subspace is a subspace in a user-equipment-specific search space, wherein the content in the specific field is used for indicating an aggregation level of the PDCCH carrying the second downlink control information and/or a location of the PDCCH carrying the second downlink control information in the search subspace.

As an example, the first downlink control information and the second downlink control information may be carried on different PDCCHs, i.e., the PDCCH carrying the first downlink control information and the PDCCH carrying the second downlink control information may be different PDCCHs. When the PDCCH carrying the first downlink control information and the PDCCH carrying the second downlink control information are different PDCCHs, the PDCCH carrying the first downlink control information and the PDCCH carrying the second downlink control information may be transmitted in the same one subframe or slot; or, the PDCCH carrying the first downlink control information and the PDCCH carrying the second downlink control information may be transmitted in different subframes or slots.

As an example, the PDCCH carrying the first downlink control information and the PDCCH carrying the second downlink control information are different PDCCHs, and the detecting unit 10 may include: a first detecting unit (not shown) and a second detecting unit (not shown).

The first detecting unit is used for detecting the PDCCH carrying the first downlink control information blindly in one subframe or slot to acquire the first downlink control information.

The second detecting unit is used for performing blind detection on the PDCCH carrying the second downlink control information based on the related information of the first downlink control information in a subframe or slot used for transmitting the PDCCH carrying the second downlink control information, to acquire the second downlink control information, wherein the one subframe or slot and the subframe or slot used for transmitting the PDCCH carrying the second downlink control information are the same one subframe or slot, or are different subframes or slots.

As an example, the second detecting unit may determine the aggregation level of the PDCCH carrying the second downlink control information and/or the location of the PDCCH carrying the second downlink control information in the search subspace based on the related information of the first downlink control information; and may perform blind detection on the PDCCH carrying the second downlink control information in a location, which is defined by the determined aggregation level and/or the location in the search subspace, in the subframe or slot used for transmitting the PDCCH carrying the second downlink control information, to acquire the second downlink control information.

As an example, the second detecting unit may determine the aggregation level of the PDCCH carrying the second downlink control information and/or the location of the PDCCH carrying the second downlink control information in the search subspace based on the content in the specific field in the first downlink control information.

As another example, the second detecting unit may determine the aggregation level of the PDCCH carrying the second downlink control information and/or the location of the PDCCH carrying the second downlink control information in the search subspace based on the content in the specific field in the first downlink control information and the aggregation level of the PDCCH carrying the first downlink control information and/or the location of the PDCCH carrying the first downlink control information in the search subspace.

As another example, the second detecting unit may calculate the aggregation level of the PDCCH carrying the second downlink control information and/or the location of the PDCCH carrying the second downlink control information in the search subspace based on the aggregation level of the PDCCH carrying the first downlink control information and/or the location of the PDCCH carrying the first downlink control information in the search subspace, by using a location correlation function.

As an example, the content in the specific field may include at least one of content for indicating the aggregation level of the PDCCH carrying the second downlink control information; content for indicating a location index number of the PDCCH carrying the second downlink control information in the search subspace; content for indicating that the aggregation level of the PDCCH carrying the second downlink control information is the same as the aggregation level of the PDCCH carrying the first downlink control information; content for indicating that the location index number of the PDCCH carrying the second downlink control information in the search subspace is the same as a location index number of the PDCCH carrying the first downlink control information in the search subspace; content for indicating an offset amount and an offset direction between the aggregation level of the PDCCH carrying the second downlink control information and the aggregation level of the PDCCH carrying the first downlink control information; content for indicating an offset amount and an offset direction between the location index number of the PDCCH carrying the second downlink control information in the search subspace and the location index number of the PDCCH carrying the first downlink control information in the search subspace; content for indicating an index number of a combination formed of the aggregation level of the PDCCH carrying the second downlink control information and the aggregation level of the PDCCH carrying the first downlink control information; content for indicating an index number of a combination formed of the location index number of the PDCCH carrying the second downlink control information in the search subspace and the location index number of the PDCCH carrying the first downlink control information in the search subspace; content for indicating an index number of a candidate PDCCH location where the PDCCH carrying the second downlink control information is located, wherein the candidate PDCCH location is a location in all search subspaces that can be used for setting the PDCCH; and content for indicating an offset amount and an offset direction between the index number of the candidate PDCCH location where the PDCCH carrying the second downlink control information is located and an index number of a candidate PDCCH location where the PDCCH carrying the first downlink control information is located.

As an example, the one subframe or slot and the subframe or slot used for transmitting the PDCCH carrying the second downlink control information are different subframes or slots, and the user equipment may further include: a feedback unit (not shown), the feedback unit is used for transmitting blind detection feedback information to a corresponding base station after the second detecting unit performs the blind detection on the PDCCH carrying the second downlink control information, wherein when the PDCCH carrying the second downlink control information is detected, the feedback unit transmits blind detection feedback information for indicating that the PDCCH carrying the second downlink control information is detected to the corresponding base station; and when no PDCCH carrying the second downlink control information is detected in the subframe or slot used for transmitting the PDCCH carrying the second downlink control information, the feedback unit transmits blind detection feedback information for indicating that no PDCCH carrying the second downlink control information is detected to the corresponding base station.

As an example, the feedback unit may transmit the blind detection feedback information to the corresponding base station, along with the transmitted uplink data or feedback downlink data acknowledge information.

As an example, the first downlink control information and the second downlink control information may be carried on the same one PDCCH, i.e., the PDCCH carrying the first downlink control information and the PDCCH carrying the second downlink control information may be the same one PDCCH. Wherein in the same one PDCCH, the first downlink control information and the second downlink control information are contained in one third downlink control information. The detecting unit 10 may perform blind detection on the PDCCH based on a length of the third downlink control information in one subframe or slot, to acquire the third downlink control information; and may obtain the first downlink control information and the second downlink control information based on the acquired third downlink control information.

As an example, the third downlink control information may only include only one set of resource allocation fields for indicating the same resources used in uplink and downlink data transmissions. In other words, the first downlink control information and the second downlink control information contained in the third downlink control information share one set of resource allocation fields.

As an example, the length of the third downlink control information may include a first length and a second length, and a length of unidirectional downlink control information may include the second length and a third length, wherein the first length is longer than the second length, and the second length is longer than the third length. It should be understood that the unidirectional downlink control information may include the downlink control information for uplink scheduling grant and the downlink control information for downlink scheduling.

As another example, the length of the third downlink control information may only include a fourth length, and the length of the unidirectional downlink control information may only include a fifth length, wherein the fourth length is longer than the fifth length.

As an example, the detecting unit 10 may perform blind detection on the PDCCH in a search subspace of the aggregation level corresponding to the length of the third downlink control information in one subframe or slot, to acquire the third downlink control information.

The transmission unit 20 is used for performing uplink data transmission and downlink data transmission with the base station according to the acquired first downlink control information and second downlink control information. As an example, the transmission unit 20 may perform the uplink data transmission and the downlink data transmission with the base station on the same time-frequency resource according to the acquired first downlink control information and second downlink control information.

Figure 14:
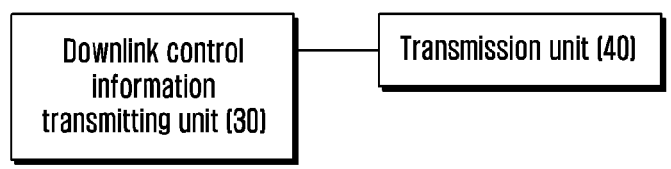
FIG. 14 illustrates a block diagram of a base station according to an exemplary embodiment of the present invention.

FIG. 14 illustrates a block diagram of a base station according to an exemplary embodiment of the present invention. As shown in FIG. 14, the base station according to an exemplary embodiment of the present invention includes a downlink control information transmitting unit 30 and a transmission unit 40.

The downlink control information transmitting unit 30 is used for transmitting downlink control information to a user equipment on the physical downlink control channel (PDCCH) in at least one subframe or slot, so that the user equipment acquires first downlink control information and second downlink control information, wherein the first downlink control information is one of downlink control information for uplink scheduling grant and downlink control information for downlink scheduling, and the second downlink control information is the other one of the downlink control information for uplink scheduling grant and the downlink control information for downlink scheduling, wherein a location of a PDCCH carrying the second downlink control information in a subframe or slot is associated with related information of the first downlink control information, or the first downlink control information and the second downlink control information are carried on the same one PDCCH.

As an example, the related information of the first downlink control information may include at least one of an aggregation level of the PDCCH carrying the first downlink control information, a location of the PDCCH carrying the first downlink control information in a search subspace, and content in a specific field in the first downlink control information, wherein the search subspace is a subspace in a user-equipment-specific search space, wherein the content in the specific field is used for indicating the aggregation level of a PDCCH carrying the second downlink control information and/or the location of a PDCCH carrying the second downlink control information in the search subspace.

As an example, the downlink control information transmitting unit 30 may generate one third downlink control information according to the length of a third downlink control information; and transmit the generated third downlink control information to the user equipment on one PDCCH in one subframe or slot, wherein the third downlink control information is used for indicating the first downlink control information and the second downlink control information.

The transmission unit 40 is used for performing uplink data transmission and downlink data transmission with the user equipment according to the first downlink control information and the second downlink control information.

Figure 15:
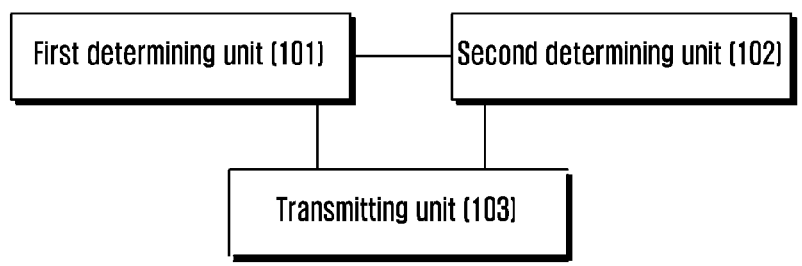
FIGS. 15 and 16 illustrate block diagrams of a downlink control information transmitting unit according to an exemplary embodiment of the present invention.

FIG. 15 illustrates a block diagram of a downlink control information transmitting unit according to an exemplary embodiment of the present invention. As shown in FIG. 15, the downlink control information transmitting unit according to an exemplary embodiment of the present invention includes: a first determining unit 101, a second determining unit 102, and a transmitting unit 103. Here, the first downlink control information and the second downlink control information are carried on different PDCCHs.

In particular, first determining unit 101 is used for determining a PDCCH used for carrying the first downlink control information.

The second determining unit 102 is used for determining a PDCCH used for carrying the second downlink control information based on the aggregation level of the determined PDCCH used for carrying the first downlink control information and/or the location of the determined PDCCH used for carrying the first downlink control information in the search subspace, by using a location correlation function.

The transmitting unit 103 is used for transmitting the first downlink control information to the user equipment on the determined PDCCH for carrying the first downlink control information, and transmitting the second downlink control information to the user equipment on the determined PDCCH for carrying the second downlink control information, in at least one subframe or slot.

Figure 16:
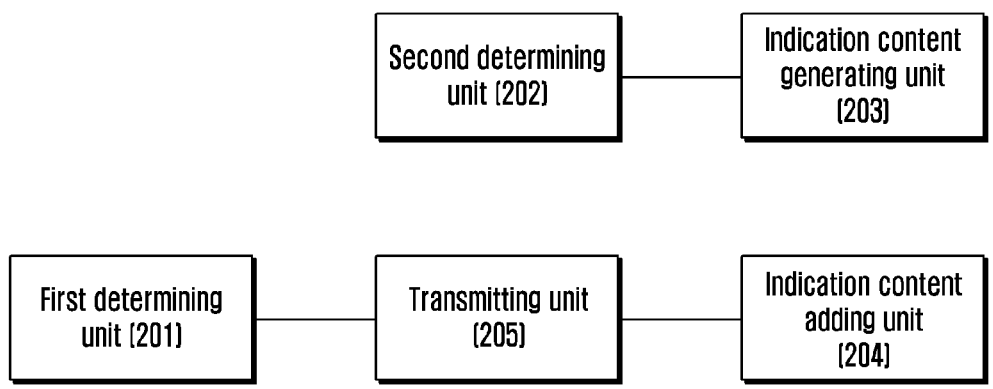

FIG. 16 illustrates a block diagram of a downlink control information transmitting unit according to another exemplary embodiment of the present invention. As shown in FIG. 16, the downlink control information transmitting unit according to an exemplary embodiment of the present invention includes: a first determining unit 201, a second determining unit 202, an indication content generating unit 203, an indication content adding unit 204, and a transmitting unit 205. Here, the first downlink control information and the second downlink control information are carried on different PDCCHs.

In particular, the first determining unit 201 is used for determining a PDCCH for carrying the first downlink control information.

The second determining unit 202 is used for determining a PDCCH for carrying the second downlink control information.

The indication content generating unit 203 is used for generating content for indicating the aggregation level of the determined PDCCH for carrying the second downlink control information and/or the location of the determined PDCCH for carrying the second downlink control information in the search subspace.

As an example, the generated content may include at least one of content for indicating the aggregation level of the PDCCH carrying the second downlink control information; content for indicating a location index number of the PDCCH carrying the second downlink control information in the search subspace; content for indicating that the aggregation level of the PDCCH carrying the second downlink control information is the same as the aggregation level of the PDCCH carrying the first downlink control information; content for indicating that the location index number of the PDCCH carrying the second downlink control information in the search subspace is the same as a location index number of the PDCCH carrying the first downlink control information in the search subspace; content for indicating an offset amount and an offset direction between the aggregation level of the PDCCH carrying the second downlink control information and the aggregation level of the PDCCH carrying the first downlink control information; content for indicating an offset amount and an offset direction between the location index number of the PDCCH carrying the second downlink control information in the search subspace and the location index number of the PDCCH carrying the first downlink control information in the search subspace; content for indicating an index number of a combination formed of the aggregation level of the PDCCH carrying the second downlink control information and the aggregation level of the PDCCH carrying the first downlink control information; content for indicating an index number of a combination formed of the location index number of the PDCCH carrying the second downlink control information in the search subspace and the location index number of the PDCCH carrying the first downlink control information in the search subspace; content for indicating an index number of a candidate PDCCH location where the PDCCH carrying the second downlink control information is located, wherein the candidate PDCCH location is a location in all search subspaces that can be used for setting the PDCCH; and content for indicating an offset amount and an offset direction between the index number of the candidate PDCCH location where the PDCCH carrying the second downlink control information is located and an index number of a candidate PDCCH location where the PDCCH carrying the first downlink control information is located.

The indication content adding unit 204 is used for adding the generated content to a specific field in the first downlink control information.

The transmitting unit 205 is used for transmitting the first downlink control information, to which the generated content is added, to the user equipment on the determined PDCCH for carrying the first downlink control information, and transmitting the second downlink control information to the user equipment on the determined PDCCH for carrying the second downlink control information, in at least one subframe or slot.

As an example, the indication content generating unit 203 may further generate content for indicating the aggregation level of the determined PDCCH for carrying the first downlink control information and/or the location of the determined PDCCH for carrying the first downlink control information in the search subspace; the indication content adding unit 204 may further add the generated content to a specific field in the second downlink control information, wherein the transmitting unit 205 may transmit the second downlink control information, to which the generated content is added, to the user equipment on the determined PDCCH for carrying the second downlink control information.

As an example, the transmitting unit 103 or the transmitting unit 205 may transmit the first downlink control information, to which the generated content is added, to the user equipment on the determined PDCCH for carrying the first downlink control information, and transmits the second downlink control information to the user equipment on the determined PDCCH for carrying the second downlink control information, in the same one subframe or slot.

As another example, the transmitting unit 103 or the transmitting unit 205 may transmit the first downlink control information, to which the generated content is added, to the user equipment on the determined PDCCH for carrying the first downlink control information in one subframe or slot, and transmit the second downlink control information to the user equipment on the determined PDCCH for carrying the second downlink control information in a subframe or slot subsequent to the one subframe or slot.

As an example, the PDCCH for carrying the first downlink control information and the PDCCH for carrying the second downlink control information are transmitted in different subframes or slots, the base station according to an exemplary embodiment of the present invention may further include: a feedback receiving unit (not shown), the feedback receiving unit is used for receiving blind detection feedback information for the PDCCH for carrying the second downlink control information from the user equipment; wherein upon receiving the blind detection feedback information for indicating that no PDCCH carrying the second downlink control information is detected, the transmitting unit 103 or the transmitting unit 205 may transmit the second downlink control information to the user equipment on a PDCCH in one subframe or slot again.

It should be understood that the specific implementation manners of the user equipment and the base station according to the exemplary embodiments of the present invention may be implemented by referring to the related specific implementations described in conjunction with FIG. 1 to FIG. 12, and details are not described herein again.

According to an exemplary embodiment of the present invention, a computer readable storage medium having stored thereon a computer program which implements, when being executed by a processor, the detecting method of physical downlink control channel as described in above exemplary embodiments is further provided.

According to an exemplary embodiment of the present invention, a user equipment is further provided, wherein the user equipment includes a processor (not shown) and a memory (not shown), wherein the memory stores a computer program which implements, when being executed by the processor, the detecting method of physical downlink control channel as described in above exemplary embodiments.

According to an exemplary embodiment of the present invention, a computer readable storage medium having stored thereon a computer program which implements, when being executed by a processor, the transmitting method of physical downlink control channel as described in above exemplary embodiments is further provided.

According to an exemplary embodiment of the present invention, an electronic equipment is further provided, wherein the electronic equipment includes a processor (not shown) and a memory (not shown), wherein the memory stores a computer program which implements, when being executed by the processor, the transmitting method of physical downlink control channel as described in above exemplary embodiments.

The computer readable storage medium is any data storage device that may store data read by a computer system. Examples of the computer readable recording medium include read only memory, random access memory, read only optical disk, magnetic tape, floppy disk, optical data storage device, and carrier wave (such as data transmission over the Internet via a wired or wireless transmission path).

In addition, it should be understood that each unit in the user equipment and the base station according to the exemplary embodiments of the present invention may be implemented as a hardware component and/or a software component. Those skilled in the art may implement each unit, for example, by using a Field Programmable Gate Array (FPGA) or an Application Specific Integrated Circuit (ASIC), depending on the processing performed by the each defined unit.

In addition, the detecting method of physical downlink control channel and the transmitting method of physical downlink control channel according to the exemplary embodiments of the present invention may be implemented as computer code in a computer readable storage medium. The computer code may be implemented by those skilled in the art in accordance with the description of the above methods. The above methods of the present invention are implemented when the computer code is executed in a computer.

Other technical solutions of the present application will be described in detail below through specific embodiments. The following specific embodiments may be combined with each other, and the same or similar concepts or processes may not be described in some embodiments. Embodiments of the present application will be described below with reference to the accompanying drawings.

For a full-duplex system, when UCI is reported along with uplink data to the base station in a uplink traffic channel, i.e., a Physical Uplink Shared Channel (PUSCH), UCI is particularly interfered by the downlink data since transmission of the uplink and downlink data occupy the same time-frequency resource, which may cause the uplink control information to be interpreted incorrectly. Therefore, it is important to ensure that the uplink control information is accurately reported in the full-duplex system to stabilize the performance of the entire system.

The interference caused by the downlink data transmitted by the base station to the received uplink data is referred to as self-interference, and power of the downlink data is much higher than that of the received uplink data. Therefore, self-interference cancellation is required to accurately receive the uplink data. If capability of canceling self-interference signals at base station side is sufficient to reduce the self-interference signal power to less than the noise floor, the reporting of uplink control information is less affected by the self-interference signal and the uplink control information may be accurately reported; however, if capability of canceling self-interference at base station side is insufficient to reduce the self-interference signal power to less than the noise floor, the resource for reporting the uplink control information needs to be avoided when transmitting the downlink data, to ensure accurate reporting of the uplink control information.

The embodiments of the present application aim to design a reporting scheme for uplink control information, which is to multiplex the uplink control information reported by the PUSCH with the uplink data or pilot signals, in resource element (REs) level, to ensure accurate reporting of the uplink control information in a manner of avoiding resources used for reporting the uplink control information. In addition, the embodiments of the present application also proposes a solution to the problem of decrease in decoding performance caused by the increase of code rate, which is referred in the decoding method by using an asymmetric frame structure a new modulation and coding scheme (MCS) as described in the following, to reduce the decrease of throughput while ensuring the accurate reporting of uplink control information.

Figure 17:
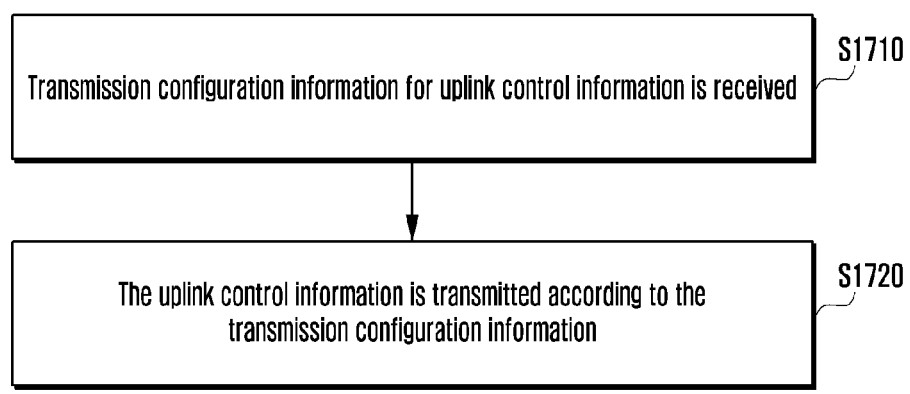
FIG. 17 is a schematic flowchart of a method for transmitting uplink control information according to an embodiment of the present application.

FIG. 17 is a schematic flowchart of a method for transmitting uplink control information according to an embodiment of the present invention. As shown in FIG. 17, the method may include the following steps:

Step S1710: receiving transmission configuration information for reporting the uplink control information;

Step S1720: transmitting uplink control information according to the transmission configuration information.

Wherein, the transmission configuration information includes transmission indication information and position indication information, wherein the transmission indication information is used to indicate to transmit the uplink control information on an OFDM symbol used for transmitting an uplink pilot signal or to transmit the uplink control information on an OFDM symbol used for transmitting uplink data, and the position indication information is used to indicate the position of REs used for transmitting the uplink control information on an OFDM symbol used for transmitting an uplink pilot signal or on an OFDM symbol used for transmitting uplink data.

The data transmission method provided by the embodiment of the present application is applicable to a full-duplex system. For full-duplex transmission, a full-duplex device may be used for performing full-duplex transmission, that is, the full-duplex device simultaneously performs uplink and downlink transmission on same time-frequency domain resources; if the terminal device is not a full-duplex terminal, then two terminal devices are used to perform full-duplex transmission on same time-frequency domain resources. In the embodiment of the present application, the terminal devices that occupy same time-frequency domain resources to perform full-duplex transmission are referred to as a first terminal device, i.e., a first User Equipment (UE), and a second terminal device, i.e., a second UE. The method shown in FIG. 17 may be specifically performed by the first UE, and if the first UE is a full-duplex terminal, the first UE and the second UE are the same UE.

It may be seen that, in the embodiment of the present application, the position where the first UE reports the uplink control information to the base station with PUSCH may be of two types; one is on the OFDM symbols used for transmitting the uplink pilot signal, and the other is on other OFDM symbols used for transmitting data.

For conveniently describing, hereinafter, the method for transmitting uplink control information on an OFDM symbol used for transmitting an uplink pilot signal is simply referred to as a first mode, and the method for transmitting uplink control information on an OFDM symbol for transmitting uplink data is simply referred to as a second mode, the OFDM symbol used for transmitting the uplink pilot signal is simply referred to as a pilot OFDM symbol, and the OFDM symbol used for transmitting the uplink data is simply referred to as a data OFDM symbol.

If the first UE reports the uplink control information on pilot OFDM symbols, that is, the foregoing first mode is adopted, then the first UE may reserve some REs for transmitting uplink control information among pilot OFDM symbols, and these reserved REs are required to be avoided when the uplink pilot signal is transmitted; if the first UE reports the uplink control information on data OFDM symbols, that is, the second mode is adopted, then some REs for reporting the uplink control information among data OFDM symbols are reserved, and the first UE is required to avoid these reserved REs when transmitting uplink data.

In the embodiment of the present application, it is obtained from the base station that which reporting mode of uplink control information (may also be referred to as a reporting manner) is adopted by the first UE, i.e., reporting UCI on pilot OFDM symbols or reporting on the data OFDM symbols, according to the transmission indication information in the transmission configuration information of the received downlink control information transmitted by the base station.

Wherein, the specific format of the transmission indication information transmitted by the base station may be configured according to actual requirement, which is not limited in the embodiment of the present application, as long as the UE can determine the reporting mode of reporting the uplink control information according to the transmission indication information. For example, in an alternative manner, the transmission indication information may be information that directly indicates a transmission mode, for example, a 'pilot mode' may be used to indicate that the reporting mode is the first mode, and a 'data mode' is used to indicate that the reporting mode is the second mode. In another alternative manner, the transmission indication information may also be an identifier of the reporting mode, for example, an 'A' identifier indicates that the reporting mode is the first mode, and a 'B' identifier indicates that the reporting mode is the second mode.

In the full-duplex data transmission manner, after the first UE knows the reporting mode of the uplink control information, the first UE should also obtain the position of the REs for reporting uplink control information from the base station in order to report the uplink control information based on the obtained reporting mode. The first UE should determine the position of the specific REs for reporting uplink control information based on the position indication information in the obtained transmission configuration information and transmits uplink control information to the bases station on the REs with the determined positions when UCI reporting is needed.

Similarly, the specific format of the position indication information transmitted by the base station may be configured according to actual requirement. It is not limited in the embodiment of the present application, as long as the UE can determine the position of the REs used for reporting the uplink control information according to the position indication information.

With the method for transmitting uplink control information provided by the embodiment of the present application, the first UE (the UE that transmits the uplink control information, is a UE that occupies the uplink time-frequency resource in the full-duplex transmission) may transmit the uplink control information to the base station on pilot OFDM symbols or data OFDM symbols. Since both the transmission mode and positions of REs for the first UE to report the uplink control information can be determined based on the transmission configuration information transmitted by the base station, base station may specifically indicate the way to report uplink control information for the first UE and to receive downlink data for the second UE who performs full-duplex communication on same frequency-time resources with the first UE, according to actual application requirement. Thereby, base station may avoid the resources for the first UE to report uplink control information when transmitting downlink data to the second UE in order to ensure accurate reporting of the uplink control information.

Wherein, in an actual application, the way for base station to transmit the foregoing transmission configuration information to the first UE and the second UE is not limited in the embodiment of the present application. For example, in an alternative solution, the base station may transmit the transmission configuration information to the first UE and the second UE when establishing a Radio Resource Control (RRC) connection, or transmit the transmission configuration information in downlink control information corresponding to each UE.

In an alternative embodiment of the present application, the transmission configuration information further includes data receiving indication information, wherein the data receiving indication information is used to indicate the second UE to receive the downlink data on the REs used by the first UE to report UCI, or indicate the second UE not to receive the downlink data on the REs used by the first UE to report UCI, and correspondingly, the method may also include:

receiving the downlink data according to the data receiving indication information.

It should be noted that the REs herein are REs used for transmitting uplink control information. In this solution, the first UE is a full-duplex terminal, that is, the first UE itself performs full-duplex transmission.

Alternatively, when the uplink control information is transmitted on pilot OFDM symbols, not receiving downlink data on the REs used for reporting uplink control information means that the downlink data is not received on the OFDM symbol used for transmitting the uplink control information.

That is, for the first mode, the base station may not transmit the downlink data on the pilot OFDM symbol used for transmitting the uplink control information, and accordingly, the second UE may not receive the downlink data on the pilot OFDM symbol used for transmitting the uplink control information.

It should be noted that, in the embodiment of the present application, the uplink data is service data that is transmitted by the terminal device (the first UE and/or the second UE) to the base station, and the downlink data is service data that is transmitted by the base station to the terminal device.

In an actual application, if the first UE is a full-duplex terminal, the base station may configure whether the first UE receives the downlink data on the REs used for reporting the uplink control information. If the base station configures that the first UE does not receive the downlink data on the REs used for reporting the uplink control information, the base station needs to inform the first UE (for example, when the first UE establishes an RRC connection, or in the downlink control information of downlink scheduling for the first UE); certainly, the base station may also have an agreement with the first UE that the base station does not transmit the downlink data on the REs used for reporting the uplink control information and the base station is not required to inform the first UE, and accordingly, the first UE will not receive the downlink data on the REs used for reporting the uplink control information. If the base station configures that the first UE does not need to avoid the REs used for reporting the uplink control information when the first UE receives the downlink data, that is, the downlink data may be transmitted on the REs used for the UE to report the uplink control information, then the base station may inform the first UE or not, and if not, the first UE defaults to receive the downlink data on the REs on which the first UE reports the uplink control information.

If the first UE and the second UE are not the same UE, the base station may configure whether the second UE receives the downlink data on the REs used for the first UE to report the uplink control information. If the base station configures that the base station does not transmit the downlink data to the second UE on the REs used for the first UE to report the uplink control information, the base station may have an agreement with the second UE that the base station does not transmit the downlink data on the REs used for the first UE to transmit the uplink control information, or the base station needs to inform the second UE (for example, when the second UE establishes the RRC connection, or in the downlink control information of downlink schedule of the second UE), and correspondingly, the second UE will not receive the downlink data on the REs on which the first UE reports the uplink control information. If the base station configures that the base station does not need to avoid the REs used for reporting the uplink control information by the first UE when transmitting the downlink data, that is, the downlink data may be transmitted to the second UE on the REs used for the first UE to report the uplink control information, then the base station may inform the second UE or not, and if not, the second UE defaults to receive the downlink data on the REs on which the first UE reports the uplink control information.

In an alternative embodiment of the present application, the transmission configuration information may further include a frequency domain spreading sequence and/or a time domain spreading sequence of a modulation symbol of the uplink control information.

Specifically, in a multiple-input multiple-output (MIMO) mode or a non-orthogonal multiple access mode, multiple terminals may use same time-frequency resources to upload data, and each of the terminals reports the uplink control information on the PUSCH. Therefore, in order to improve the capacity of reporting uplink control information, that is, supporting more terminals to simultaneously report the uplink control information, frequency domain spreading and/or time domain spreading may be performed on uplink control information modulation symbols transmitted on uplink control information resources. If time domain spreading and/or frequency domain spreading are used to improve the capacity of reporting uplink control information, the base station needs to inform the frequency domain spreading sequence and/or time domain spreading sequence used by each of the terminals in the downlink control information corresponding to the uplink transmission. Specifically, in an actual application, an Orthogonal Cover Code (OCC) sequence may be used for the frequency domain spreading sequence and/or the time domain spreading sequence. In this solution, after the first UE obtains the reporting mode of the uplink control information, the position indication information, the used frequency domain spreading sequence and/or the time domain spreading sequence, the first UE may reserve some REs within pilot OFDM symbols, for reporting the uplink control information, and transmit an uplink pilot signal on other REs of the OFDM symbol, as well as transmitting the uplink data on other OFDM symbols.

In an actual application, which reporting mode of the uplink control information is specifically adopted by the first UE, may be configured according to one or more of the following information: hardware configuration, software configuration, and specific communication service of the base station itself. For example, in an alternative solution, the first reporting manner, that is, the foregoing first mode, may be applicable to a case that the base station configures not transmitting the downlink data on the pilot OFDM symbols and a relatively large scheduling bandwidth in order to ensure that the uplink channel estimation accuracy is not affected by the downlink self-interference signal, and at this moment, since the reporting of uplink control information does not occupy the resources for uploading and downloading data, the uplink and downlink data throughput is not affected; as the relatively large scheduling bandwidth, the REs that reports the uplink control information has a small proportion of REs on pilot OFDM symbols, and the accuracy of the uplink channel estimation will not be significantly affected. The second reporting manner, that is the foregoing second mode may be applicable to a case that the base station configures transmitting the downlink data to the second UE on the OFDM symbol used for the first UE to transmit the uplink pilot and a relatively small scheduling bandwidth, and at this moment, since the uplink control resources does not occupying the pilot resources when the first UE reports the uplink control information, the accuracy of the uplink channel estimation is not affected, but the uplink and downlink data throughput may be reduced.

In an alternative embodiment of the present application, the foregoing transmission position indication information may further include information for indicating the number of REs used for reporting UCI (referred to as RE number indication information).

It may be understood that the REs herein are REs for reporting the uplink control information.

Wherein, the specific form of the RE number indication information is not limited in the embodiment of the present application. For example, the information may be the number of REs used by the first UE to transmit uplink control information, or may be the density of the REs used for transmitting uplink control information by the first UE on the OFDM symbol. Since the number of REs on each OFDM symbol is determined under a certain scheduling bandwidth, a position of REs on the OFDM symbol may be determined based on the density.

In an actual application, an option solution of the position indication information may be specific position information of each RE for transmitting the uplink control information. In this case, the first UE may directly know position of each RE for reporting the uplink control information based on transmission position information, however, when the number of REs used for reporting the uplink control information is large, this solution may leads in that the number of indication information that the base station needs to transmit is large and occupies excessive resources. Therefore, the base station and the UE may agreement on a manner in which the REs for reporting the uplink control information are distributed on the OFDM symbol, and after the UE knows the number of REs based on the RE number indication information, the UE may determine position of each RE used for transmitting the uplink control information based on the agreed distribution manner and the number of REs. In this manner, the base station may not informing the first UE of the specific position information of each RE used to report the uplink control information, thereby saving the downlink resources and reducing the data transmission.

In an alternative embodiment of the present application, when the uplink control information is transmitted on the data OFDM symbols, that is, when the transmission mode is the second mode, the position indication information includes indication information of a resource allocation manner of the REs used for reporting UCI, which the resource allocation manner of the REs (i.e., REs used for reporting the uplink control information) includes a first allocation manner or a second allocation manner, wherein the first allocation manner refers to that the REs used for reporting UCI are discretely distributed on the OFDM symbol used for transmitting the uplink control information, and the second allocation manner refers to that the REs used for reporting UCI are all REs on at least one OFDM symbol, that is, in data OFDM symbols all REs on at least one OFDM symbol are used for transmitting uplink control information, that is, the REs used for transmitting uplink control information are centrally distributed on at least one OFDM symbol.

For the manner of reporting the control information on data OFDM symbols, meaning that the transmission mode is the second mode, two resource allocation manners may be used for allocating resources that are used for reporting the uplink control information, that is, the REs used for reporting the uplink control information are discretely distributed on different OFDM symbols, or the REs used for reporting uplink control information are centrally distributed on one or more OFDM symbols. For conveniently describing, the resource allocation scheme in which REs used for reporting uplink control information are discretely distributed on different OFDM symbols may be referred to as discrete resource allocation, and the resource allocation scheme in which REs used for reporting uplink control information are centrally distributed on one or more OFDM symbols, that is, the manner in which the uplink control information may be reported by using all the REs of one or several OFDM symbols, may be referred to as centralized resource allocation. The number of OFDMs occupied by the REs used for transmitting the uplink control information is determined by the number of REs that need to transmit the uplink control information when the centralized resource allocation manner is adopted.

In an alternative embodiment of the present application, the REs used for reporting UCI are uniformly distributed on different OFDM symbols used for transmitting uplink control information, and/or the REs used for reporting UCI on the same one OFDM symbol used for transmitting the uplink control information are uniformly distributed in frequency, if the number of REs used for reporting UCI is at least two, when the transmission mode is the first mode, or when the transmission mode is the second transmission mode and the REs used for reporting UCI are discretely distributed on the OFDM symbol used for transmitting the uplink control information (that is, the resource allocation manner is the first allocation manner).

It may be understood that, when the transmission mode is the first mode, the OFDM symbol used for transmitting the uplink control information in the solution is a pilot OFDM symbol, and when transmission mode is the second mode, the OFDM symbol used for transmitting the uplink control information in the solution is a data OFDM symbol. Specifically, when the transmission mode is the first mode, the REs used for transmitting the uplink control information are uniformly distributed on different pilot OFDM symbols, and if the number of REs used for transmitting the uplink control information on the same pilot OFDM symbol is at least two, the REs used for transmitting uplink control information on the same pilot OFDM symbol may be uniformly distributed in frequency; when the transmission mode is the second mode, if the discrete resource allocation manner is adopted, the REs used for transmitting the uplink control information may be uniformly distributed on different data OFDM symbols, and if the number of the REs on the same data OFDM symbol is at least two, the REs used for reporting the uplink control information on the same data OFDM symbol may be uniformly distributed in frequency.

In this solution, the REs used for transmitting the uplink control information being uniformly distributed on different OFDM symbols, implements that the REs used for transmitting the uplink control information are uniformly distributed in time, and the REs used for transmitting the uplink control information being uniformly distributed on the same OFDM symbol in frequency, implements that the REs used are uniformly distributed in frequency. Therefore, through this solution, it implements that the REs used for reporting the uplink control information are uniformly distributed in time and frequency, which may fully obtain diversity gain.

It should be noted that the above uniform distribution refers to a relatively uniform distribution. For example, taking that the transmission mode being the first mode as an example, when the number of OFDM symbols used for transmitting the pilot signal is two, and the number of REs used for transmitting the uplink control information is six, there are three REs used for transmitting the uplink control information on each pilot OFDM symbol; when the number of REs used for transmitting the uplink control information is five, the foregoing uniform distribution may mean that three REs on one pilot OFDM symbol may be used for transmitting uplink control information, and 2 REs on another pilot OFDM symbol may be used for transmitting uplink control information.

In an actual application, the REs used for the first UE to report the uplink control information are configured by using a discrete resource allocation or a centralized resource allocation, and may also be configured according to actual application requirements. Specifically, the discrete resource allocation requires the base station to perform uplink control information resource allocation in the scheduled time-frequency resources of the terminal with a certain frequency domain density and time domain density, which the frequency domain density and the time domain density are all configurable, to fully obtain the diversity gain. If the residual self-interference signal after the self-interference cancellation on the base station side does not interfere the reception of the uplink control information, the base station may perform resource allocation for reporting the uplink control information to the first terminal in this resource allocation manner. The centralized resource allocation requires the base station to reserve one or more OFDM symbols for the first terminal to report the uplink control information. When the residual self-interference signal after the self-interference cancellation on the base station side may affect the reception of the uplink control information, the base station should use this resource allocation manner to perform the resource allocation for reporting the uplink control information of the first terminal, and does not transmit the downlink data to the second UE on the OFDM symbol used for reporting the uplink control information by the first UE, and accordingly, the second UE does not receive downlink data on these OFDM symbols.

In an alternative embodiment of the present application, the transmitting the uplink control information according to the transmission configuration information may specifically include:

determining a position of each of the REs on each OFDM symbol used for transmitting the uplink control information according to any of the following:
 a first frequency offset and/or second frequency offset in the position indication information;
 the position indication information, and a first frequency offset and/or second frequency offset determined by pre-configuration information;
 a first frequency offset determined by pre-configuration information and a second frequency offset in the position indication information;
 a second frequency offset determined by pre-configuration information and a first frequency offset in the position indication information;
 transmitting the uplink control information according to a position of each of the REs on each OFDM symbol used for transmitting the uplink control information;
 wherein, the first frequency offset is a frequency offset of a first RE on each OFDM symbol used for transmitting the uplink control information, and the second frequency offset is a second frequency offset between adjacent REs in frequency domain on the adjacent OFDM symbols used for transmitting the uplink control information.

Specifically, the foregoing first frequency offset may be used to suppress inter-cell interference, and for considering the accuracy of channel estimation, the foregoing second frequency offset is to minimize the effect on the accuracy of uplink channel estimation by transmitting the uplink control information on an OFDM symbol used for transmitting a pilot signal. Wherein, the specific offset of the first frequency offset and/or the second frequency offset may be configured according to actual requirements.

As may be seen from the above description, the first frequency offset and/or the second frequency offset may be informed by the base station to the first UE, or determined by the first UE based on the pre-configuration information, that is, the two frequency offsets are determined in a manner known by both the base station and the first terminal (i.e., corresponding to the above calculation strategy). For example, the pre-configuration information may be a specific value of the first frequency offset and the second frequency offset that the base station and the terminal device have agreed to use, or may be the first frequency offset and/or the second frequency offset calculated by the first UE itself according to a calculation method agreed by the base station and the first UE. When both the first frequency offset and the second frequency offset are included, the two offsets may be informed by the base station to the first UE, or determined by the first UE according to the pre-configuration information; or alternatively, one of the offsets may be informed by the base station to the UE, and the other one is determined by the first UE according to the pre-configuration information.

In an alternative embodiment of the present application, in the case of UE reporting uplink control information on the pilot OFDM symbols (i.e., the transmission mode is the first mode), if the REs (i.e., the REs used for transmitting the uplink control information) are uniformly distributed on different OFDM symbols used for transmitting the uplink control information and the REs on the same one OFDM symbol used for transmitting the uplink control information are uniformly distributed in frequency, the determining a position of each of the REs on each OFDM symbol used for transmitting the uplink control information may include the following:

determining a position of each of the REs used for reporting the uplink control information on each OFDM symbol used for transmitting the uplink control information, according to the number of OFDM symbols used for transmitting the uplink control information, the number of the REs used for reporting the uplink control information, the first frequency offset of the first RE used for reporting the uplink control information on each OFDM symbol used for transmitting the uplink control information, the second frequency offset between the REs used for reporting the uplink control information that are adjacent in frequency domain on adjacent OFDM symbols used for transmitting the uplink control information, and the number of subcarriers within a scheduling bandwidth.

In an alternative embodiment of the present application, the position indication information further includes a position identifier of the OFDM symbol used for transmitting uplink control information.

For the first mode, the OFDM symbol in the scheme is a pilot OFDM symbol, and for the second mode, the OFDM symbol in the scheme is a data OFDM symbol.

That is, the first UE may also obtain from the base station a position identifier of the OFDM symbol used for transmitting uplink control information by the first UE, that is, the base station informs the first UE to report the uplink control information on which OFDM symbol(s) in the downlink control information of downlink schedule of the first UE or when the first UE establishes an RRC connection.

In another alternative solution, the position of the OFDM symbol used for the first UE to transmit the uplink control information may also be a fixed default value, that is, the base station and the first UE pre-agreed to transmit the uplink control information on which OFDM symbol(s); in this case, the first UE may report the uplink control information directly on pre-agreed OFDM symbol(s) when the uplink control information needs to be reported, and the base station does not need to inform the first UE to report the uplink control information on which OFDM symbol(s).

In an alternative embodiment of the present application, when the resource allocation manner is the second allocation manner, and the base station does not transmit the downlink data on the REs (the REs used for the first terminal to report the uplink control information), the method further include at least one of the following:

Manner 1:
  receiving an initial MCS;
  determining an initial transmission block length according to the initial MCS;
  determining a transmission block length weighting coefficient according to a ratio of the number of OFDM symbols (i.e., data OFDM symbols) used for transmitting the uplink control information to all OFDM symbols (i.e., the total number of data OFDM symbols) in one subframe or one slot, wherein the transmission block length weighting coefficient is greater than 0 and less than 1;
  calculating an actual transmission block length according to the initial transmission block length and the transmission block length weighting coefficient;
  transmitting the uplink data according to the actual transmission block length;

Manner 2:
  receiving an actual MCS;
  calculating an actual transmission block length according the actual MCS;
  transmitting the uplink data according to the actual transmission block length;

Manner 3:
  the OFDM symbol used for transmitting the uplink control information being configured as a first OFDM sub-symbol and a second OFDM sub-symbol, the REs (the REs used for reporting the uplink control information) are all REs on the first OFDM sub-symbol, and the subcarrier spacing on the OFDM symbol used for transmitting the uplink control information being greater than the subcarrier spacing on the OFDM symbol of which all REs are used for transmitting the uplink data;
  transmitting the uplink data by the second OFDM sub-symbol and the OFDM symbol of which all REs are used for transmitting the uplink data.

It may be understood that the OFDM symbols used for transmitting the uplink control information in the above three manners are data OFDM symbols.

Although the centralized resource allocation may ensure that the reporting of the uplink control information is not affected by the self-interference signal (since the base station may be configured to not to transmit the downlink data on the OFDM symbol where the uplink control information is located), the number of resources actually used for transmitting data is reduced, and the Signal to Interference plus Noise Ratio (SINR) measured by the base station or reported by the terminal device and the MCS calculated by the SINR as well as the transmission block length do not change accordingly, thus causing that the code rate of actually transmitted data is increased, increasing the probability of decoding errors.

In response to the above problem, the embodiment of the present application further provides two solutions, and one solution is manner 1 or manner 2, which is to design a new interpretation manner of the MCS to the transmission block length, and reduces the transmission block length of the actual transmission under the premise of ensuring the decoding performance of the transmission block (that is, code rate), thereby reducing the possibility of decoding errors of the entire transmission block, which is due to the increase of the code rate, although the throughput is reduced.

Another solution is the foregoing Manner 3, which is to design an asymmetric intra-slot frame structure. Specifically, in the scheduling bandwidth, a larger sub-carrier spacing is configured for the OFDM symbol reporting the uplink control information, and accordingly, duration of the time domain waveform is shortened. The original wide-waveform OFDM symbol is divided into a plurality of narrow-waveform OFDM symbols, and the first UE only reports the uplink control information by using a part of the narrow-waveform OFDM symbols to reduce the time domain overhead of the uplink control information, therefore, there may be several narrow-waveform OFDM symbols that may be additionally used for transmitting data, thereby reducing the code rate to some extent, and then reducing the loss of transmission performance.

For Manner 1, the initial MCS is the initial MCS calculated by the base station according to the SINR, and accordingly, the initial transmission block length is the transmission block length calculated according to the initial MCS. After obtaining initial MCS in the downlink control information of the downlink scheduling, the first terminal first calculates the initial transmission block length according to the initial MCS, then determines a transmission block length weighting coefficient based on a ratio of the OFDM symbols used for reporting the uplink control information to all OFDM symbols in one subframe or one slot, and then may determine an actual lowered transmission block length, according to the product of the actual transmission block length weighting coefficient and the initial transmission block length.

In an alternative solution, the foregoing transmission block length weighting coefficient is:

$$\alpha = 1 - \frac{N_{symb}^{UCI}}{N_{symb}^{data}}$$

wherein, $\alpha$ represents the transmission block length weighting coefficient, $N_{symb}^{data}$ represents the total number of OFDM symbols that the base station schedules for the terminal device to transmit data, $N_{symb}^{UCI}$ represents the number of OFDM symbols used for transmitting the uplink control information in $N_{symb}^{data}$ symbols, and the terminal device is an execution body of the method.

Wherein, the total number of OFDM symbols scheduled by the base station for the terminal device is the total number of available OFDM symbols that the base station allocates for the first UE and the second UE, that is, the total number of OFDMs that may be used when the first UE and the second UE perform full-duplex transmission. For example, if the resources allocated by the base station to the first UE and the second UE are resources of one subframe, the total number of OFDM symbols is the number of OFDM symbols corresponding to the first subframe. Since the first UE and the second UE occupy same time-frequency resources, the total number of OFDM symbols scheduled by the base station for the terminal device is identical for both the first UE and the second UE.

It may be understood that foregoing Manner 1, Manner 2, and Manner 3 are also applicable to the second UE, since the second UE and the first UE occupy same time-frequency resources, and there is also a problem that the increase of the decoding errors due to the increase of the code rate of actual transmission data for the second UE when the base station does not transmit the downlink data on the REs used for the first UE to transmit the uplink control information and adopts the foregoing centralized resource allocation manner.

In an actual application, the base station may transmit an initial MCS to the first UE and the second UE, and the first UE and the second UE may calculate an actual transmission block length by using the foregoing manner for calculating an initial transmission block length and a transmission block length weighting coefficient.

In another manner, corresponding to the foregoing manner 2, the base station may calculate the actual transmission block lengths according to each initial MCS of the first UE and the second UE by the foregoing manner of calculating actual transmission block length; the base station may inversely calculate respectively corresponding actual MCS based on the calculated actual transmission block lengths, so that the actual transmission block lengths of the respective inversely calculated actual MCSs are equal to or approximately equal to the respective actual transmission block lengths; the base station will inform respectively the first and second UEs inversely calculated actual MCSs in the downlink control information of the respective downlink scheduling, and the first and second UEs only need to calculate the actual transmission block lengths according to the actually received MCSs.

For the foregoing Manner 3, a larger subcarrier spacing may be configured for the OFDM symbol used for the first UE to report the uplink control information, and therefore, the duration of the time domain waveform becomes shorter. There will be multiple narrow-waveform OFDM symbols in the duration of an original OFDM symbol with wide waveform; meanwhile, the first UE may report the uplink control information only with a part of narrow-waveform OFDM symbols, and the remaining narrow-waveform OFDM symbols together with other wide-waveform OFDM symbols are used for the first UE to transmit the uplink data and for the base station to transmit the downlink data, thereby increasing the uplink and downlink data throughput. The base station and the second UE perform data mapping and extracting on the narrow waveform OFDM symbol with wide subcarrier spacing, and perform data mapping and extracting on the wide waveform OFDM symbol with narrow subcarrier spacing. Although the processing complexity of the base station and the terminal device is increased, the number of REs actually used for downlink data transmission will increase, which may improve the uplink and downlink data throughput. The specific size relationship between the subcarrier spacing of the first OFDM sub-symbol or the subcarrier spacing of the second OFDM sub-symbol, and the subcarrier spacing of an OFDM symbol of which all REs are used for transmitting data, is related to a proportion of time domain resources corresponding to an original OFDM symbol occupied by the first OFDM sub-symbol or the second OFDM sub-symbol.

Figure 18:
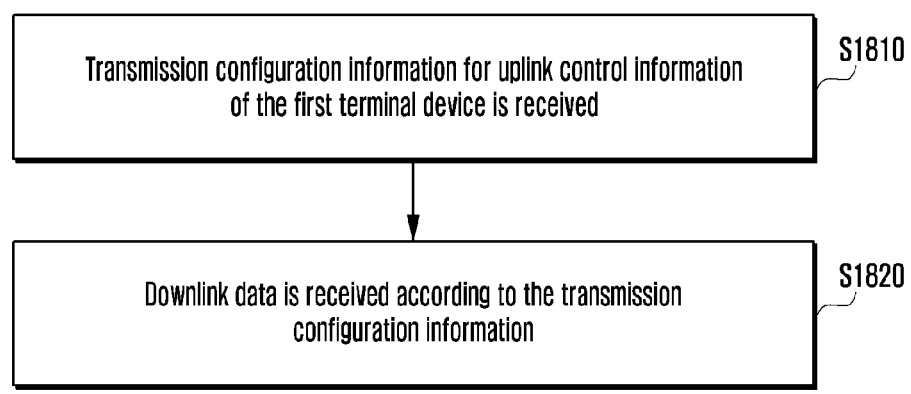
FIG. 18 is a schematic flowchart of another method for transmitting uplink control information according to an embodiment of the present application.

Based on the same principle of the method as shown in FIG. 17, the embodiment of the present application further provides a method for receiving downlink data, where the method may be specifically performed by a second terminal device, that is, a second UE, wherein the second UE is a UE performing full-duplex transmission with the first UE. As shown in FIG. 18, the method may include:

Step S1810: receiving transmission configuration information for reporting the uplink control information of a first terminal device;

Step S1820: receiving downlink data according to the transmission configuration information.

The transmission configuration information includes transmission indication information, wherein the transmission indication information is used to indicate the first terminal device to transmit the uplink control information on pilot OFDM symbols or to transmit the uplink control information on data OFDM symbols. If the second terminal device does not receive downlink data on the REs used for transmitting the uplink control information by the first terminal device, the transmission configuration information further includes position indication information, wherein the position indication information is used to indicate the position of REs used for transmitting the uplink control information on pilot OFDM symbols or data OFDM symbols.

It may be seen that, for the first UE and the second UE that occupy the same time-frequency domain resources in the full-duplex transmission, in the method shown in FIG. 18, the first UE is a UE that occupies uplink resources in the full-duplex transmission, and the second UE is a UE that occupies downlink resources in the full-duplex transmission.

For the second UE that performs full-duplex transmission with the first UE, if the second UE and the first UE are not the same UE, and the second UE and the first UE occupy same time-frequency resources, the base station also needs to transmit the related transmission configuration information of the first UE to the second UE, that is, whether the first UE reports the uplink control information on the pilot OFDM symbol or the data OFDM symbol, in order to ensure that the second UE may normally receive the downlink data transmitted by the base station. If the base station does not transmit the downlink data on the REs used for the first UE to transmit the uplink control information, the base station further needs to inform the position indication information to the second UE, so that the second UE may know on which REs it will not receive downlink data.

Alternatively, the transmission configuration information further includes data reception indication information, the data reception indication information is used to indicate the second terminal device to receive downlink data on the REs used for reporting UCI or to indicate the second terminal device not to receive downlink data on the REs.

That is to say, whether the second UE receives the downlink data on the REs used for the first UE to transmit the uplink control information may be determined with a manner of making an agreement with the base station or a manner of the base station informing the second UE. Alternatively, when the first terminal device transmits the uplink control information on pilot OFDM symbols, the second terminal device does not receive downlink data on the REs used for transmitting the uplink control information by the first terminal device, meaning that the second terminal device does not receive downlink data on the OFDM symbol used for transmitting the uplink control information by the first terminal device; if the second terminal device does not receive downlink data on the REs used for transmitting the uplink control information by the first terminal device, the transmission configuration information further includes the position indication information. If the second terminal device does not receive downlink data on the REs used for transmitting the uplink control information by the first terminal device, and the first terminal device transmits the uplink control information on data OFDM symbols, the transmission configuration information further includes the position indication information; the position indication information is used to indicate position of REs used for transmitting the uplink control information on an OFDM symbol used for transmitting uplink data.

Alternatively, the position indication information may include information indicating the number of REs (i.e., REs used for transmitting uplink control information).

Alternatively, when transmitting the uplink control information on data OFDM symbols, the position indication information includes indication information of a resource allocation manner of the REs used for reporting UCI. The resource allocation manner of the REs used for reporting UCI includes a first allocation manner or a second allocation manner, wherein the first allocation manner means that the REs used for reporting UCI are discretely distributed on OFDM symbols used for transmitting the uplink control information, and the second allocation manner means that the REs used for reporting UCI are all REs of at least one data OFDM symbol.

Alternatively, the REs used for reporting UCI are uniformly distributed on different OFDM symbols used for transmitting the uplink control information and/or the REs used for reporting UCI on the same one OFDM symbol used for transmitting the uplink control information are uniformly distributed in frequency, if the number of the REs used for reporting UCI is at least two, when the first terminal device transmits the uplink control information on pilot OFDM symbols, or the first terminal device transmits the uplink control information on data OFDM symbols and the REs used for reporting UCI being discretely distributed on OFDM symbols used for transmitting the uplink control information.

Alternatively, if the second terminal device does not receive the downlink data on the REs used for the first terminal device to transmit the uplink control information, receiving the downlink data according to the transmission configuration information, includes:

determining a position of each of the REs on each OFDM symbol used for transmitting the uplink control information according to any of the following:

a first frequency offset and/or second frequency offset in the position indication information;

the position indication information, and a first frequency offset and/or second frequency offset determined by pre-configuration information;

a first frequency offset determined by pre-configuration information and a second frequency offset in the position indication information;

a second frequency offset determined by pre-configuration information and a first frequency offset in the position indication information;

receiving the downlink data according to a position of each of the REs on each OFDM symbol used for transmitting the uplink control information, that is, not receiving the downlink data on the REs used for reporting UCI at corresponding positions of each OFDM symbol used for the first terminal device to transmit the uplink control information;

wherein, the first frequency offset is a frequency offset of a first RE used for reporting UCI on each OFDM symbol used for transmitting the uplink control information, and the second frequency offset is a second frequency offset between adjacent REs used for reporting UCI in frequency domain on the adjacent OFDM symbols used for transmitting the uplink control information.

Alternatively, in the case of UE reporting the uplink control information on the OFDM symbols used for transmitting the uplink control information and transmitting the uplink control information on the OFDM symbol used for transmitting the uplink pilot signal, the determining a position of each of the REs on each OFDM symbol used for transmitting the uplink control information includes the following, if the REs used for reporting UCI are uniformly distributed on different OFDM symbols used for transmitting the uplink control information and the REs used for reporting UCI on the same one OFDM symbol used for transmitting the uplink control information are uniformly distributed in frequency:

determining a position of each of the REs used for reporting UCI on each OFDM symbol used for transmitting the uplink control information, according to the number of OFDM symbols used for transmitting the uplink control information, the number of the REs used for reporting UCI, the first frequency offset, the second frequency offset, and the number of subcarriers within a scheduling bandwidth.

Alternatively, the position indication information further includes a position identifier of the OFDM symbol used for transmitting the uplink control information.

Alternatively, when transmitting the uplink control information on data OFDM symbols the method further includes at least one of the following, if the REs used for reporting UCI are all REs on at least one data OFDM symbol and the base station does not transmit downlink data on the RE used for reporting UCI:

Manner 1:
receiving an initial MCS; determining an initial transmission block length according to the initial MCS;
determining a transmission block length weighting coefficient according to a ratio of the number of OFDM symbols of the first terminal device used for transmitting the uplink control information to all OFDM symbols in one subframe or one slot, wherein the transmission block length weighting coefficient is greater than 0 and less than 1;
calculating an actual transmission block length according to the initial transmission block length and the transmission block length weighting coefficient;
receiving the downlink data according to the actual transmission block length;

Manner 2:
receiving an actual MCS; calculating an actual transmission block length according to the actual MCS;
receiving downlink data according to the actual transmission block length;

Manner 3:
the OFDM symbol used for the first terminal device to transmit the uplink control information being configured as a first OFDM sub-symbol and a second OFDM sub-symbol, the REs used for reporting UCI are all REs on the first OFDM sub-symbol, and the subcarrier spacing on the OFDM symbol used for the first terminal device to transmit the uplink control information being greater than the subcarrier spacing on the OFDM symbol of which all REs are used for transmitting the uplink data;
receiving downlink data by the second OFDM sub-symbol and the OFDM symbol of which all REs are used for transmitting the uplink data.

Alternatively, the transmission block length weighting coefficient is:

$$\alpha = 1 - \frac{N_{symb}^{UCI}}{N_{symb}^{data}}$$

wherein, $\alpha$ represents the transmission block length weighting coefficient, $N_{symb}^{data}$ represents the total number of OFDM symbols that the base station schedules for the terminal device to receive/transmit data, $N_{symb}^{UCI}$ represents the number of OFDM symbols used for transmitting the uplink control information in $N_{symb}^{data}$ symbols, and the terminal device is an execution body of the method shown in FIG. 18.

It will be apparent to those skilled in the art that the method shown in FIG. 18 and its alternative embodiments and the method illustrated in FIG. 17 and its alternative embodiments are based on the same principle. Detailed description of the method and its embodiments shown in FIG. 18 may be found in the corresponding description of alternative embodiments of the method illustrated in FIG. 17. For example, the detailed description of the foregoing first frequency offset, second frequency offset, Manner 1, Manner 2, and Manner 3 in an alternative embodiment of the method shown in FIG. 18, may be refer to the corresponding description of the first frequency offset, second frequency offset, Manner 1, Manner 2, and Manner 3 in the foregoing method shown in FIG. 17, which will not be repeated herein.

In order to better illustrate the solution of the embodiment of the present invention, the scheme for reporting the uplink control information of the full-duplex system provided by the embodiment of the present invention is further described below with reference to specific examples. In the examples, the first UE and the second UE that occupy same time-frequency resources, that is, perform full-duplex transmission, are described at the same time. In the following description, if the description of the terminal is directly used, the terminal refers to the first UE and/or the second UE.

Example 1

Figure 19:
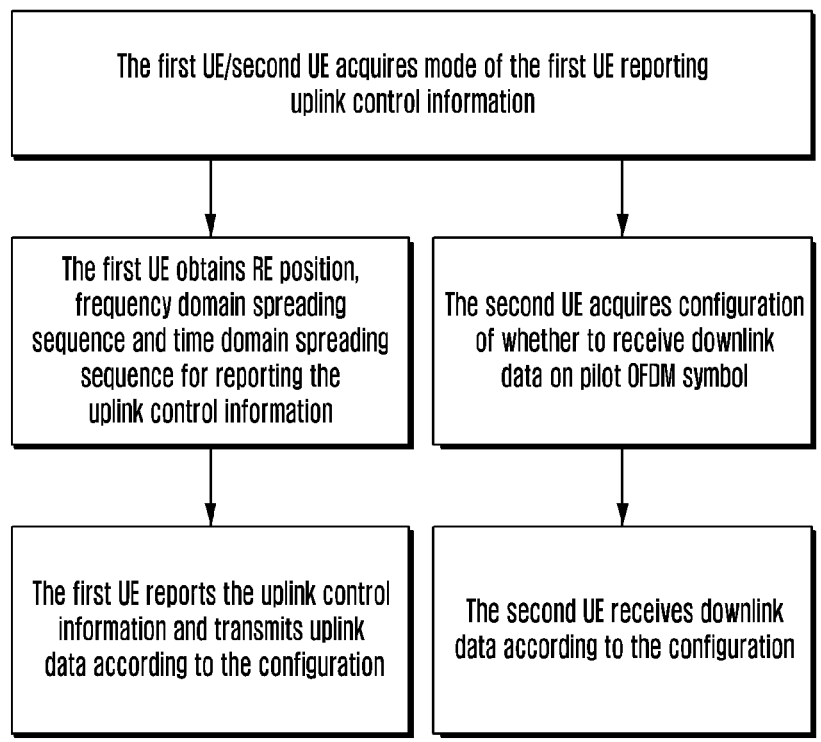
FIG. 19 is a schematic flowchart of a terminal device reporting uplink control information and receiving downlink data when reporting uplink control information on an OFDM symbol used for transmitting a pilot according to an example of the present application.

This example describes a transmission manner in which the first UE adopts the first mode, that is, the uplink control information is reported on the OFDM symbol (referred to as the pilot OFDM symbol) used for transmitting the pilot signal. FIG. 19 illustrates a schematic flow chart of the transmission manner in this example.

Specifically, as shown in FIG. 19, the first UE and the second UE performing the full-duplex transmission first obtain the uplink control information reporting mode of the uplink terminal from the base station, that is, reporting on the OFDM symbol transmitting pilot or on the OFDM symbol transmitting data, and in this example, the reporting mode obtained by the uplink/downlink terminal from the base station is the former. Then, for the first UE, the RE position (i.e., position indication information) for reporting the uplink control information, the used frequency domain spreading sequence, as well as the time domain spreading sequence (which may be specifically an OCC sequence) are also acquired from the base station. After obtaining the above configuration, the uplink terminal reserves a number of REs of the OFDM symbols used for transmitting the uplink pilot signal, for reporting the uplink control information, and transmits the uplink pilot signal on other REs of the OFDM symbol and the uplink data on other OFDM symbols. For the second UE performing full-duplex transmission, after obtaining the configuration that the first UE reports the uplink control information on the pilot OFDM symbol, the second UE may also obtain, from the base station, the configuration whether to receive the downlink data on the pilot OFDM symbol. If the base station is configured not to transmit the downlink data on the OFDM symbol used for transmitting the uplink pilot in order to ensure that the uplink channel estimation accuracy is not affected by the downlink self-interference signal, the second UE will receive the downlink data on other OFDM symbols configured for the terminal except the pilot OFDM symbol. If the base station is configured to transmit the downlink data on the pilot OFDM symbol, the second UE will receive the downlink data on all OFDM symbols allocated to the terminal.

Example 2

The example provides a specific RE resource allocation manner when reporting the uplink control information on the pilot OFDM symbol. In this example, for illustrative description, the scheduling bandwidth of the terminal device is one Physical Resource Block (PRB) and the time domain resource is one subframe.

Figure 20:
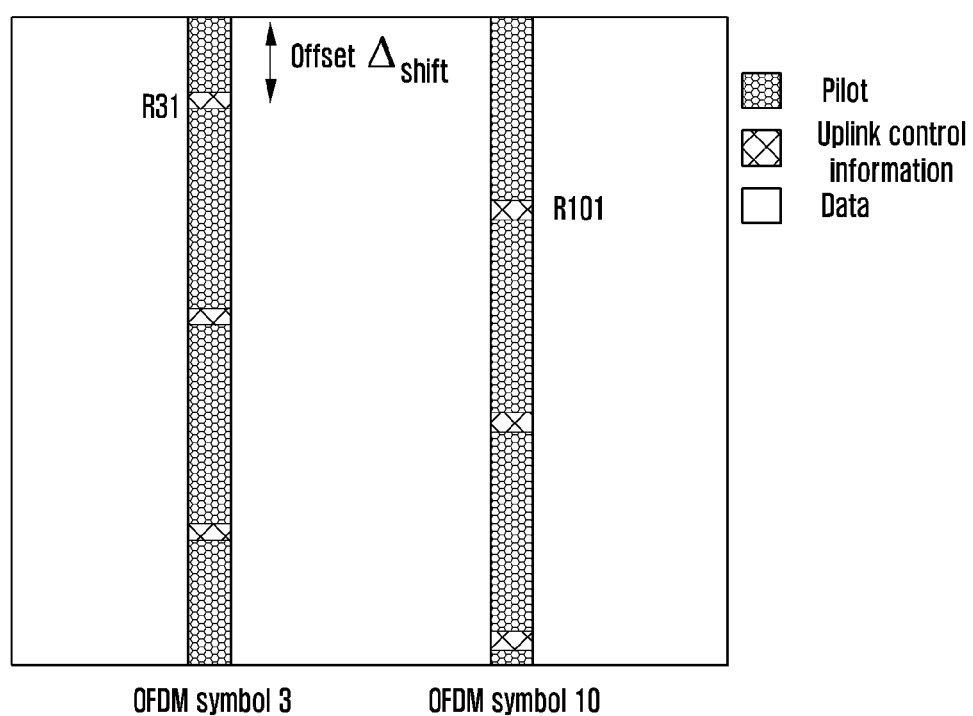
FIG. 20 is a schematic diagram of a manner for allocating resources for reporting uplink control information on an OFDM for transmitting a pilot signal in an example of the present application.

FIG. 20 is a schematic diagram showing the allocation manner of uplink resources with one PRB in the frequency domain and one subframe in the time domain in the present example. In the figure, the abscissa (horizontal direction) corresponds to the time domain, indicating the sequence number of the OFDM symbols, for example the sequence number 0 indicates the 1st OFDM symbol, the OFDM symbol 3 and the OFDM symbol 10 in the figure respectively represent the 4th and 11th OFDM symbols; the ordinate (vertical direction) corresponds to the frequency domain, indicating subcarrier number; the blank area in the figure represents resources used for transmitting the uplink data; the loose grid represents the RE for transmitting the uplink control information on the OFDM symbol used for transmitting the pilot signal; and the dense grid represents the RE for transmitting the pilot signal on the OFDM symbol for transmitting the pilot signal.

If the system is configured with M OFDM symbols used for uplink channel estimation, that is, M OFDM symbols are used for reporting of uplink pilot signals, FIG. 19 only illustrates a special case of M=2. There are $N_{SC}$ subcarriers within the scheduling bandwidth of the uplink terminal, which are numbered in increasing order, and the subcarrier number in lowest frequency is recorded as 0. The base station configures for the terminal with $N_{UCI}$ REs for reporting uplink control information, and in order to fully obtain the diversity gain, the $N_{UCI}$ REs reporting the uplink control information are uniformly distributed in time and frequency. There are $$\frac{N_{UCI}}{M}$$

REs, used for reporting the uplink control information, on M pilot OFDM symbols, and the spacing between two adjacent REs, used for reporting uplink control information, on each pilot OFDM symbol is $$\frac{M \cdot N_{sc}}{N_{UCI}}$$

subcarriers. In order to suppress inter-cell interference, there must be $\Delta_{shift}$ subcarrier offset, and as shown in FIG. 19, the offset $\Delta_{shift}$ is informed by the base station or calculated by a calculation method known by both the base station and the terminal. In addition, for the purpose of channel estimation accuracy, there are $$\frac{N_{sc}}{N_{UCI}}$$

subcarrier offset in frequency of the REs, used for reporting uplink control information, on M pilot OFDM symbols. As shown in FIG. 19, assuming that R31 shown in the figure is the first RE used for transmitting uplink control information on OFDM symbol 3, and R101 is the first RE used for transmitting uplink control information on OFDM symbol 10, then there are $\Delta_{shift}$ subcarrier offset between R31 and the initial position of the scheduling bandwidth, and $$\frac{N_{sc}}{N_{UCI}}$$

subcarrier offset between R31 and R101. Based on the above design, the RE sequence number used for reporting the uplink control information on the $m^{th}$ pilot OFDM symbol is,
wherein k represents the kth RE used for reporting the uplink control information on the $m^{th}$ pilot OFDM symbol, $$k = 0, 1, \cdots, \frac{N_{UCI}}{M} - 1, m = 0, 1, \cdots, M - 1.$$

In the MIMO mode or the non-orthogonal multiple access mode, multiple uplink terminals may use same time-frequency resources to upload data, and each terminal will report the uplink control information on the PUSCH. Therefore, in order to improve the capacity of reporting the uplink control information, that is, to support more terminals to report the uplink control information, frequency domain spreading and time domain spreading may be performed on the uplink control information modulation symbols transmitted on uplink control information resources. If increasing the uplink control information capacity by time domain spreading or frequency domain spreading, the base station needs to inform the OCC sequence used by each terminal in the downlink control information corresponding to the uplink transmission.

This example provides a method for the first UE to report uplink control information on a pilot OFDM symbol. When the scheduling bandwidth is relatively large, the proportion of the REs occupied by the uplink control information to total REs of the pilot OFDM symbols is low, that is, the resource density of the uplink control information is low, which will not significantly affect uplink channel estimation accuracy; when the scheduling bandwidth is small, the method will lead to a large decrease in pilot sequence length, and the uplink channel estimation accuracy will be greatly affected. Therefore, the method of reporting the uplink control information on the pilot OFDM symbol is more suitable for the case where the scheduling bandwidth is relatively large.

Example 3

Figure 21:
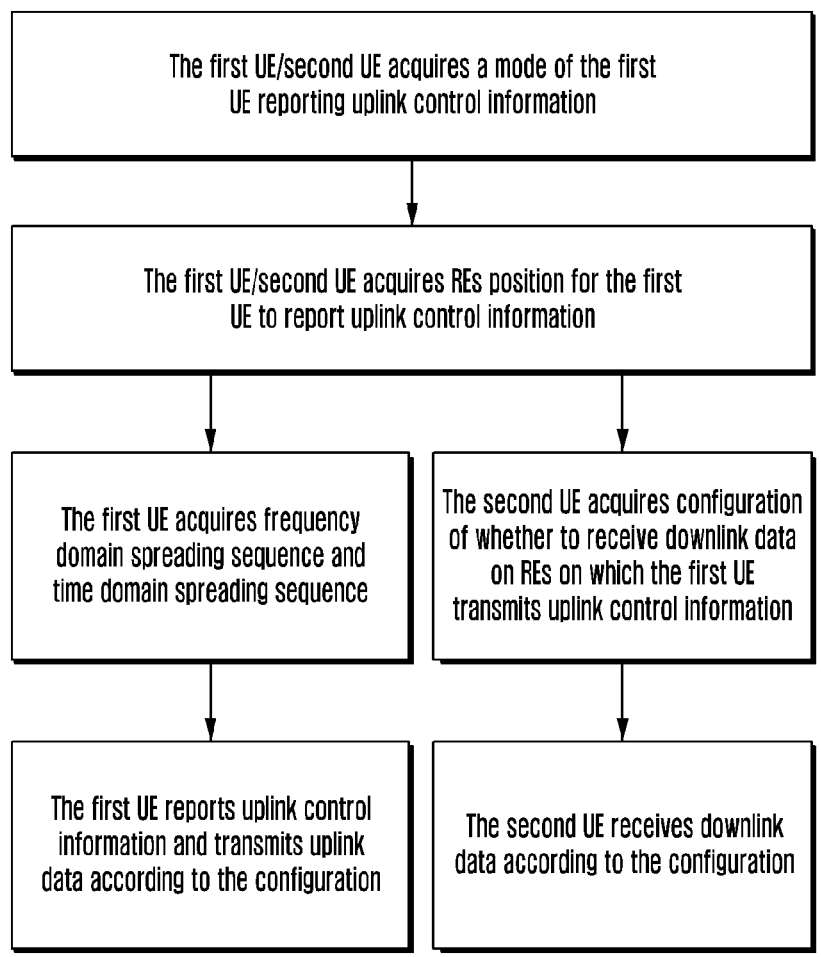
FIG. 21 is a schematic flowchart of a terminal device reporting uplink control information and receiving downlink data when reporting uplink control information on an OFDM symbol for transmitting uplink data in an example of the present application.

This example describes a transmission manner in which the second mode is adopted, that is, the uplink control information is reported on the OFDM symbol (referred to as the data OFDM symbol) used for transmitting the uplink data. FIG. 21 illustrates a schematic flowchart of the transmission manner in this example.

For a service such as Voice over Long-Term Evolution (VoLTE), with small data packet, the bandwidth allocated to each user is usually small, and the scheduling bandwidth of most VoLTE users is within 2 PRBs. If the resource is reserved for reporting the uplink control information in the uplink pilot OFDM symbol, the resource density of the uplink control information is relatively large, and the pilot sequence length used for uplink channel estimation may be insufficient, which may reduce the uplink channel estimation accuracy. Therefore, if the first UE needs to report the uplink control information on the scheduling resource, it can only report uplink control information with several reserved REs of OFDM symbols used for transmitting uplink data. Specifically, the first UE and the second UE performing the full-duplex transmission first obtain the uplink control information reporting mode of the uplink terminal from the base station, that is, reporting on the OFDM symbol transmitting pilot or on the OFDM symbol transmitting data. In this example, the reporting manner obtained by the uplink/downlink terminal from the base station is the latter. In addition, the uplink/downlink terminal should also obtain the position of the RE for the uplink terminal to report uplink control information from the base station, that is, the position indication information. Then, for the first UE, the frequency domain spreading sequence and the time domain spreading sequence used for reporting the uplink control information are also acquired from the base station. After obtaining the above configuration, the first UE reports the uplink control information on the allocated resources, and transmits the uplink data on other REs used for transmitting the uplink data. For the second UE performing full-duplex transmission, after obtaining the configuration that the first UE reports the uplink control information on data OFDM symbols and the position of the REs reporting the uplink control information, the second UE may also obtain, from the base station, the configuration whether to receive the downlink data on these REs. If the base station is configured not to transmit the downlink data on these REs used for reporting the uplink control information, the second UE will receives the downlink data on other REs allocated for it except the REs for reporting uplink control information. If the base station is configured to transmit the downlink data on the REs used for reporting the uplink control information, the second UE receives the downlink data on all REs allocated for it.

Whether to transmit/receive downlink data on the REs for reporting the uplink control information may depend on the self-interference cancellation capability of the base station side. If the self-interference cancellation capability of the base station side is sufficient to reduce the self-interference signal power to less than the noise floor, the base station may configure the second UE to receive the downlink data on the REs for reporting the uplink control information when the base station transmits the downlink data. If the self-interference cancellation capability of the base station side is insufficient to reduce the self-interference signal power to less than the noise floor, or the nonlinearity of the base station component cannot be well compensated, the interference from downlink signals of the base station side to resources reporting the uplink control information needs to be reduced in order to ensure accurate reporting of the uplink control information, and the base station needs to configure the second UE not to receive the downlink data on the RE reporting the uplink control information when the base station transmits downlink data to the second UE.

Example 4

In this example, discrete resource allocation described in the foregoing is used to provide a specific RE resource allocation manner when the uplink control information is reported on the data OFDM symbol. In this example, for illustrative description, the scheduling bandwidth of the terminal device is one PRB and the time domain resource is one subframe.

Figure 22:
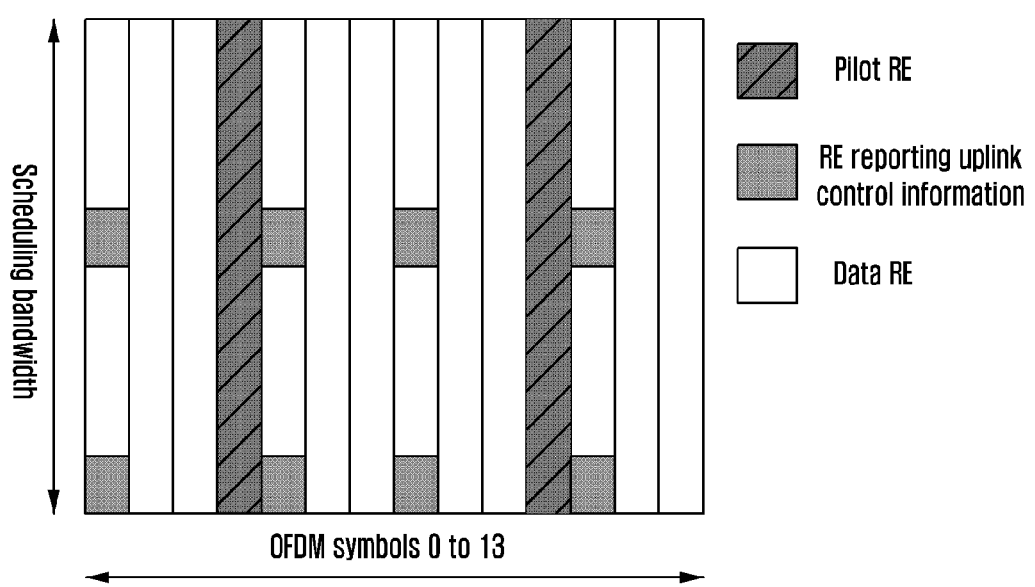
FIG. 22 is a schematic diagram of a manner for allocating resources for reporting uplink control information on an OFDM for transmitting uplink data in an example of the present application.

FIG. 22 is a schematic diagram showing an allocation manner of uplink resources with one PRB in frequency domain and one subframe in time domain, wherein, in the figure, the abscissa (horizontal direction) corresponds to the time domain, indicating OFDM symbol number, and the ordinate (vertical direction) corresponds to the frequency domain, indicating subcarrier number. As may be seen from the figure, among the 14 OFDM symbols, the number of pilot OFDM symbols is 2, and the number of data OFDM symbols is 12, wherein there are 4 OFDM symbols used for transmitting uplink control information among the 12 data OFDM symbols, and 8 REs used for reporting uplink control information, wherein there are 2 REs used for transmitting the uplink control information on each OFDM symbol among the 4 data OFDM symbols.

In order to fully obtain diversity gain, the resources used for reporting uplink control information should be uniformly distributed in both time domain and frequency domain, and the resource density may be configured by the base station. If the uplink channel fading relatively fast in the time domain, a higher time domain density of the uplink control information resource may be configured. If the uplink channel fading relatively fast in the frequency domain, a higher frequency domain resource density of the uplink control information may be configured. For a case where the self-interference cancellation capability of the base station side is relatively strong (the self-interference signal power may be eliminated to less than the noise floor), this resource allocation manner may be adopted, which is capable of ensuring the uplink channel estimation accuracy and not significantly reducing the downlink data throughput.

Example 5

In this example, the centralized resource allocation described in the foregoing is used to provide a specific RE resource allocation manner when the uplink control information is reported on the data OFDM symbol, wherein the centralized resource allocation manner may use all REs of one or more OFDM symbols to report the uplink control information. In this example, for illustrative description, the scheduling bandwidth of the terminal device is one PRB and the time domain resource is one subframe.

Figure 23:
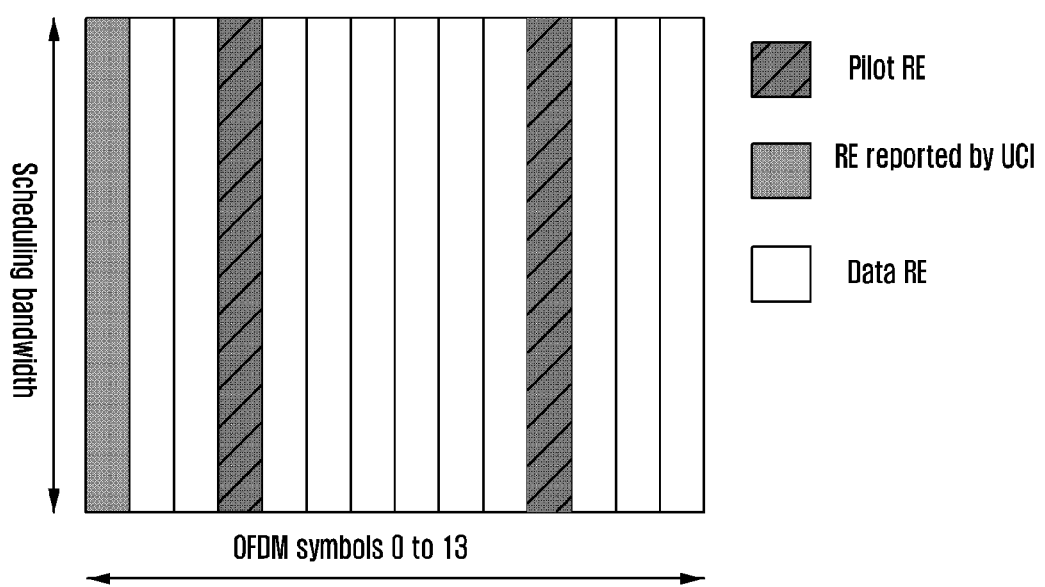
FIG. 23 is a schematic diagram of a manner for allocating resources for reporting uplink control information on an OFDM for transmitting uplink data in another example of the present application.

FIG. 23 is a schematic diagram showing an allocation manner of uplink resources with one PRB in frequency domain and one subframe in time domain, wherein, in the figure, the abscissa (horizontal direction) corresponds to the time domain, indicating OFDM symbol number, and the ordinate (vertical direction) corresponds to the frequency domain, indicating subcarrier number. As may be seen from the figure, among the 14 OFDM symbols, the number of pilot OFDM symbols is 2, and the number of data OFDM symbols is 12, wherein there are 1 OFDM symbol used for transmitting the uplink control information among the 12 data OFDM symbols. All REs of the one data OFDM symbol are used for transmitting the uplink control information.

In an actual application, when the self-interference cancellation capability of the base station side is not very strong, and the centralized resource allocation manner may be used to allocate resources for reporting the uplink control information, and the OFDM symbol number used for reporting the uplink control information may be a fixed default value or may be informed by the base station in the downlink control information of the downlink scheduling. Regardless of the self-interference cancellation capability of the base station side, the centralized resource allocation manner may be used for reporting uplink control information. In particular, if the self-interference cancellation capability of the base station side is insufficient to eliminate self-interference signal power to less than the noise floor, the base station should use the centralized resource allocation manner to report uplink control information.

Example 6

For the case of base station configuring the first UE to report UCI with the centralized allocation manner and the second UE not to receive downlink data on the REs configured for UCI reporting, several OFDM symbols are not available for uplink and downlink data transmission therefore the number of OFDM symbols actually used for uplink and downlink data transmission is reduced. Transmission block length, which is determined by SINR, whether measured by base station or reported by the first UE, will not change along with reduction of the number of OFDM symbols actually used for uplink and downlink data transmission according to existing MCS determination method. Therefore, actual code rate gets larger and it may cause the decoding error of the entire transmission block and a significant impact on system throughput.

In order to cope with such a situation in which system throughput is deceased due to not downloading data on OFDM symbols used for reporting uplink control information, various processing manners may be adopted. A processing manner (referred to as the first processing manner) is to adjust the transmission block length under the premise of ensuring the code rate being unchanged, and the other processing manner (referred to as the second processing manner) is to reduce time domain waveform length of the OFDM symbol used for reporting uplink control information. In the example, the first processing manner is detailed. Schematic flowcharts of two schemes for decreasing the code rate by reducing transmission block length in this example are shown in FIGS. 24 and 25.

Figure 24:
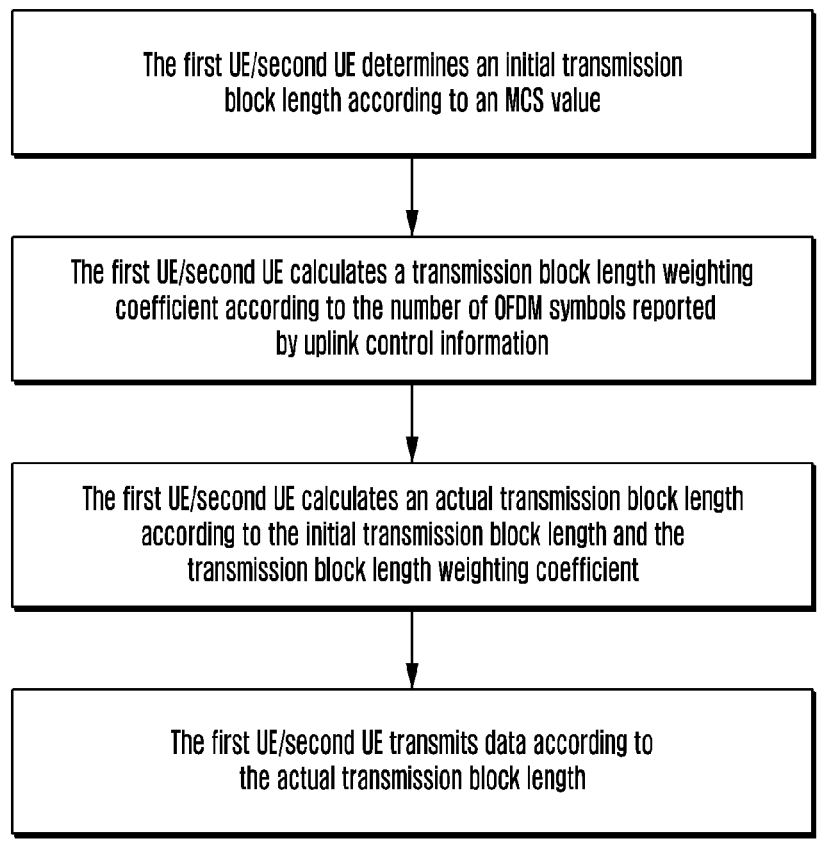
FIG. 24 is a schematic flowchart of a manner in which a terminal device performs data transmission in an example of the present application.

As shown in FIG. 24, which is an example of the first processing manner, base station calculates the MCS (initial MCS) and the corresponding transmission block length $L_{init}$ (i.e., the initial transmission block length) according to SINR, and $L_{init}$ is multiplied with a coefficient α to obtain actual transmission block length, i.e. $L_{actual}=[\alpha * L_{init}]$, where [·] represents rounding. The value of α is related to a proportion of OFDM symbols used for reporting uplink control information to all OFDM symbols in one subframe or slot. If there are $N_{symb}^{data}$ OFDM symbols used for transmitting uplink and downlink data and $N_{symb}^{UCI}$ OFDM symbols used for reporting uplink control information in one subframe or slot, then the calculation method of α is $$\alpha = 1 - \frac{N_{symb}^{UCI}}{N_{symb}^{data}}.$$

After the terminal (the first UE and/or the second UE) obtains the MCS from the downlink control information of the downlink scheduling, the terminal will also calculates the actual transmission block length in the same manner (as shown in FIG. 24), and decode the data.

Figure 25:
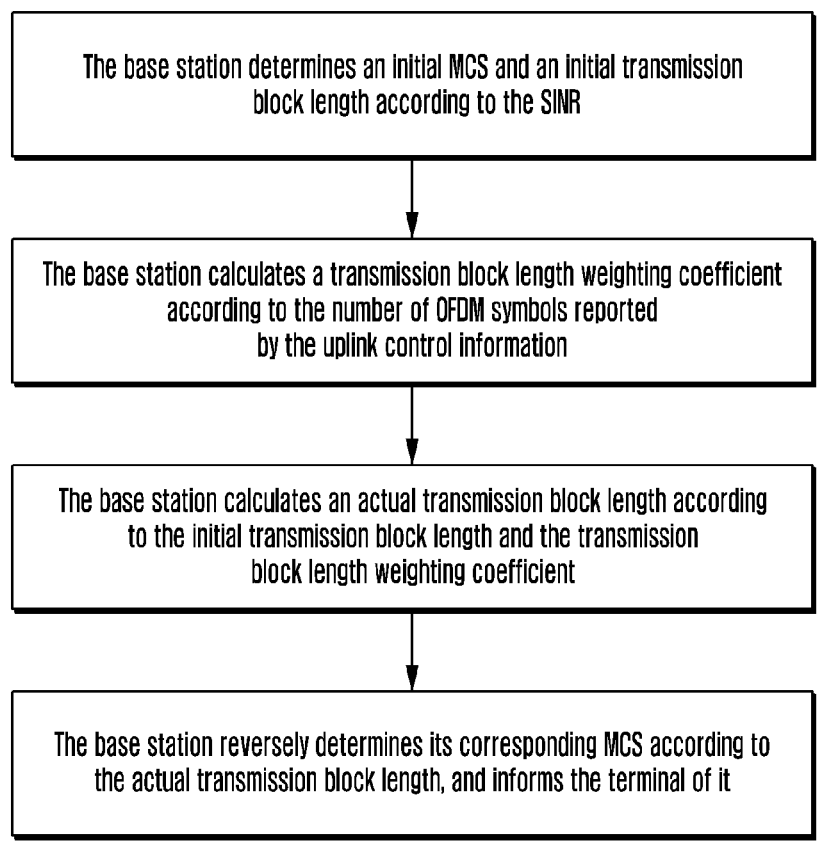
FIG. 25 is a schematic flowchart of a manner in which a base station determines an actual Modulation and Coding Scheme (MCS) in an example of the present application.

As shown in FIG. 25, which is another example of the first processing manner, base station calculates the original MCS and the corresponding transmission block length $L_{init}$ according to SINR, calculates the actual transmission block length $L_{actual}=[\alpha * L_{init}]$ under the premise of ensuring the code rate being unchanged, and reversely calculates the corresponding actual MCS according to $L_{actual}$, so that the transmission block length corresponding to the reversely calculated actual MCS is equal to or approximately equal to the actual transmission block length $L_{actual}$. The MCS field in the downlink control information of the downlink schedule of the actual MCS is informed to the terminal, and the terminal only needs to calculate the transmission block length according to the actually received MCS.

Example 7

In this example, the second processing manner, which is to reduce the time domain waveform length on the OFDM symbol used for reporting uplink control information, is described as an example.

Figure 26:
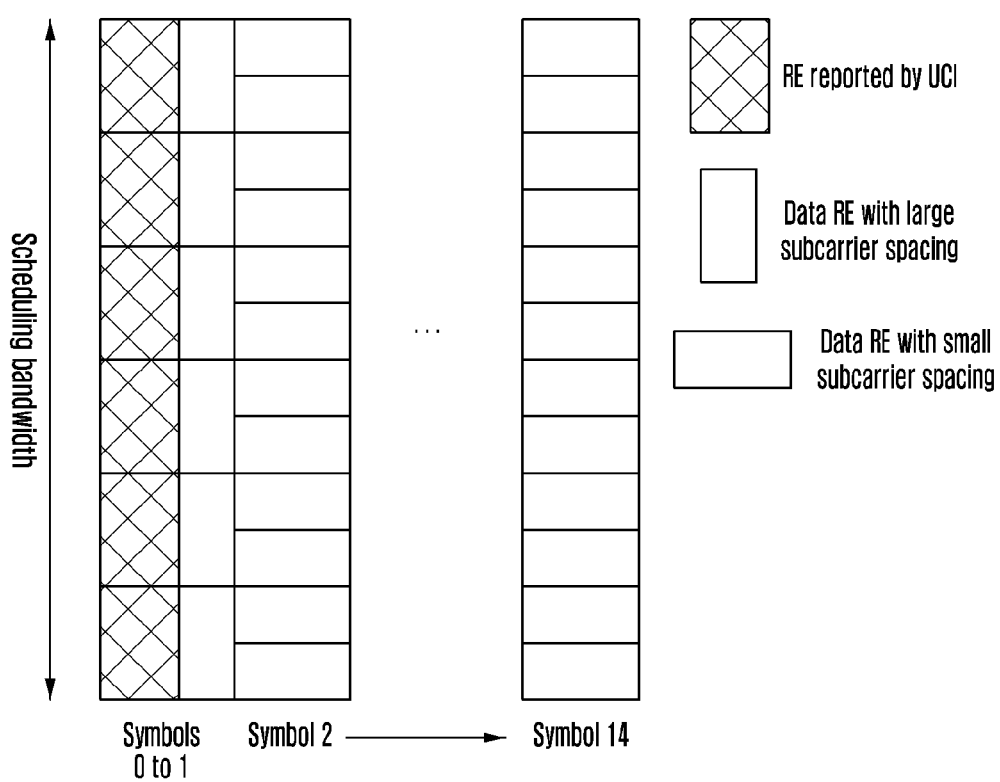
FIG. 26 is a schematic diagram of a manner for allocating resources for reporting uplink control information on an OFDM for transmitting uplink data in a further example of the present application.

An example of the second processing manner is shown in FIG. 26, which provides an asymmetric intra-slot frame structure, specifically, a larger subcarrier spacing is configured for OFDM symbols used for reporting uplink control information. There will be more narrow-waveform OFDM symbols in the duration of one original OFDM symbol, and only a part of narrow-waveform OFDM symbols are used for reporting uplink control information, and the remaining narrow-waveform OFDM symbols together with other wide-waveform symbols are used for transmitting uplink and downlink data, thereby increasing uplink and downlink data throughputs. Base station and terminals perform data mapping and extracting on narrow-waveform OFDM symbols with wide subcarrier spacing, and perform data mapping and extracting on wide-waveform OFDM symbols with narrow subcarrier spacing.

FIG. 26 shows an example of configuring the original OFDM symbol 0 to occupy two narrow-waveform OFDM symbols, which are symbols 0 and 1 in the figure. In this case, there are total 15 OFDM symbols, i.e., thirteen wide-waveform OFDM symbols (symbol 2 to symbol 14) and two narrow waveform OFDM symbols, wherein the subcarrier spacing of the two narrow waveform OFDM symbols are twice of that of the thirteen wide-waveform OFDM symbols, and symbol 1 to symbol 14 are all used for transmitting the downlink data and pilot, thereby increasing the number of REs actually used for transmitting downlink data. Taking the scheduling bandwidth as one resource block as an example, if the number of the original wide-waveform OFDM symbols is fourteen in the subframe or slot and it is assumed that there are two wide waveform OFDM symbols used for transmitting uplink pilot, then the number of REs actually used for transmitting data is increased from 132 to 138. In a case of same code rate, each uplink and downlink data throughput increases by 4.5%, and the total throughput increases by 9%, so that in case of same transmission block length, the code rate may be reduced accordingly, thereby improving decoding performance. If the number of the original wide-waveform OFDM symbols is 7 in the subframe or slot and it is assumed that there is 1 wide-waveform OFDM symbol used for transmitting uplink pilot, then the number of REs actually used for transmitting data is increased from 60 to 66. In a case of same code rate, each uplink and downlink data throughput increases by 10%, and the total throughput increases by 20%, so that in case of same transmission block length, the code rate may be reduced accordingly, thereby improving decoding performance. The method for changing the subcarrier spacing of the OFDM symbols on which the uplink control information is reported reduces the loss of the data transmission rate, but also limits the coverage of the cell, which accordingly may only be used for a base station with a relatively small coverage.

In the embodiment of the present application, frequency-domain spreading sequence and/or time-domain spreading sequence may be used to increase the capacity regardless of resource mapping manner and processing manner for increasing throughput.

Figure 27:
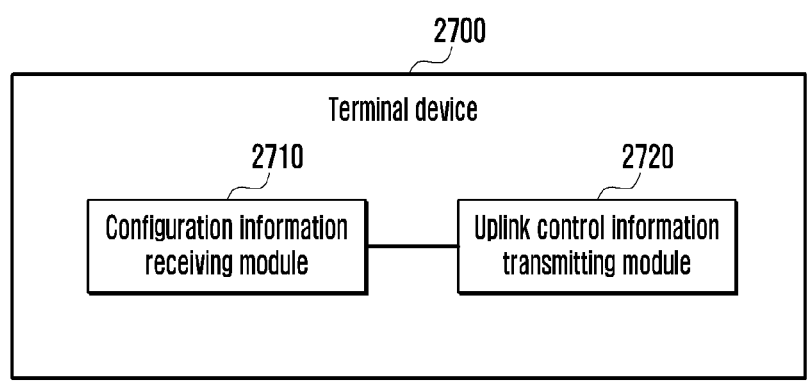
FIG. 27 is a schematic structural diagram of a terminal device according to an embodiment of the present application.

Based on the same principles, the embodiment of the present application further provides a terminal device. As shown in FIG. 27, the terminal device 2700 may include a configuration information receiving module 2710 and an uplink control information transmitting module 2720.

The configuration information receiving module 2710 is configured to receive transmission configuration information for the uplink control information;

Wherein, transmission configuration information includes transmission indication information and position indication information, wherein the transmission indication information is used to indicate to transmit uplink control information on an OFDM symbol used for transmitting uplink pilot signal or to transmit uplink control information on an OFDM symbol used for transmitting uplink data, and the position indication information is used to indicate the position of REs used for transmitting the uplink control information on an OFDM symbol used for transmitting an uplink pilot signal or an OFDM symbol used for transmitting uplink data.

The uplink control information transmitting module 2720 is configured to transmit uplink control information according to transmission configuration information.

Alternatively, transmission configuration information further includes data receiving indication information, wherein the data receiving indication information is used to indicate to receive downlink data on the REs used for reporting UCI, or indicate not to receive the downlink data on the REs used for reporting UCI; the terminal device further includes: a data receiving module, configured to receive downlink data according to data receiving indication information.

Alternatively, position indication information includes information used for indicating the number of REs used for transmitting uplink control information.

Alternatively, when transmitting uplink control information on the OFDM symbol(s) used for transmitting the uplink data, position indication information includes indication information of a resource allocation manner of the REs used for reporting UCI, the resource allocation manner of the REs used for reporting UCI includes a first allocation manner or a second allocation manner, wherein the first allocation manner means that the REs used for reporting UCI are discretely distributed on OFDM symbols used for transmitting the uplink control information, and the second allocation manner means that the REs used for reporting UCI are all REs of at least one OFDM symbol for transmitting uplink data.

Alternatively, the REs used for reporting UCI are uniformly distributed on different OFDM symbols used for transmitting the uplink control information and/or the REs used for reporting UCI on the same one OFDM symbol used for transmitting the uplink control information are uniformly distributed in frequency, if the number of the REs is at least two, when transmitting uplink control information on the OFDM symbol(s) used for transmitting uplink pilot signal, or transmitting uplink control information on the OFDM symbol(s) used for transmitting the uplink data and the REs used for reporting UCI being discretely distributed on OFDM symbols used for transmitting the uplink control information.

Alternatively, the uplink control information transmitting module 2720 may be specifically configured to:
determine positions of the REs used for reporting UCI on each OFDM symbol used for transmitting the uplink control information according to any of the following:
a first frequency offset and/or second frequency offset in position indication information;
position indication information, and a first frequency offset and/or second frequency offset determined by pre-configuration information;
a first frequency offset determined by pre-configuration information and a second frequency offset in position indication information;
a second frequency offset determined by pre-configuration information and a first frequency offset in position indication information;
transmit uplink control information according to positions of the REs used for reporting UCI on each OFDM symbol used for transmitting uplink control information;
wherein, the first frequency offset is a frequency offset of a first RE on each OFDM symbol used for transmitting uplink control information, and the second frequency offset is a second frequency offset between adjacent REs used for reporting UCI in frequency domain on the adjacent OFDM symbols used for transmitting uplink control information.

Alternatively, in case of transmitting uplink control information on the OFDM symbol(s) used for transmitting uplink pilot signal, the uplink control information transmitting module 2720 is specifically configured to perform the following operations when determining positions of the REs used for reporting UCI on each OFDM symbol used for transmitting uplink control information, if the REs used for reporting UCI are uniformly distributed on different OFDM symbols used for transmitting uplink control information and the REs used for reporting UCI on the same one OFDM symbol used for transmitting uplink control information are uniformly distributed in frequency:
determine positions of the REs used for reporting UCI on each OFDM symbol used for transmitting the uplink control information, according to the number of OFDM symbols used for transmitting the uplink control information, the number of the REs, the first frequency offset, the second frequency offset, and the number of subcarriers within a scheduling bandwidth.

Alternatively, the position indication information further includes a position identifier of the OFDM symbol used for transmitting uplink control information.

Alternatively, when the resource allocation manner is the second allocation manner, and a base station does not transmit downlink data on the REs, the terminal device further includes a data transmitting module, configured to perform at least one of the following manners:

Manner 1:
receiving an initial MCS; determining an initial transmission block length according to the initial MCS;
determining a transmission block length weighting coefficient according to a proportion of the number of OFDM symbols used for transmitting the uplink control information to all OFDM symbols in one subframe or one slot, wherein the transmission block length weighting coefficient is greater than 0 and less than 1;
calculating an actual transmission block length according to the initial transmission block length and the transmission block length weighting coefficient; transmitting the uplink data according to the actual transmission block length;

Manner 2:
receiving an actual MCS; calculating an actual transmission block length according the actual MCS;
transmitting the uplink data according to the actual transmission block length;

Manner 3:
the OFDM symbol used for transmitting the uplink control information being configured as a first OFDM sub-symbol and a second OFDM sub-symbol, the REs are all REs on the first OFDM sub-symbol, and the subcarrier spacing on the OFDM symbol used for transmitting the uplink control information being greater than the subcarrier spacing on the OFDM symbol of which all REs are used for transmitting the uplink data;
transmitting the uplink data by the second OFDM sub-symbol and the OFDM symbol of which all REs are used for transmitting the uplink data.

Alternatively, the transmission block length weighting coefficient is:

$$\alpha = 1 - \frac{N_{symb}^{UCI}}{N_{symb}^{data}}$$

wherein, $\alpha$ represents the transmission block length weighting coefficient, $N_{symb}^{UCI}$ represents the total number of OFDM symbols that the base station schedules for the terminal device to receive/transmit data, $N_{symb}^{UCI}$ represents the number of OFDM symbols used for transmitting the uplink control information in $N_{symb}^{data}$ symbols.

Alternatively, the transmission configuration information further includes a frequency domain spreading sequence and/or a time domain spreading sequence of a modulation symbol of the uplink control information.

It is to be understood that the terminal device in the embodiment of the present application may be the execution body of the method and alternative embodiments thereof shown in FIG. 17, and each module of the terminal device may have a function of implementing corresponding steps in the method. The function may be implemented by hardware or by the hardware performing the corresponding software. Each of the above modules may be a software and/or hardware, and may be implemented separately or implemented by means of integrating multiple modules. For a description of the specific functions of the modules of the terminal device and other functions, please refer to the corresponding descriptions in the foregoing methods, and details are not described herein again.

Figure 28:
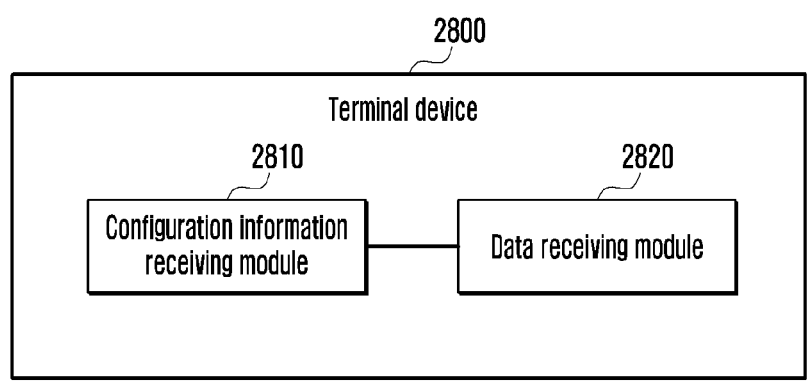
FIG. 28 is a schematic structural diagram of a terminal device according to an embodiment of the present application.

Based on the same principle, the embodiment of the present application further provides a terminal device. As shown in FIG. 28, the terminal device 2800 includes a configuration information receiving module 2810 and a data receiving module 2820.

The configuration information receiving module 2810 is configured to receive transmission configuration information for the uplink control information of a first terminal device, which performs full-duplex transmission with this terminal device;
wherein, the transmission configuration information includes transmission indication information, wherein the transmission indication information is used to indicate the first device to transmit the uplink control information on an orthogonal frequency division multiplexing (OFDM) symbol used for transmitting an uplink pilot signal or to transmit the uplink control information on an OFDM symbol used for transmitting uplink data, and if the terminal device does not receive downlink data on the REs used for transmitting the uplink control information by the first device, the transmission configuration information further includes position indication information, wherein the position indication information is used to indicate the position of REs used for transmitting the uplink control information on an OFDM symbol used for transmitting an uplink pilot signal or on an OFDM symbol used for transmitting uplink data;

The data receiving module 2820 is configured to receive downlink data according to the transmission configuration information.

It will be apparent to those skilled in the art that the foregoing first device is a terminal device that performs full-duplex transmission with the terminal device 2800.

Alternatively, the transmission configuration information further includes data reception indication information, the data reception indication information is used to indicate the second terminal device to receive downlink data on the REs or to indicate the second terminal device not to receive downlink data on the REs.

Alternatively, when the first terminal device transmits the uplink control information on an OFDM symbol used for transmitting an uplink pilot signal, the second terminal device does not receive downlink data on the resource elements (REs) used for transmitting the uplink control information by the first terminal device, indicating the second terminal device does not receive downlink data on the OFDM symbol used for transmitting the uplink control information by the first terminal device; if the second terminal device does not receive downlink data on the REs used for transmitting the uplink control information by the first terminal device, the transmission configuration information further includes position indication information, that is, the second terminal device does not receive downlink data on the REs used for transmitting the uplink control information by the first terminal device, and when the first terminal device transmits the uplink control information on the OFDM symbol used for transmitting uplink data, the transmission configuration information further includes the position indication information; the position indication information is used to indicate position of REs used for transmitting the uplink control information on an OFDM symbol used for transmitting uplink data.

Alternatively, the position indication information may include information indicating the number of REs (REs for transmitting uplink control information).

Alternatively, when transmitting the uplink control information on the data OFDM symbols, the position indication information may include indication information of a resource allocation manner of the REs used for reporting UCI, the resource allocation manner of the REs used for reporting UCI includes a first allocation manner or a second allocation manner, wherein the first allocation manner means that the REs used for reporting UCI are discretely distributed on OFDM symbols used for transmitting the uplink control information, and the second allocation manner means that the REs used for reporting UCI are all REs of at least one OFDM symbol for transmitting uplink data.

Alternatively, the REs are uniformly distributed on different OFDM symbols used for transmitting the uplink control information, and/or the REs on the same one OFDM symbol used for transmitting the uplink control information are uniformly distributed in frequency, if the number of the REs is at least two, when the first device transmits the uplink control information on the OFDM symbol used for transmitting the uplink pilot signal, or the first device transmits the uplink control information on the OFDM symbol used for transmitting the uplink data and the REs are discretely distributed on OFDM symbols used for transmitting the uplink control information.

Alternatively, if the terminal device does not receive the downlink data on the REs used for the first device to transmit the uplink control information, the data receiving module is specifically configured to:
  determine a position of each of the REs on each OFDM symbol used for transmitting the uplink control information according to any of the following:
  a first frequency offset and/or second frequency offset in the position indication information;
  the position indication information, and a first frequency offset and/or second frequency offset determined by pre-configuration information;
  a first frequency offset determined by pre-configuration information and a second frequency offset in the position indication information;
  a second frequency offset determined by pre-configuration information and a first frequency offset in the position indication information;
  receive the downlink data according to a position of each of the REs on each OFDM symbol used for the first terminal device to transmit the uplink control information, that is, not receive the downlink data on the REs at corresponding positions of each OFDM symbol used for the first terminal device to transmit the uplink control information.

Wherein, the first frequency offset is a frequency offset of a first RE on each OFDM symbol used for transmitting the uplink control information, and the second frequency offset is a second frequency offset between adjacent REs in frequency domain on the adjacent OFDM symbols used for transmitting the uplink control information.

Alternatively, in the case of transmitting the uplink control information on the OFDM symbol used for transmitting the uplink pilot signal, the data receiving module is specifically configured to perform the following operations when determining a position of each of the REs on each OFDM symbol used for transmitting the uplink control information, if the REs are uniformly distributed on different OFDM symbols used for transmitting the uplink control information and the REs on the same one OFDM symbol used for transmitting the uplink control information are uniformly distributed in frequency:
  determine a position of each of the REs on each OFDM symbol used for transmitting the uplink control information, according to the number of OFDM symbols used for transmitting the uplink control information, the number of the REs, the first frequency offset, the second frequency offset, and the number of subcarriers within a scheduling bandwidth.

Alternatively, the position indication information further includes a position identifier of the OFDM symbol used for transmitting the uplink control information.

Alternatively, when the REs (that is, the REs used for the first device to transmit uplink control information) are all REs on at least one OFDM symbol used for transmitting uplink data and the base station does not transmit downlink data on the REs, the data receiving module may perform at least one of the following:

Manner 1:
  receiving an initial MCS; determining an initial transmission block length according to the initial MCS;
  determining a transmission block length weighting coefficient according to a ratio of the number of OFDM symbols used for transmitting the uplink control information of the first device to all OFDM symbols in one subframe or one slot, wherein the transmission block length weighting coefficient is greater than 0 and less than 1;
  calculating an actual transmission block length according to the initial transmission block length and the transmission block length weighting coefficient; receiving the downlink data according to the actual transmission block length;

Manner 2:
  receiving an actual MCS; calculating an actual transmission block length according the actual MCS;
  receiving the downlink data according to the actual transmission block length;

Manner 3:
  the OFDM symbol used for transmitting the uplink control information being configured as a first OFDM sub-symbol and a second OFDM sub-symbol, the REs are all REs on the first OFDM sub-symbol, and the subcarrier spacing on the OFDM symbol used for transmitting the uplink control information of the first device being greater than the subcarrier spacing on the OFDM symbol of which all REs are used for transmitting the uplink data;
  receiving the downlink data by the second OFDM sub-symbol and the OFDM symbol of which all REs are used for transmitting the uplink data.

Alternatively, the transmission block length weighting coefficient is:

$$\alpha = 1 - \frac{N_{symb}^{UCI}}{N_{symb}^{data}}$$

wherein, α represents the transmission block length weighting coefficient, $N_{symb}^{data}$ represents the total number of OFDM symbols that the base station schedules for the terminal device to receive/transmit data, $N_{symb}^{UCI}$ represents the number of OFDM symbols used for transmitting the uplink control information in $N_{symb}^{data}$ symbols.

It is to be understood that the terminal device in the embodiment of the present application may be the execution body of the method and alternative embodiments thereof shown in FIG. 18, and each module of the terminal device may have a function of implementing corresponding steps in the method. The function may be implemented by hardware or by the hardware performing the corresponding software. Each of the above modules may be a software and/or hardware, and may be implemented separately or implemented by means of integrating multiple modules. For a description of the specific functions of the modules of the terminal device and other functions, please refer to the corresponding descriptions in the foregoing methods, and details are not described herein again.

Figure 29:
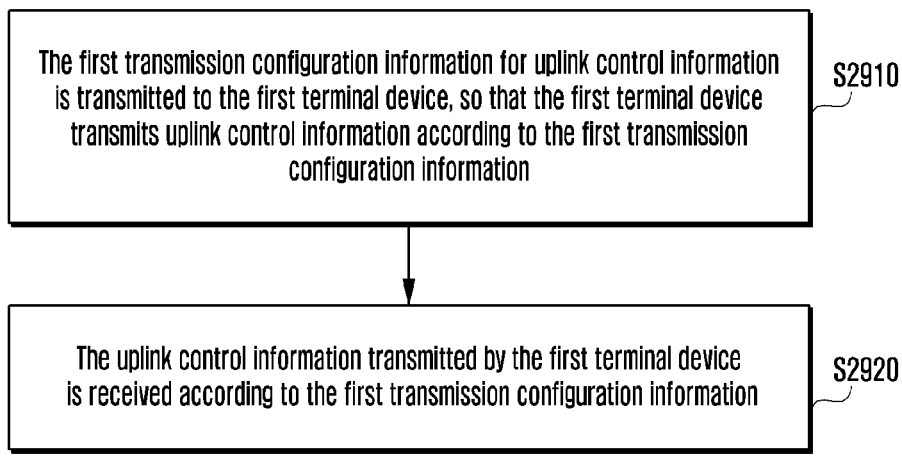
FIG. 29 is a schematic flowchart of a method for transmitting uplink control information according to an embodiment of the present application.

Based on same principles, the embodiment of the present application further provides another method for receiving uplink control information. As shown in FIG. 29, the method may include:

Step S2910: transmitting first transmission configuration information for the uplink control information to the first terminal device, so that the first terminal device transmits the uplink control information according to the first transmission configuration information;

wherein, the first transmission configuration information includes transmission indication information and position indication information, wherein the transmission indication information is used to indicate the first terminal device to transmit the uplink control information on an OFDM symbol used for transmitting an uplink pilot signal or to transmit the uplink control information on an OFDM symbol used for transmitting uplink data, and the position indication information is used to indicate the position of REs used for transmitting the uplink control information on an OFDM symbol used for transmitting an uplink pilot signal or an OFDM symbol used for transmitting uplink data;

Step S2920: receiving the uplink control information transmitted by the first terminal device, according to the first transmission configuration information.

Alternatively, when transmitting the uplink control information on the data OFDM symbols, the position indication information includes indication information of a resource allocation manner of the REs used for reporting UCI, the resource allocation manner of the REs used for reporting UCI includes a first allocation manner or a second allocation manner, wherein the first allocation manner means that the REs used for reporting UCI are discretely distributed on OFDM symbols used for transmitting the uplink control information, and the second allocation manner means that the REs used for reporting UCI are all REs of at least one OFDM symbol for transmitting uplink data.

Alternatively, if the first terminal device is not a full-duplex device, the method further includes:

transmitting the second transmission configuration information to the second terminal device, so that the second terminal device receives the downlink data according to the second transmission indication information, wherein the second terminal device is a device that performs full-duplex transmission with the first terminal device;

the second transmission configuration information includes the transmission indication information. If the second terminal device does not receive the downlink data on the REs, and the first terminal device transmits the uplink control information on the OFDM symbol used for transmitting the uplink data, the second transmission configuration information further includes the position indication information;

transmitting downlink data to the second terminal device according to the second transmission indication information.

Alternatively, in the case of the first terminal device reporting the uplink control information on the OFDM symbols used for transmitting the uplink data, if the REs (that is, the REs transmitting the uplink control information) are all REs on at least one OFDM symbol used for transmitting uplink data and the base station does not transmit the downlink data on the REs (that is, the resource allocation manner is the second allocation manner), the method further includes at least one of the following:

Manner 1:
  determining an initial transmission block length according to the initial MCS;
  determining a transmission block length weighting coefficient according to a ratio of the number of OFDM symbols used for transmitting the uplink control information to all OFDM symbols in one subframe or one slot, wherein the transmission block length weighting coefficient is greater than 0 and less than 1;
  calculating an actual transmission block length according to the initial transmission block length and the transmission block length weighting coefficient;
  receiving uplink data transmitted by the first terminal device or transmitting downlink data to the second terminal device, according to the actual transmission block length;
  wherein, the second terminal device is a device that performs full-duplex transmission with the first terminal device, and if the first terminal device is a full-duplex device, the first terminal device and the second terminal device are the same device;

Manner 2:
  determining an initial transmission block length according to an initial MCS;
  determining the transmission block length weighting coefficient according to a ratio of the number of OFDM symbols for transmitting the uplink control information to all OFDM symbols in one subframe or one slot;
  calculating an actual transmission block length according to the initial transmission block length and the transmission block length weighting coefficient;
  calculating an actual MCS according to the actual transmission block length;
  transmitting the actual MCS to the first terminal device and the second terminal device, so that the first terminal device and the second terminal device calculate the actual transmission block length according to the actual MCS;

Manner 3:
  the OFDM symbol used for transmitting the uplink control information being configured as a first OFDM sub-symbol and a second OFDM sub-symbol, the REs are all REs on the first OFDM sub-symbol, and the subcarrier spacing on the OFDM symbol used for transmitting the uplink control information being greater than the subcarrier spacing on the OFDM symbol of which all REs are used for receiving downlink data;

receiving uplink data transmitted by the first terminal device, or transmitting downlink data to the second terminal device, by the second OFDM sub-symbol and the OFDM symbol of which all REs are used for receiving downlink data.

It may be understood that the method shown in FIG. 17 in the embodiment of the present application and the embodiment based on the method shown in FIG. 17, the method shown in FIG. 18 and the embodiment based on the method shown in FIG. 18, and the method shown in FIG. 29 and alternative embodiment thereof are respectively described from the UE side and the base station side performing full-duplex transmission, and the principles of the three schemes are the same. That is, the execution body of the method shown in FIG. 17 and alternative embodiment thereof may be a UE that occupies the uplink resource in the full-duplex transmission, the execution body of the method shown in FIG. 18 and alternative embodiment thereof may be a UE that occupies the downlink resource in the full-duplex transmission, the execution body of the method shown in FIG. 29 and alternative embodiment thereof may be a base station. It will be apparent to those skilled in the art that the detail description of the foregoing method shown in FIG. 29 and alternative embodiment may be referred to the detail description of the foregoing method shown in FIG. 17 and alternative embodiment thereof, or the detail description of the foregoing method shown in FIG. 18 and alternative embodiment thereof, which will not be repeated herein.

Figure 30:
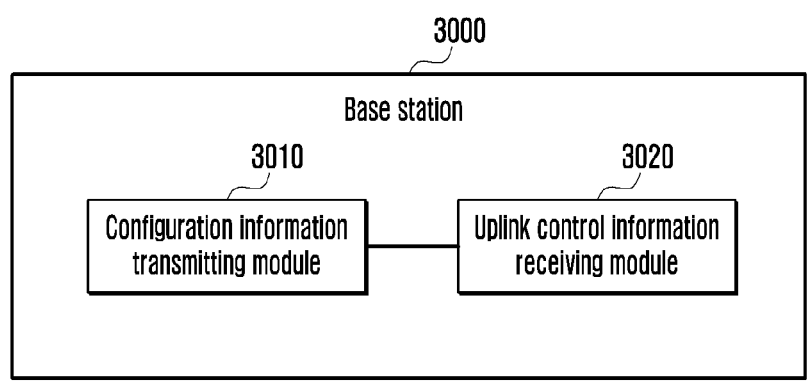
FIG. 30 is a schematic structural diagram of a base station according to an embodiment of the present application.

Based on the same principle, the embodiment of the present application further provides a base station. As shown in FIG. 30, the base station may include a configuration information transmitting module 3010 and an uplink control information receiving module 3020.

The configuration information transmitting module 3010 is configured to transmit transmission configuration information for the uplink control information to the first terminal device, so that the first terminal device transmits the uplink control information according to the first transmission configuration information.

The uplink control information receiving module 3020 is configured to receive the uplink control information transmitted by the first terminal device, according to the first transmission configuration information.

Wherein, the first transmission configuration information includes transmission indication information and position indication information, wherein the transmission indication information is used to indicate the first terminal device to transmit the uplink control information on an OFDM symbol used for transmitting an uplink pilot signal or to transmit the uplink control information on an OFDM symbol used for transmitting uplink data, and the position indication information is used to indicate the position of REs used for transmitting the uplink control information on an OFDM symbol used for transmitting an uplink pilot signal or an OFDM symbol used for transmitting uplink data.

Alternatively, if the first terminal device is not a full-duplex device, the configuration information transmitting module 3010 is further configured to:

transmitting the second transmission configuration information to the second terminal device, so that the second terminal device receives the downlink data according to the second transmission indication information, wherein the second terminal device is a device that performs full-duplex transmission with the first terminal device;

The second transmission configuration information includes the transmission indication information. If the second terminal device does not receive the downlink data on the REs, and the first terminal device transmits the uplink control information on the OFDM symbol used for transmitting the uplink data, the second transmission configuration information further includes the position indication information;

The base station also includes:

And a downlink data transmitting module, configured to transmit downlink data to the second terminal device according to the second transmission indication information.

Alternatively, when the REs are all REs on at least one OFDM symbol used for transmitting uplink data and the downlink data is not transmitted on the REs, the base station further includes a data transmission module, configured to perform at least one of the following:

Manner 1:

determining an initial transmission block length according to the initial MCS;

determining a transmission block length weighting coefficient according to a ratio of the number of OFDM symbols used for transmitting the uplink control information of the first terminal device to all OFDM symbols in one subframe or one slot, wherein the transmission block length weighting coefficient is greater than 0 and less than 1;

calculating an actual transmission block length according to the initial transmission block length and the transmission block length weighting coefficient;

receiving uplink data transmitted by the first terminal device or transmitting downlink data to the second terminal device, according to the actual transmission block length;

wherein, the second terminal device is a device that performs full-duplex transmission with the first terminal device, and if the first terminal device is a full-duplex device, the first terminal device and the second terminal device are the same device;

Manner 2:

determining an initial transmission block length according to the initial MCS;

determining the transmission block length weighting coefficient according to a ratio of the number of OFDM symbols of the first terminal device used for transmitting the uplink control information to all OFDM symbols in one subframe or one slot;

calculating an actual transmission block length according to the initial transmission block length and the transmission block length weighting coefficient;

calculating an actual MCS according to the actual transmission block length;

transmitting the actual MCS to the first terminal device and the second terminal device, so that the first terminal device and the second terminal device calculate the actual transmission block length according to the actual MCS;

Manner 3:

the OFDM symbol used for transmitting the uplink control information of the first terminal device being configured as a first OFDM sub-symbol and a second OFDM sub-symbol, the REs are all REs on the first OFDM sub-symbol, and the subcarrier spacing on the OFDM symbol used for transmitting the uplink control information being greater than the subcarrier spacing on the OFDM symbol of which all REs are used for transmitting the uplink data;

receiving uplink data transmitted by the first terminal device, or transmitting downlink data to the second terminal device, by the second OFDM sub-symbol and the OFDM symbol of which all REs are used for transmitting uplink data.

Similarly, the base station in the embodiment of the present application may be the execution body of the method shown in FIG. 29 and alternative embodiments thereof, and each module of the base station may have a function of implementing corresponding steps in the method. The function description and other functions of each module of the base station, may be referred to the corresponding description of the method shown in FIG. 17 and the alternative embodiment thereof, the method shown in FIG. 18 and the alternative embodiment thereof, the method shown in FIG. 29 and the alternative embodiment thereof, which will not be repeated herein.

Based on same principles, the embodiment of the present application further provides an electronic device, wherein the electronic device includes a memory and a processor; the memory stores a computer instruction; and the processor is configured to invoke a computer instruction to perform any of the methods in the embodiments of the present application.

Based on same principles, the embodiment of the present application further provides a computer readable storage medium, having stored a computer program thereon that, when executed by a processor, implements any of the methods in the embodiment of the present application.

Figure 31:
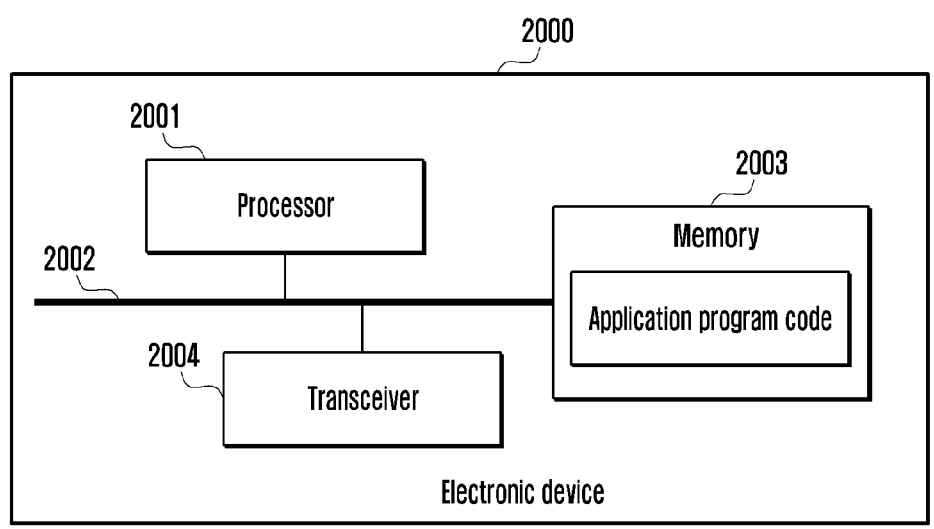
FIG. 31 is a schematic structural diagram of an electronic device according to an embodiment of the present application.

FIG. 31 shows a schematic structural diagram of an electronic device provided by the embodiment of the present application, wherein the electronic device 2000 including a processor 2001 and a memory 2003. Wherein, the processor 2001 is connected to the memory 2003, for example, through a bus 2002. Alternatively, the electronic device 2000 may also include a transceiver 2004. It should be noted that, in actual applications, the number of the transceiver 2004 is not limited to one, and the structure of the electronic device 2000 does not constitute a limitation on the embodiments of the present application.

Wherein, the processor 2001 is applied to the embodiments of the present application for implementing the functions of the each module of the terminal device or the base station provided by the embodiments of the present application. The transceiver 2004 includes a receiver and a transmitter. The transceiver 2004 is applied to the embodiments of the present application to implement a communication between the electronic device 2000 and another device, to implement data reception and transmission.

The processor 2001 may be a CPU, a general-purpose processor, a DSP, an ASIC, and an FPGA or other programmable logic device, transistor logic device, hardware component, or any combination thereof. It is possible to implement or carry out the various illustrative logical blocks, modules and circuits described in connection with the present application. The processor 2001 may also be a combination of implementing computing functions, such as one or more microprocessor combinations, a combination of a DSP and a microprocessor, and the like.

The bus 2002 may include a path for communicating information between the above components. The bus 2002 may be a PCI bus or an EISA bus. The bus 2002 may be divided into an address bus, a data bus, a control bus, and the like. For convenience of representation, only one thick line in FIG. 31 is used to represent the bus, but it does not mean that there is only one bus or one type of bus.

The memory 2003 may be a ROM or another type of static storage device that may store static information and instructions, or an RAM or another type of dynamic storage device that may store information and instruction, and may also be an EEPROM, a CD-ROM or another optical disc storage, optical disc storage (including compression optical disc, laser disc, optical disc, digital versatile disc, Blu-ray discs, etc.), a magnetic disk storage medium or another magnetic storage device, or any other medium that may be used to carry or store desired program codes having the form of instruction or data structure and may be accessed by the computer.

Alternatively, the memory 2003 is used to store application program codes for executing the solution of the present application, and is controlled by the processor 2001 for execution. The processor 2001 is configured to execute the application program codes stored in the memory 2003 to implement the methods provided by the embodiments of the present application or execute the actions of terminal device and base station provided by the embodiments of the present application.

It should be understood that although the various steps in the flowchart of the drawings are sequentially displayed as indicated by the arrows, these steps are not necessarily performed in the order indicated by the arrows. Unless otherwise explicitly stated herein, the execution of these steps is not strictly limited in order, and may be performed in other sequences. Moreover, at least some of the steps in the flowchart of the drawings may include a plurality of sub-steps or stages, which are not necessarily performed at the same time, but may be executed at different times, and the order of execution thereof is not necessarily to be performed sequentially, but may be performed by turns or alternately with at least a portion of the sub-steps or stages of other steps, or other steps.

Although certain exemplary embodiments of the present invention have been shown and described, it should be understood by those skilled in the art that various changes in form and details may be made therein without departing from the principle and spirit of the present invention which are defined by the appended claims and the equivalents thereof.

The invention claimed is:

1. A method performed by a user equipment (UE) in a communication system, the method comprising:
    performing blind detection on a physical downlink control channel (PDCCH) in at least one subframe or slot to acquire first downlink control information and second downlink control information; and
    performing uplink data transmission and downlink data reception with a base station according to the acquired first downlink control information and second downlink control information,
    wherein the first downlink control information is one of downlink control information for uplink scheduling grant and downlink control information for downlink scheduling, and the second downlink control information is the other one of the downlink control information for the uplink scheduling grant and the downlink control information for the downlink scheduling,
    wherein a location where a PDCCH carrying the second downlink control information is detected is associated with related information of the first downlink control information, wherein the related information of the first downlink control information is at least one of an aggregation level of a PDCCH carrying the first downlink control information, a location of the PDCCH carrying the first downlink control information in a search subspace, or content in a specific field in the first downlink control information, wherein when the first downlink control information and the second downlink control information are carried on the same one PDCCH, the first downlink control information and the second downlink control information are contained in third downlink control information, and performing blind detection on the PDCCH to acquire first downlink control information and second downlink control information comprises:

performing blind detection on the PDCCH based on a length of the third downlink control information in one subframe or slot, to acquire the third downlink control information; and obtaining the first downlink control information and the second downlink control information, based on the acquired third downlink control information, and wherein the third downlink control information only includes only one set of resource allocation fields for indicating the same resources used in uplink and downlink data transmissions.

2. The method of claim 1, wherein the search subspace is a subspace in a UE-specific search space, and wherein the content in the specific field is used for indicating an aggregation level of the PDCCH carrying the second downlink control information and/or a location of the PDCCH carrying the second downlink control information in the search subspace.

3. The method of claim 1, wherein, when the first downlink control information and the second downlink control information are carried on different PDCCHs, the performing blind detection on the PDCCH to acquire first downlink control information and second downlink control information comprises:

detecting the PDCCH carrying the first downlink control information blindly in one subframe or slot to acquire the first downlink control information; and performing blind detection on the PDCCH carrying the second downlink control information based on the related information of the first downlink control information in a subframe or slot used for transmitting the PDCCH carrying the second downlink control information, to acquire the second downlink control information, wherein the one subframe or slot and the subframe or slot used for transmitting the PDCCH carrying the second downlink control information are the same one subframe or slot, or are different subframes or slots.

4. The method of claim 3, wherein the performing blind detection on the PDCCH carrying the second downlink control information based on the related information of the first downlink control information comprises:

determining an aggregation level of the PDCCH carrying the second downlink control information and/or the location of the PDCCH carrying the second downlink control information in the search subspace based on the related information of the first downlink control information; and performing blind detection on the PDCCH carrying the second downlink control information in a location, which is defined by the determined aggregation level and/or the location in the search subspace, in the subframe or slot used for transmitting the PDCCH carrying the second downlink control information, to acquire the second downlink control information.

5. The method of claim 4, wherein the determining an aggregation level of the PDCCH carrying the second downlink control information and/or the location of the PDCCH carrying the second downlink control information in the search subspace based on the related information of the first downlink control information comprises:

determining the aggregation level of the PDCCH carrying the second downlink control information and/or the location of the PDCCH carrying the second downlink control information in the search subspace based on the content in the specific field in the first downlink control information; or determining the aggregation level of the PDCCH carrying the second downlink control information and/or the location of the PDCCH carrying the second downlink control information in the search subspace based on the content in the specific field in the first downlink control information, and the aggregation level of the PDCCH carrying the first downlink control information and/or the location of the PDCCH carrying the first downlink control information in the search subspace; or calculating the aggregation level of the PDCCH carrying the second downlink control information and/or the location of the PDCCH carrying the second downlink control information in the search subspace based on the aggregation level of the PDCCH carrying the first downlink control information and/or the location of the PDCCH carrying the first downlink control information in the search subspace, by using a location correlation function.

6. The method of claim 3, wherein when the one subframe or slot and the subframe or slot used for transmitting the PDCCH carrying the second downlink control information are different subframes or slots, further comprising:

transmitting blind detection feedback information to a corresponding base station after performing blind detection on the PDCCH carrying the second downlink control information, wherein when the PDCCH carrying the second downlink control information is detected, blind detection feedback information for indicating that the PDCCH carrying the second downlink control information is detected is transmitted to the corresponding base station, and wherein when no PDCCH carrying the second downlink control information is detected in the subframe or slot used for transmitting the PDCCH carrying the second downlink control information, blind detection feedback information for indicating that no PDCCH carrying the second downlink control information is detected is transmitted to the corresponding base station.

7. The method of claim 1, wherein the length of the third downlink control information includes a first length and a second length, and a length of unidirectional downlink control information includes the second length and a third length, wherein the first length is longer than the second length, and the second length is longer than the third length, or wherein the length of the third downlink control information only includes a fourth length, and a length of unidirectional downlink control information only includes a fifth length, wherein the fourth length is longer than the fifth length.

8. A method performed by a base station in a communication system, the method comprising:
- transmitting downlink control information to a user equipment (UE) on a physical downlink control channel (PDCCH) in at least one subframe or slot, so that the UE acquires first downlink control information and second downlink control information; and
- performing uplink data reception and downlink data transmission with the UE according to the first downlink control information and the second downlink control information,
- wherein the first downlink control information is one of downlink control information for uplink scheduling grant and downlink control information for downlink scheduling, and the second downlink control information is the other one of the downlink control information for the uplink scheduling grant and the downlink control information for the downlink scheduling,
- wherein a location of a PDCCH carrying the second downlink control information in a subframe or slot is associated with related information of the first downlink control information,
- wherein the related information of the first downlink control information is at least one of an aggregation level of a PDCCH carrying the first downlink control information, a location of the PDCCH carrying the first downlink control information in a search subspace, or content in a specific field in the first downlink control information,
- wherein when the first downlink control information and the second downlink control information are carried on the same one PDCCH, the first downlink control information and the second downlink control information are contained in third downlink control information, and
- wherein the third downlink control information only includes only one set of resource allocation fields for indicating the same resources used in uplink and downlink data transmissions.

9. The method of claim 8, wherein when the first downlink control information and the second downlink control information are carried on different PDCCHs, the transmitting downlink control information to the UE on the PDCCH in at least one subframe or slot comprises:
- determining a PDCCH for carrying the first downlink control information;
- determining a PDCCH for carrying the second downlink control information, based on an aggregation level of the determined PDCCH for carrying the first downlink control information and/or a location of the PDCCH for carrying the first downlink control information in a search subspace, by using a location correlation function; and
- transmitting the first downlink control information to the UE on the determined PDCCH for carrying the first downlink control information, and transmitting the second downlink control information to the UE on the determined PDCCH for carrying the second downlink control information, in at least one subframe or slot.

10. The method of claim 8, wherein, when the first downlink control information and the second downlink control information are carried on different PDCCHs, the transmitting downlink control information to a user equipment on the PDCCH in at least one subframe or slot comprises:
- determining a PDCCH for carrying the first downlink control information;
- determining a PDCCH for carrying the second downlink control information;
- generating content for indicating an aggregation level of the determined PDCCH for carrying the second downlink control information and/or a location of the determined PDCCH for carrying the second downlink control information in a search subspace;
- adding the generated content to the specific field in the first downlink control information; and
- transmitting the first downlink control information, to which the generated content is added, to the UE on the determined PDCCH for carrying the first downlink control information, and transmitting the second downlink control information to the UE on the determined PDCCH for carrying the second downlink control information, in at least one subframe or slot.

11. The method of claim 10, wherein the transmitting the first downlink control information and the second downlink control information in at least one subframe or slot comprises:
- transmitting the first downlink control information, to which the generated content is added, to the UE on the determined PDCCH for carrying the first downlink control information, and transmitting the second downlink control information to the UE on the determined PDCCH for carrying the second downlink control information, in the same one subframe or slot; or
- transmitting the first downlink control information, to which the generated content is added, to the UE on the determined PDCCH for carrying the first downlink control information in one subframe or slot, and transmitting the second downlink control information to the UE on the determined PDCCH for carrying the second downlink control information in a subframe or slot subsequent to the one subframe or slot.

12. A user equipment (UE) in a communication system, the UE comprising:
- a transceiver; and
- a controller coupled with the transceiver and configured to:
  - perform blind detection on a physical downlink control channel_(PDCCH) in at least one subframe or slot to acquire first downlink control information and second downlink control information, and
  - perform uplink data transmission and downlink data reception with a base station according to the acquired first downlink control information and second downlink control information,
- wherein the first downlink control information is one of downlink control information for uplink scheduling grant and downlink control information for downlink scheduling, and the second downlink control information is the other one of the downlink control information for the uplink scheduling grant and the downlink control information for the downlink scheduling,
- wherein a location where a PDCCH carrying the second downlink control information is detected is associated with related information of the first downlink control information,
- wherein the related information of the first downlink control information is at least one of an aggregation level of a PDCCH carrying the first downlink control information, a location of the PDCCH carrying the first downlink control information in a search subspace, or content in a specific field in the first downlink control information, wherein when the first downlink control information and the second downlink control information are carried on the same one PDCCH, the first downlink control information and the second downlink control information are contained in third downlink control information, and the controller is configured to:
  perform blind detection on the PDCCH based on a length of the third downlink control information in one subframe or slot, to acquire the third downlink control information, and
  obtain the first downlink control information and the second downlink control information, based on the acquired third downlink control information, and
wherein the third downlink control information only includes only one set of resource allocation fields for indicating the same resources used in uplink and downlink data transmissions.

13. The UE of claim 12,
wherein the search subspace is a subspace in a UE-specific search space, and
wherein the content in the specific field is used for indicating an aggregation level of the PDCCH carrying the second downlink control information and/or a location of the PDCCH carrying the second downlink control information in the search subspace.

14. The UE of claim 12, wherein, when the first downlink control information and the second downlink control information are carried on different PDCCHs, the controller is configured to:
  detect the PDCCH carrying the first downlink control information blindly in one subframe or slot to acquire the first downlink control information, and
  perform blind detection on the PDCCH carrying the second downlink control information based on the related information of the first downlink control information in a subframe or slot used for transmitting the PDCCH carrying the second downlink control information, to acquire the second downlink control information,
wherein the one subframe or slot and the subframe or slot used for transmitting the PDCCH carrying the second downlink control information are the same one subframe or slot, or are different subframes or slots.

15. A base station in a communication system, the base station comprising:
  a transceiver; and
  a controller coupled with the transceiver and configured to:
    transmit downlink control information to a user equipment (UE) on a physical downlink control channel (PDCCH) in at least one subframe or slot, so that the UE acquires first downlink control information and second downlink control information, and
    perform uplink data reception and downlink data transmission with the UE according to the first downlink control information and the second downlink control information,
  wherein the first downlink control information is one of downlink control information for uplink scheduling grant and downlink control information for downlink scheduling, and the second downlink control information is the other one of the downlink control information for the uplink scheduling grant and the downlink control information for the downlink scheduling,
  wherein a location of a PDCCH carrying the second downlink control information in a subframe or slot is associated with related information of the first downlink control information,
  wherein the related information of the first downlink control information is at least one of an aggregation level of a PDCCH carrying the first downlink control information, a location of the PDCCH carrying the first downlink control information in a search subspace, or content in a specific field in the first downlink control information,
  wherein when the first downlink control information and the second downlink control information are carried on the same one PDCCH, the first downlink control information and the second downlink control information are contained in third downlink control information, and
  wherein the third downlink control information only includes only one set of resource allocation fields for indicating the same resources used in uplink and downlink data transmissions.

16. The base station of claim 15, wherein when the first downlink control information and the second downlink control information are carried on different PDCCHs, the controller is configured to:
  determine a PDCCH for carrying the first downlink control information,
  determine a PDCCH for carrying the second downlink control information, based on an aggregation level of the determined PDCCH for carrying the first downlink control information and/or a location of the PDCCH for carrying the first downlink control information in a search subspace, by using a location correlation function, and
  transmit the first downlink control information to the UE on the determined PDCCH for carrying the first downlink control information, and transmit the second downlink control information to the UE on the determined PDCCH for carrying the second downlink control information, in at least one subframe or slot.

17. The base station of claim 15, wherein, when the first downlink control information and the second downlink control information are carried on different PDCCHs, the controller is configured to:
  determine a PDCCH for carrying the first downlink control information,
  determine a PDCCH for carrying the second downlink control information,
  generate content for indicating an aggregation level of the determined PDCCH for carrying the second downlink control information and/or a location of the determined PDCCH for carrying the second downlink control information in a search subspace,
  add the generated content to a specific field in the first downlink control information,
  transmit the first downlink control information, to which the generated content is added, to the UE on the determined PDCCH for carrying the first downlink control information, and transmit the second downlink control information to the UE on the determined PDCCH for carrying the second downlink control information, in at least one subframe or slot.

18. The base station of claim 17, wherein the controller is configured to:
  transmit the first downlink control information, to which the generated content is added, to the UE on the determined PDCCH for carrying the first downlink control information, and transmit the second downlink control information to the UE on the determined PDCCH for carrying the second downlink control information, in the same one subframe or slot; or transmit the first downlink control information, to which the generated content is added, to the UE on the determined PDCCH for carrying the first downlink control information in one subframe or slot, and transmit the second downlink control information to the UE on the determined PDCCH for carrying the second downlink control information in a subframe or slot subsequent to the one subframe or slot.

* * * * *